Inventors
Donald J. Gimpel
William A. Davidson

Fig. 6a
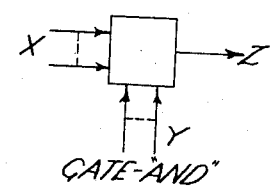
GATE-"AND"
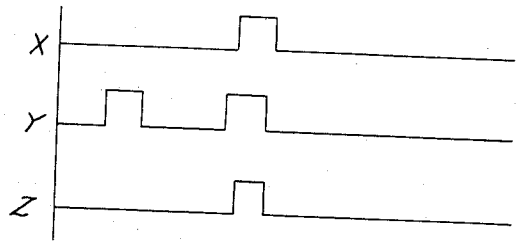
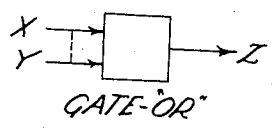
GATE-"OR"
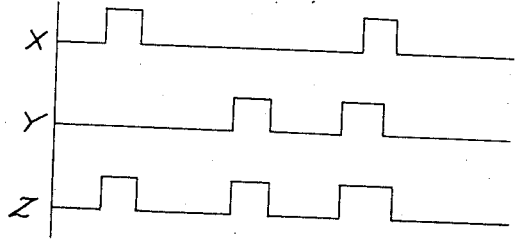
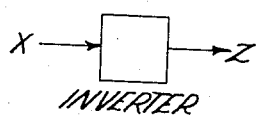
INVERTER
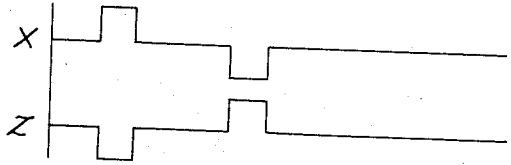
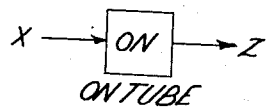
ON TUBE
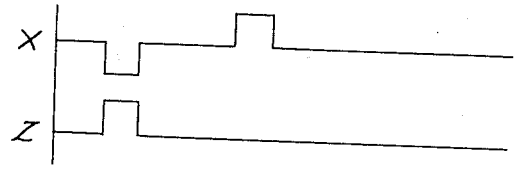
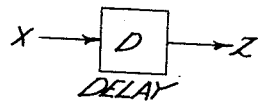
DELAY
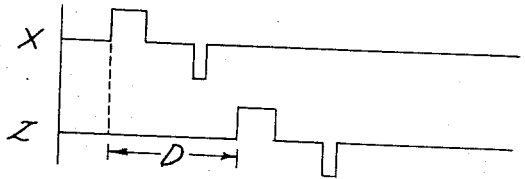
CLOCK
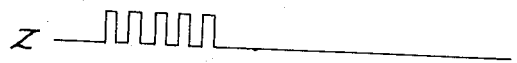
Inventors
Donald J. Gimpel
William A. Davidson March 10, 1959 D. J. GIMPEL ET AL 2,877,398
SERVOMECHANISM CONTROL SYSTEM
Filed Jan. 10, 1955 44 Sheets-Sheet 5
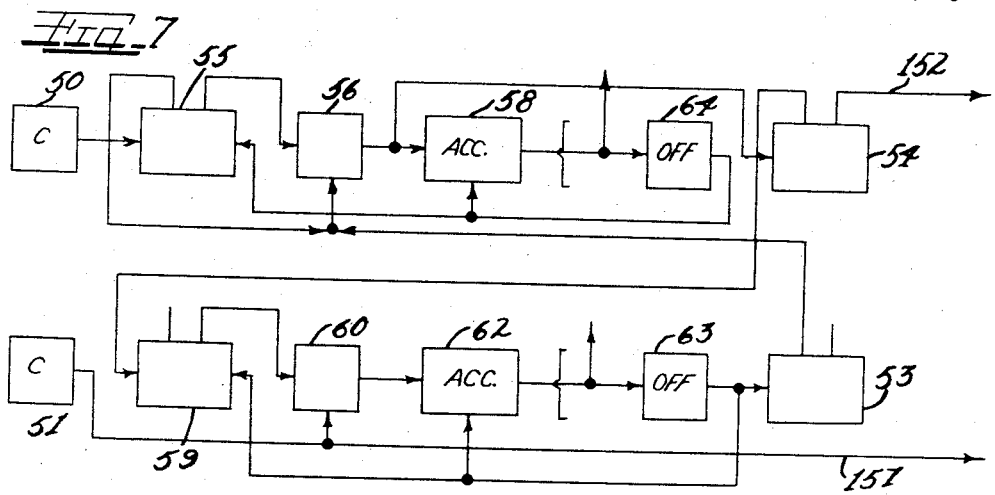
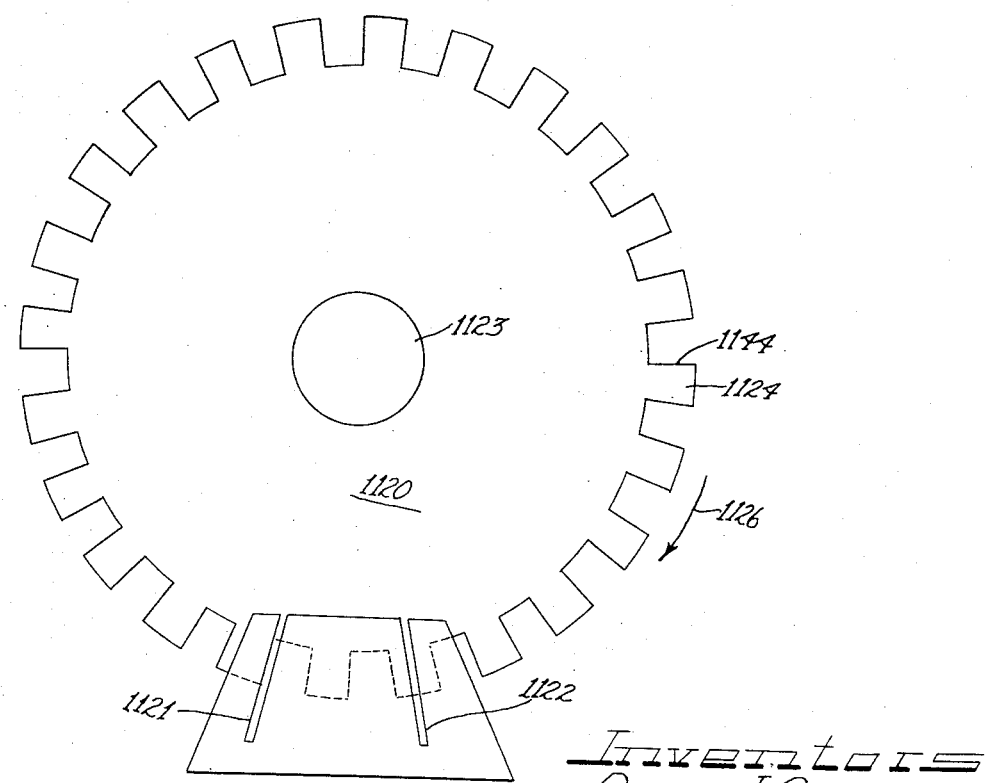
Inventors
Donald J. Gimpel
William A. Davidson March 10, 1959 D. J. GIMPEL ET AL 2,877,398
SERVOMECHANISM CONTROL SYSTEM
Filed Jan. 10, 1955 44 Sheets-Sheet 6

Inventors
DONALD J. GIMPEL
WILLIAM A. DAVIDSON
By Hill, Sherman, Meroni, Gross & Simpson
Attys

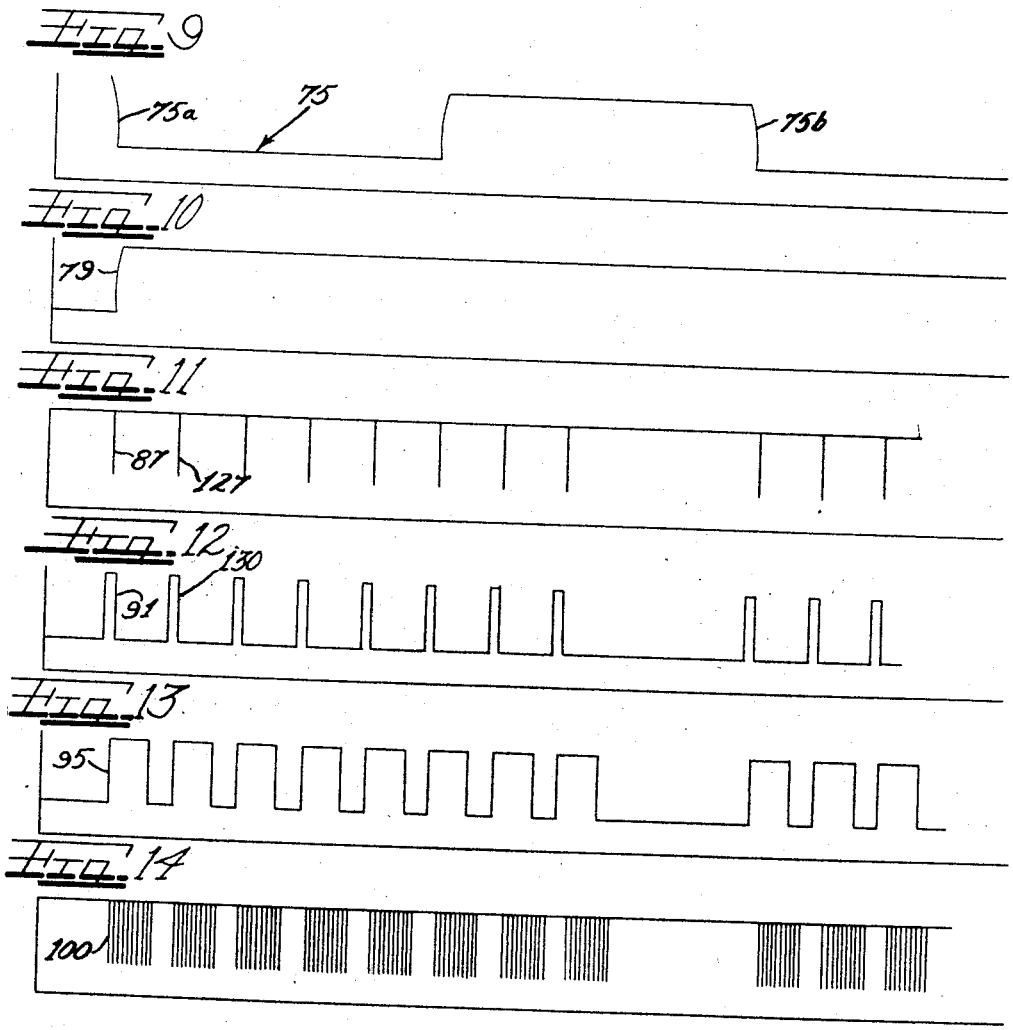

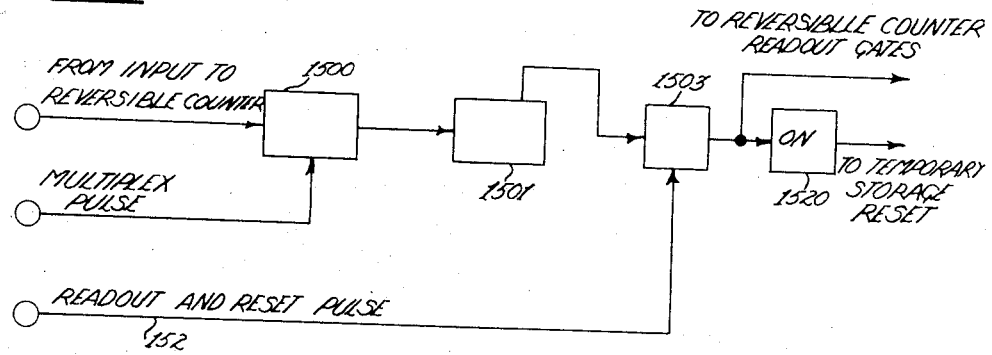
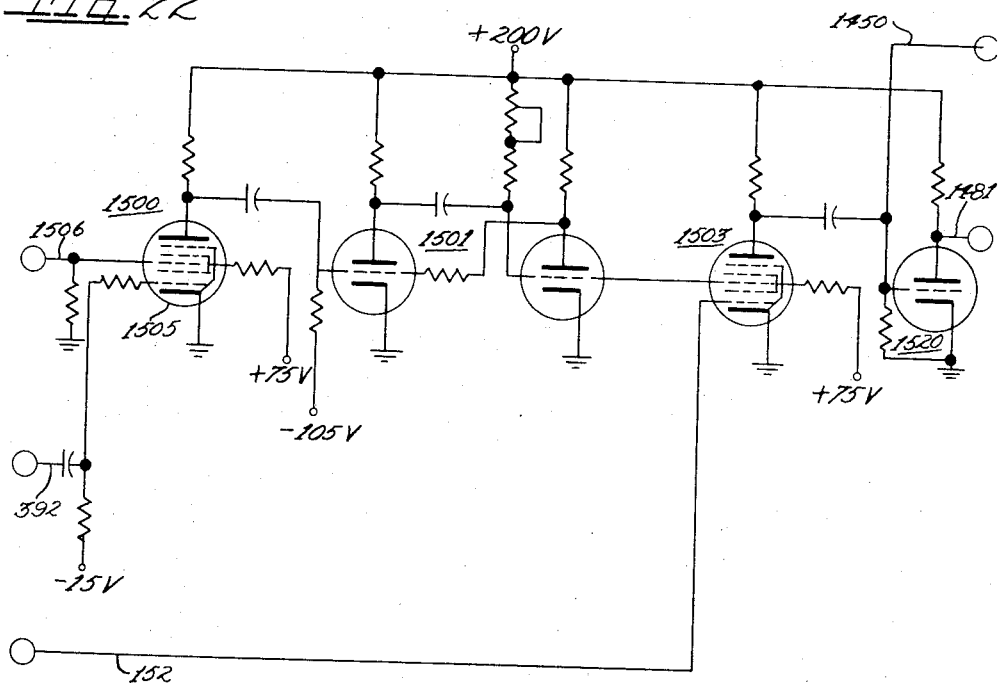

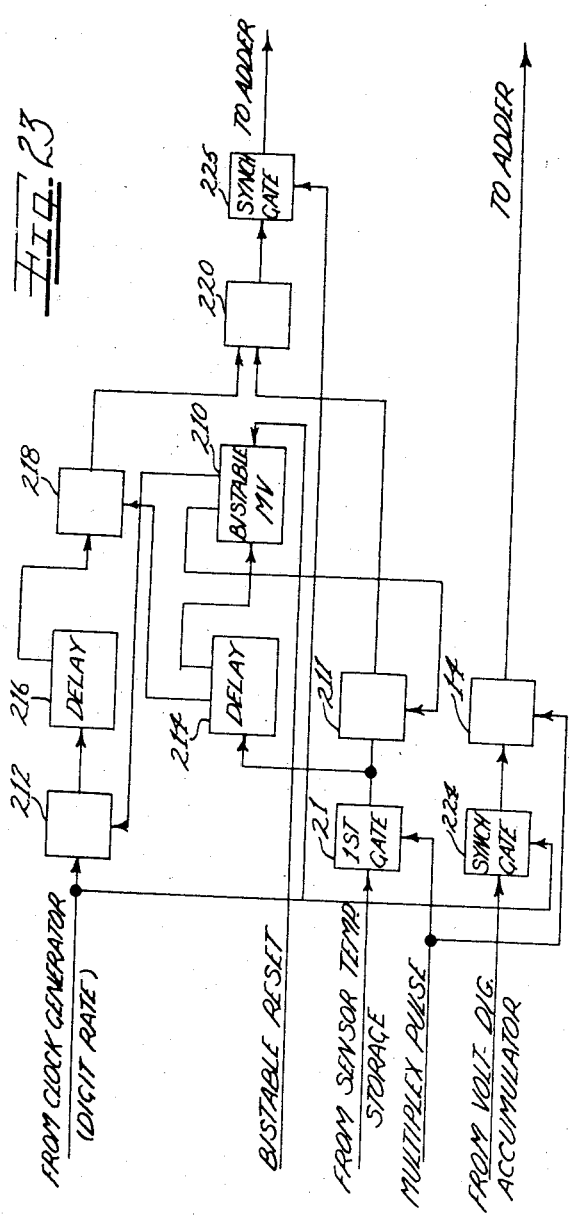

March 10, 1959

D. J. GIMPEL ET AL 2,877,398

SERVOMECHANISM CONTROL SYSTEM

Filed Jan. 10, 1955

Inventors
DONALD J. GIMPEL
WILLIAM A. DAVIDSON

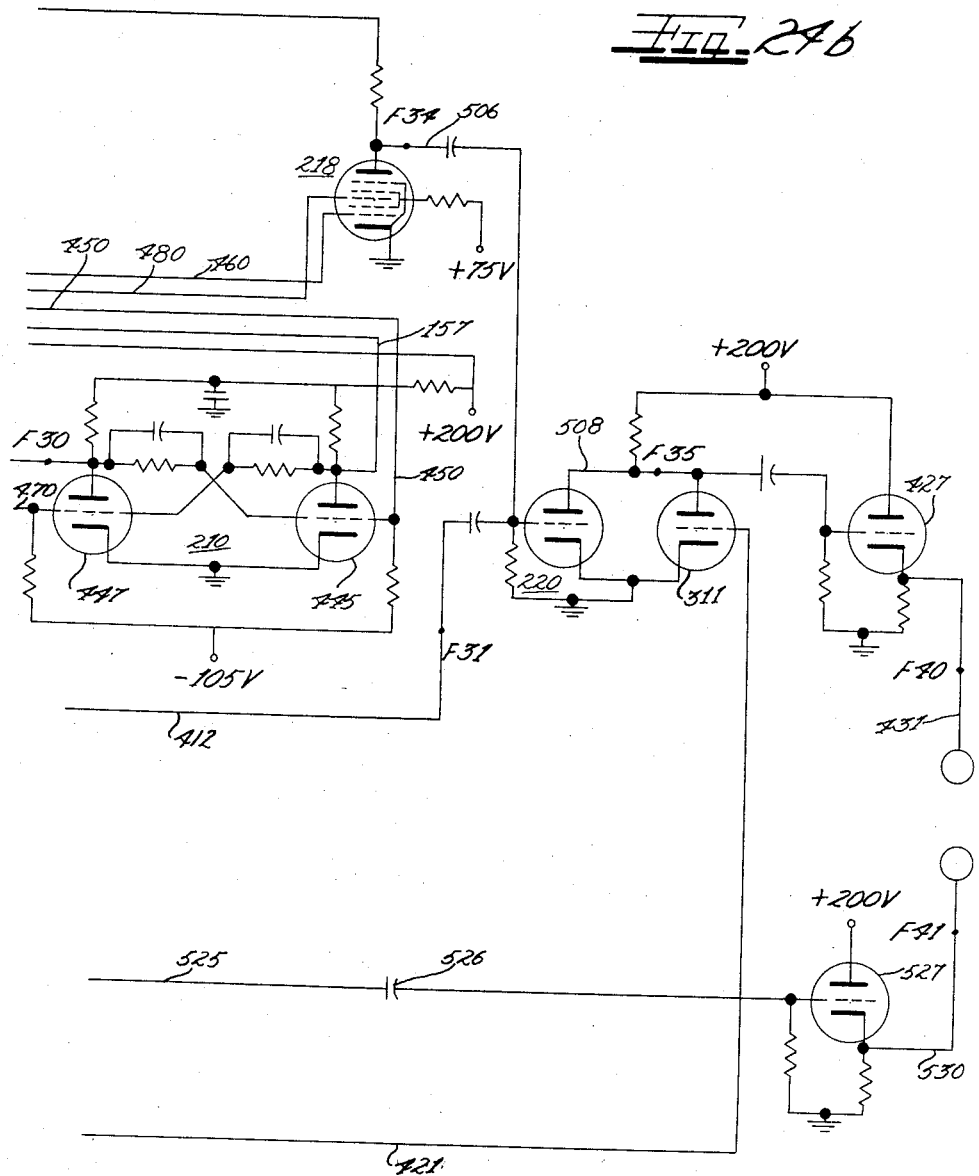

March 10, 1959 D. J. GIMPEL ET AL 2,877,398
SERVOMECHANISM CONTROL SYSTEM
Filed Jan. 10, 1955
44 Sheets-Sheet 14

Inventors
DONALD J. GIMPEL
WILLIAM A. DAVIDSON
By Hill, Sherman, Meroni, Gross & Simpson
Attys

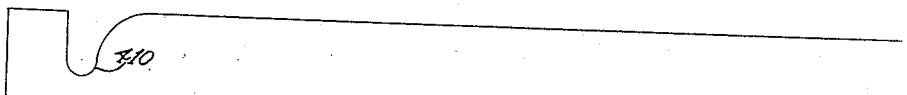
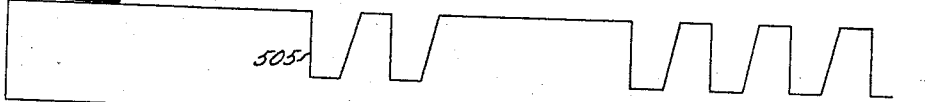
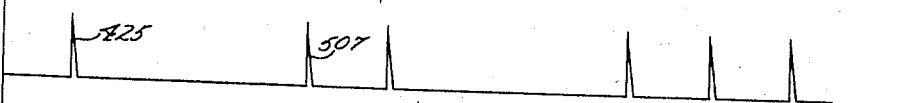

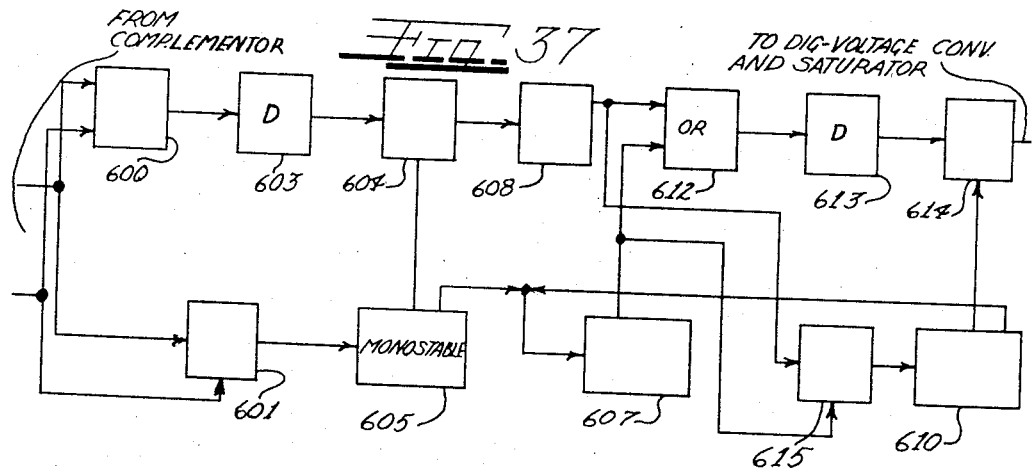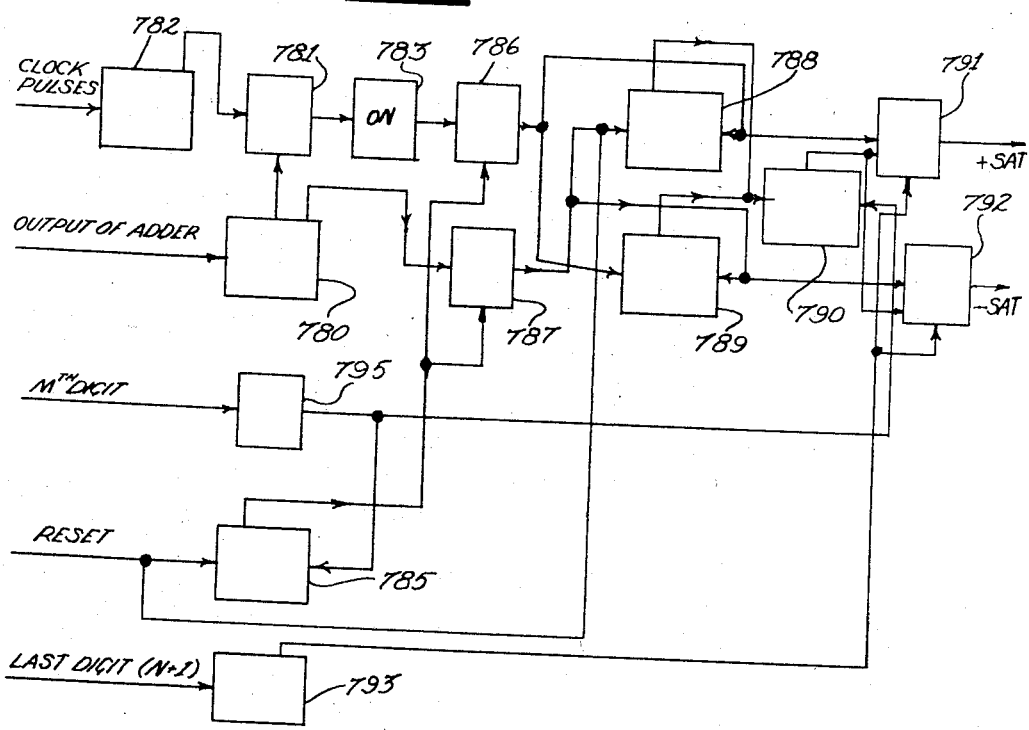

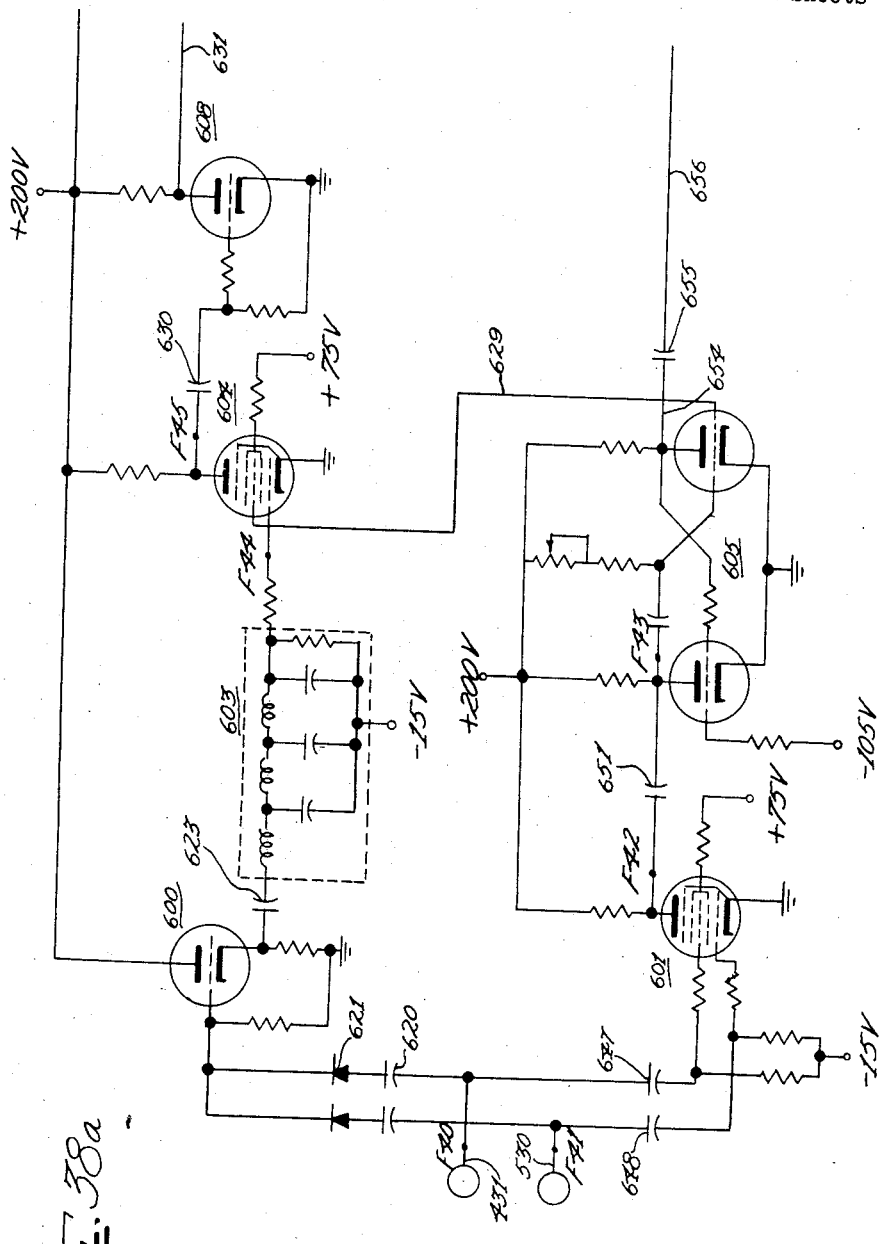

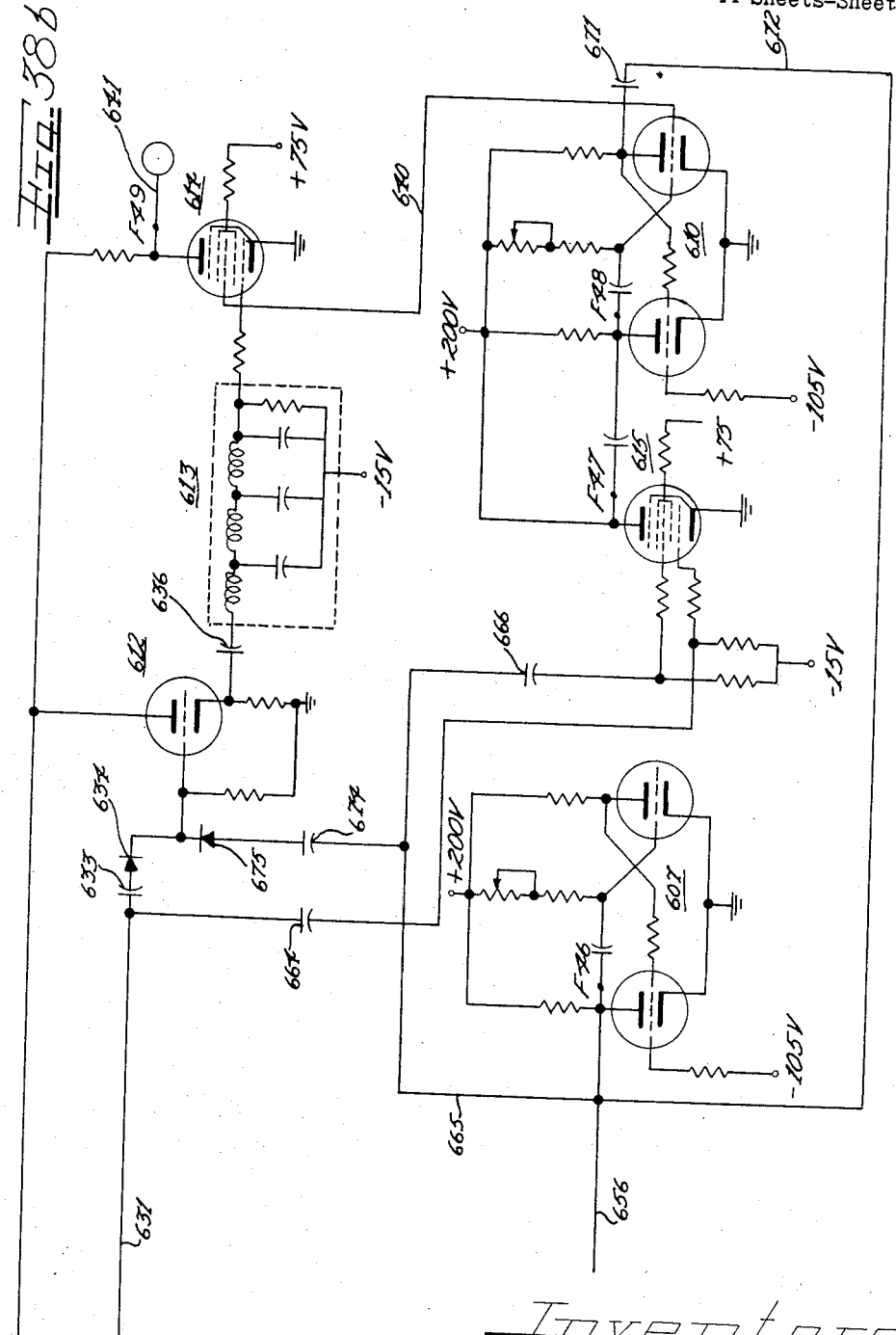

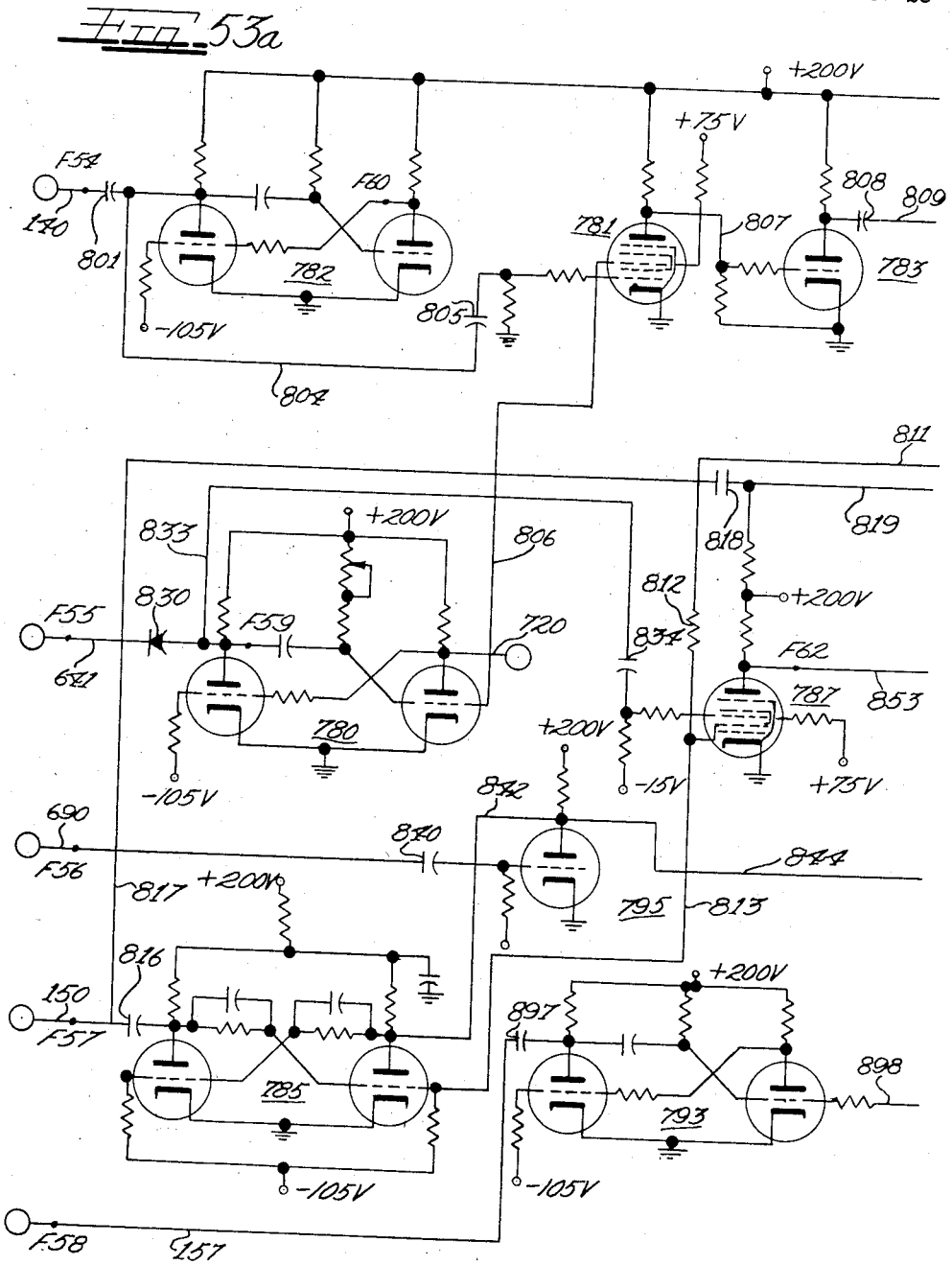

March 10, 1959

D. J. GIMPEL ET AL 2,877,398

SERVOMECHANISM CONTROL SYSTEM

Filed Jan. 10, 1955

Inventors
Donald J. Gimpel
William A. Davidson

By Hill, Sherman, Meroni, Gross & Simpson
Attys

Inventors
Donald J. Gimpel
William A. Davidson

March 10, 1959
D. J. GIMPEL ET AL
2,877,398
SERVOMECHANISM CONTROL SYSTEM
Filed Jan. 10, 1955
44 Sheets-Sheet 26
Inventors
Donald J. Gimpel
William A. Davidson

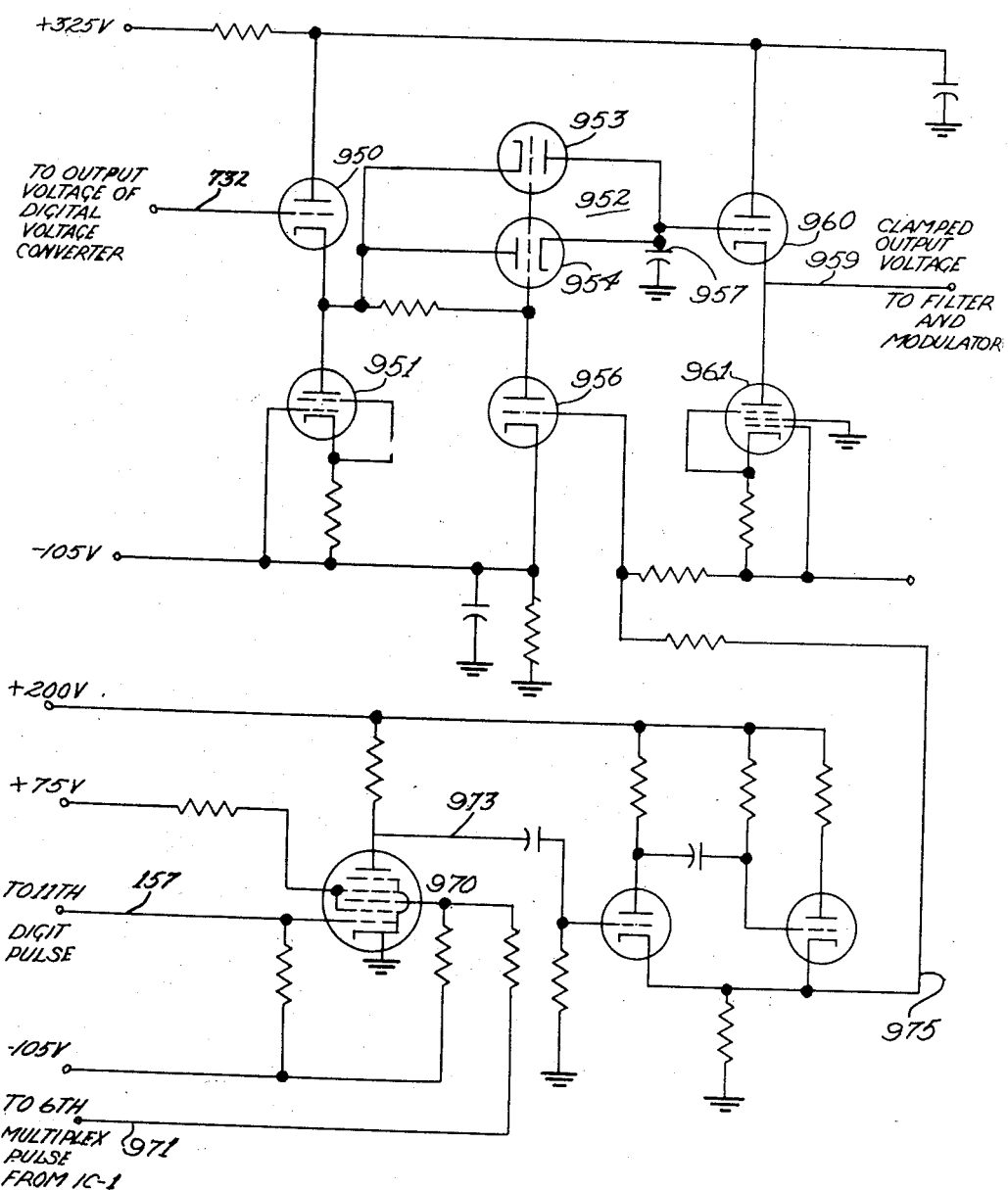

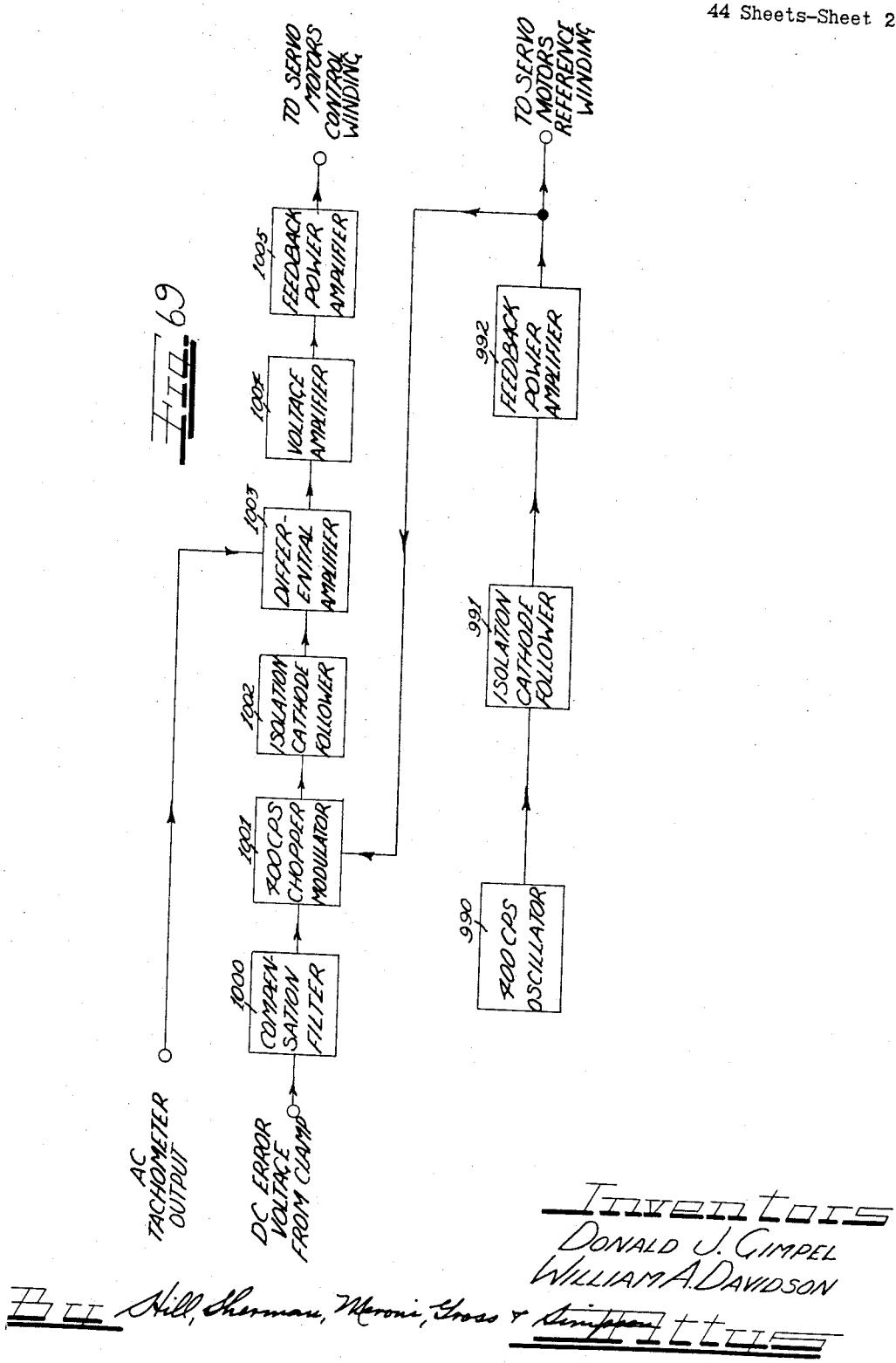

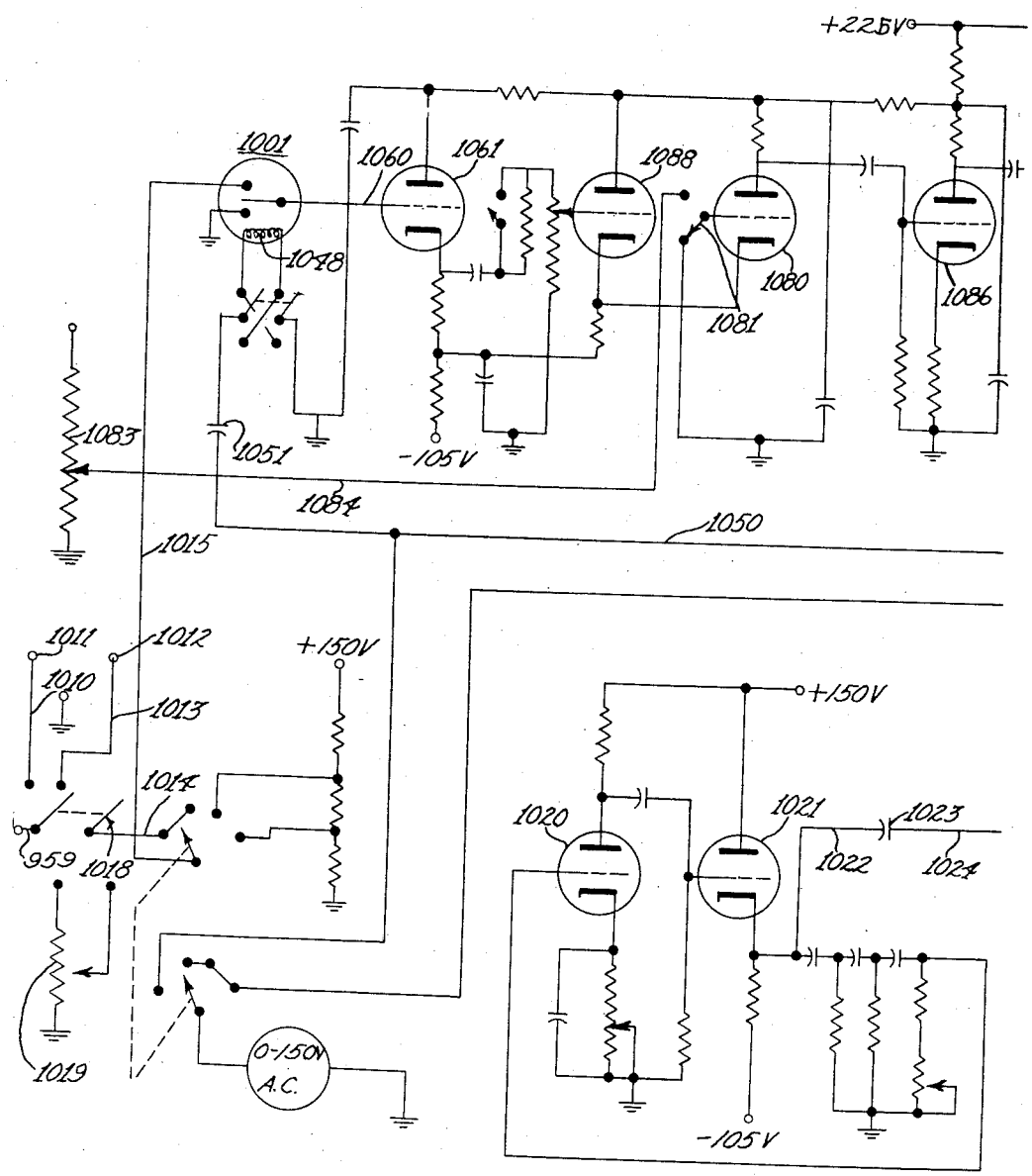

March 10, 1959
D. J. GIMPEL ET AL
2,877,398
SERVOMECHANISM CONTROL SYSTEM
Filed Jan. 10, 1955
44 Sheets-Sheet 31
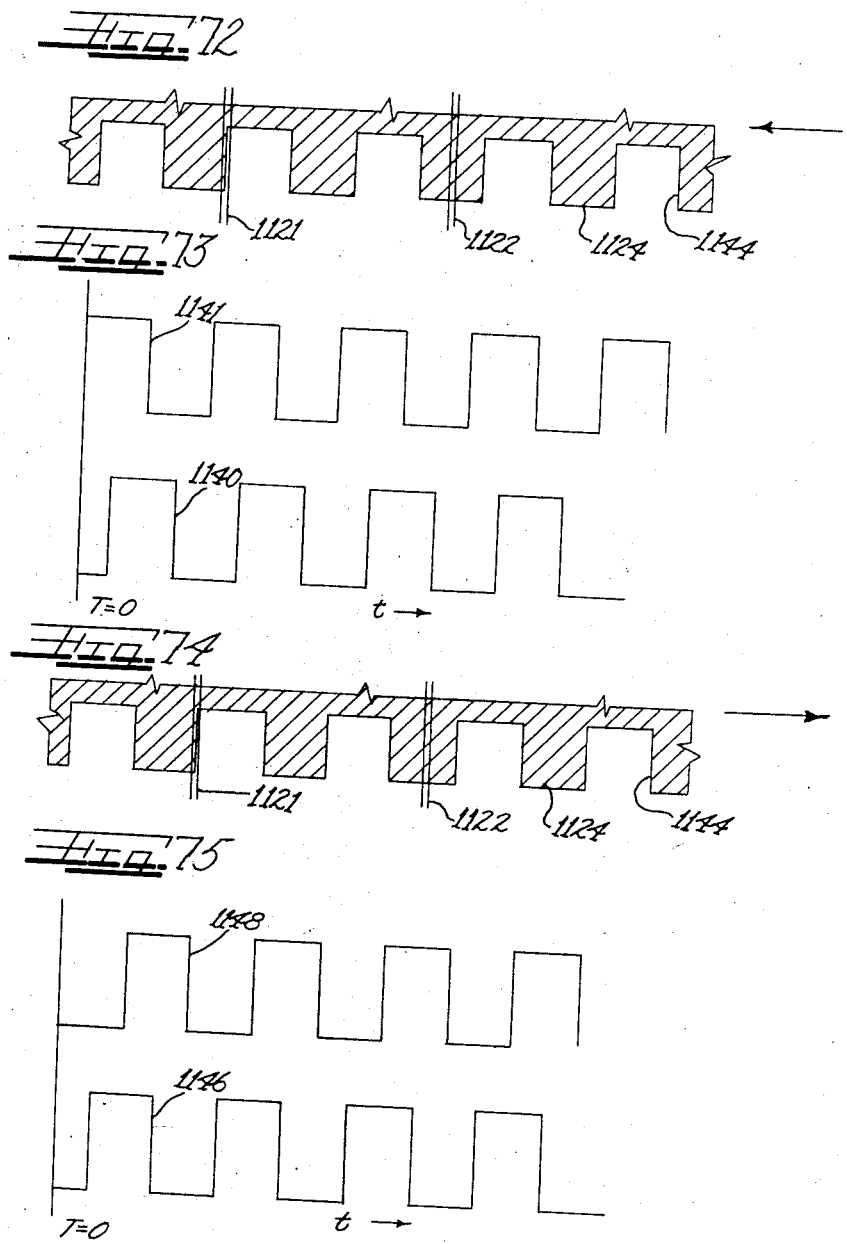
Inventors
Donald J. Gimpel
William A. Davidson
By Hill, Sherman, Meroni, Gross & Simpson
Attys

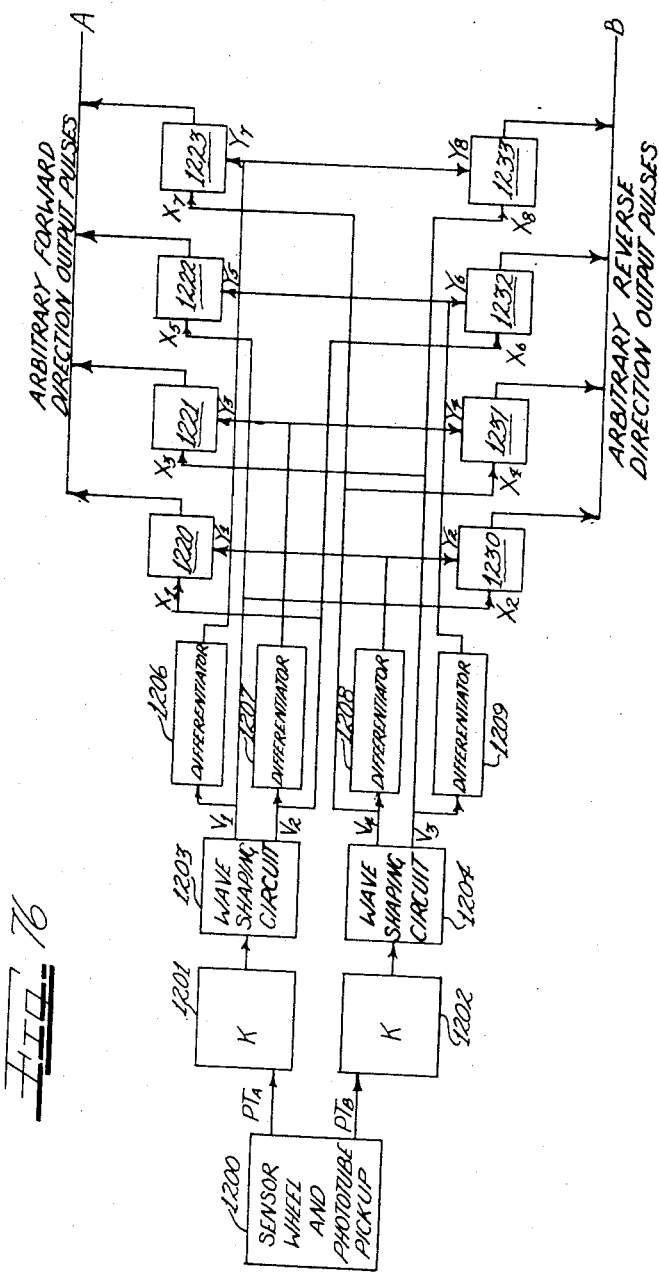

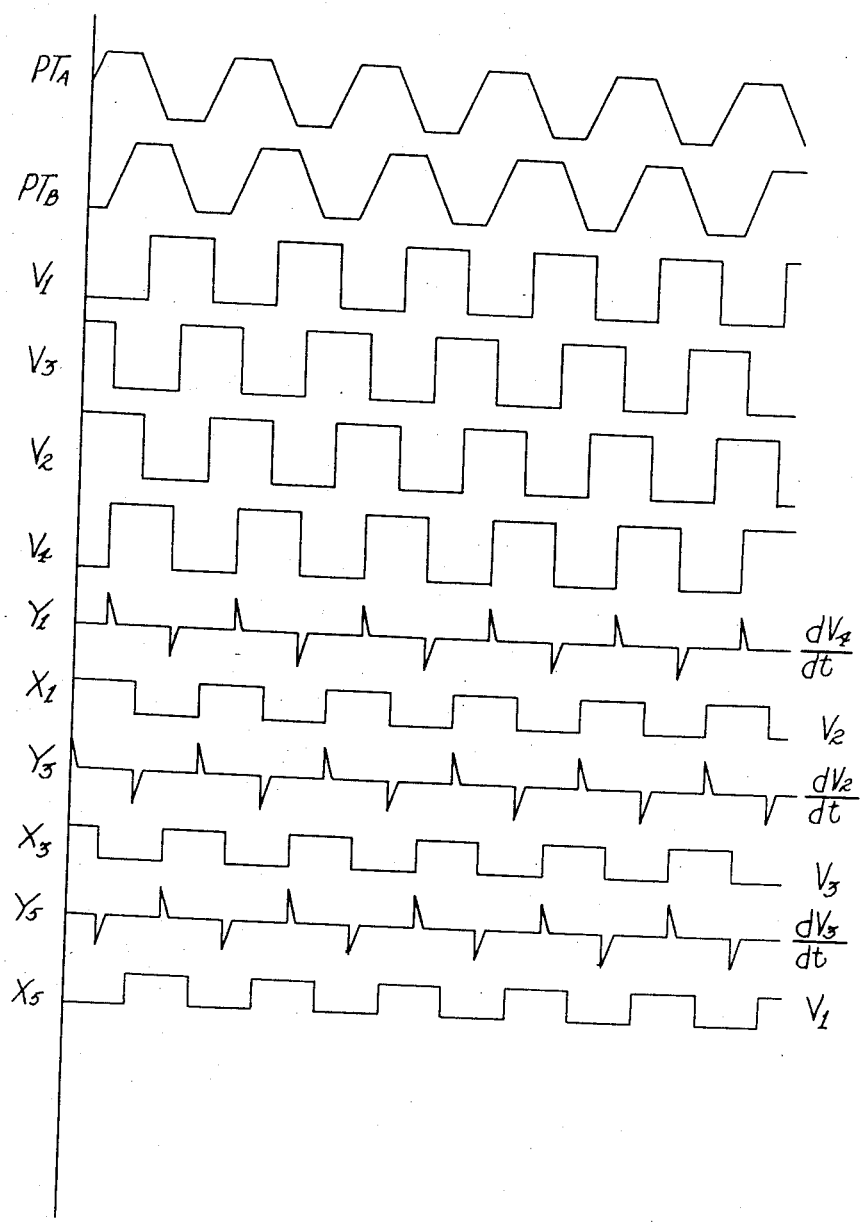

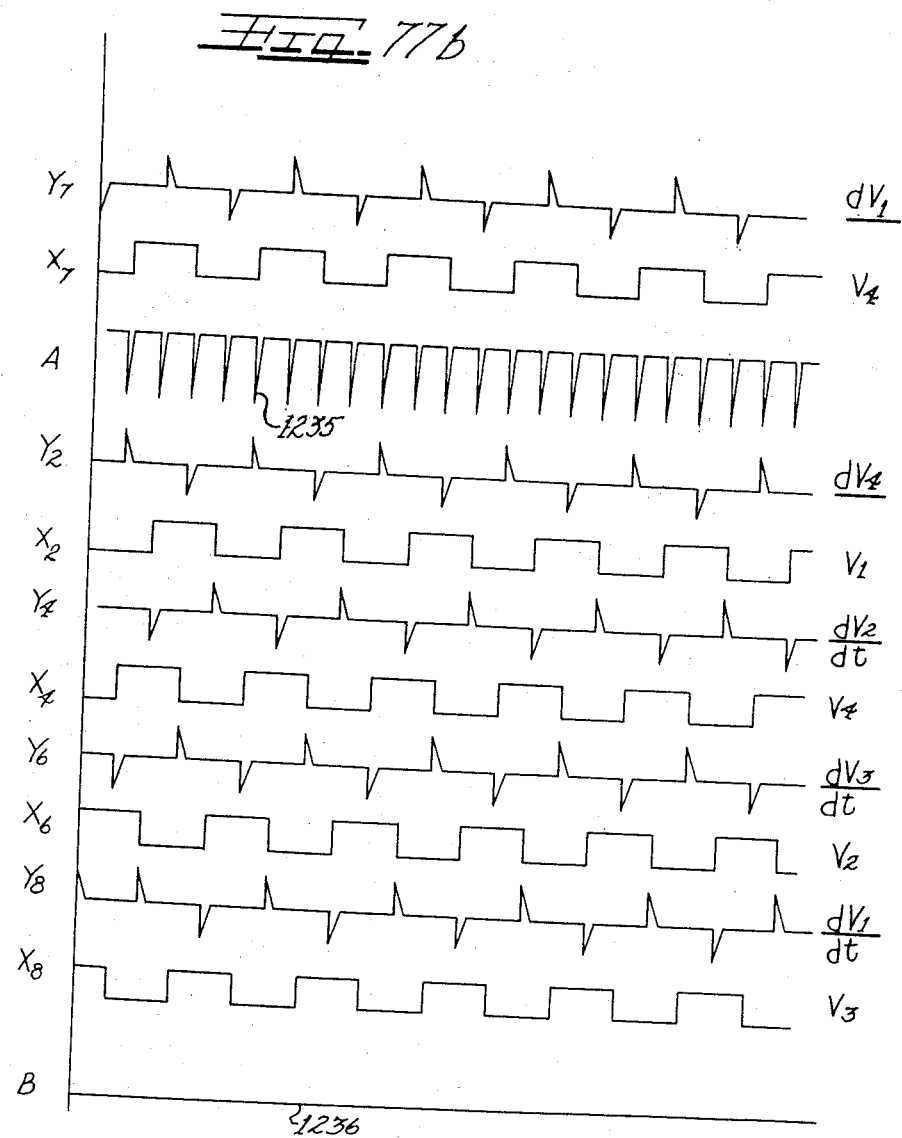

March 10, 1959

D. J. GIMPEL ET AL 2,877,398

SERVOMECHANISM CONTROL SYSTEM

Filed Jan. 10, 1955

Inventors
DONALD J. GIMPEL
WILLIAM A. DAVIDSON

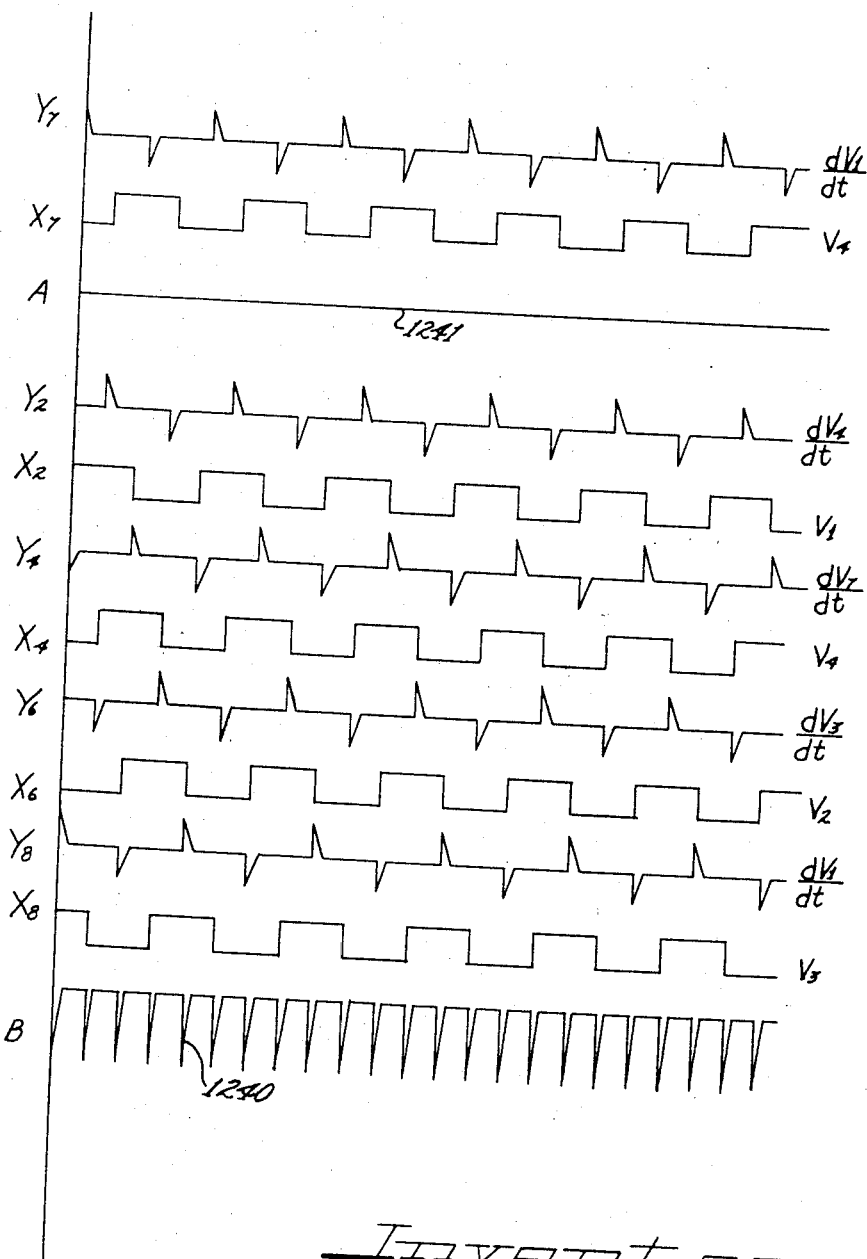

March 10, 1959
D. J. GIMPEL ET AL
2,877,398
SERVOMECHANISM CONTROL SYSTEM
Filed Jan. 10, 1955
44 Sheets-Sheet 37
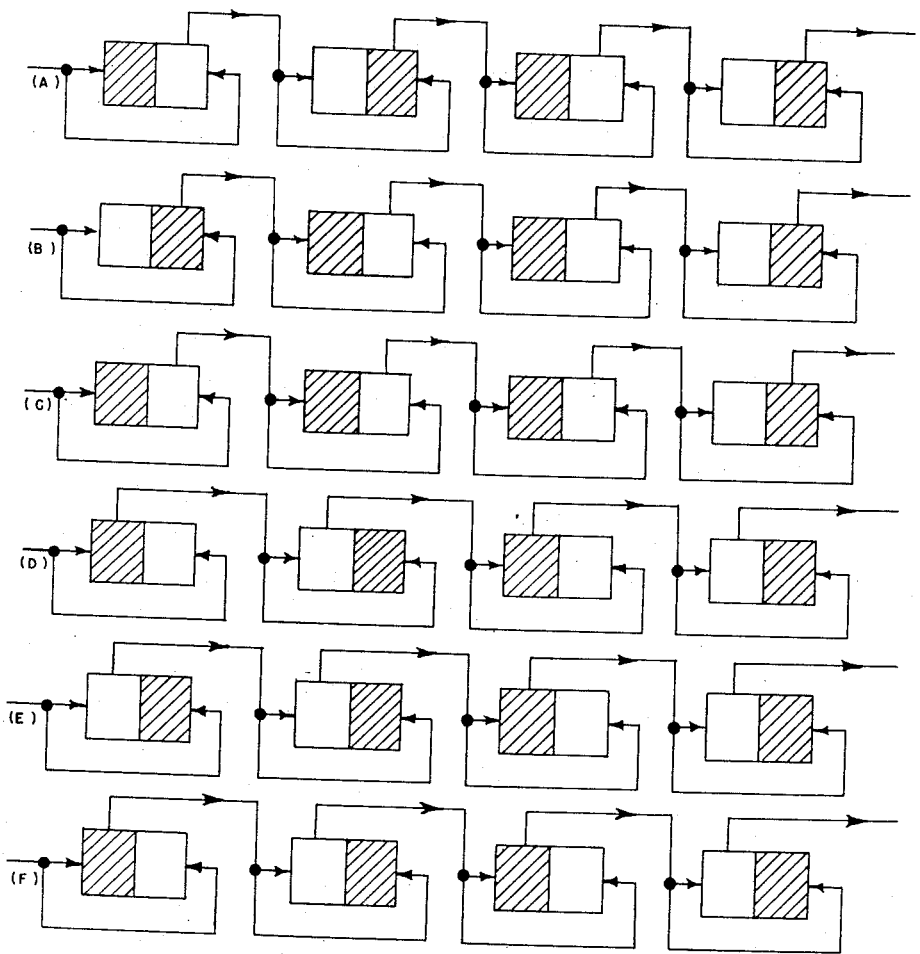
 CONDUCTING SIDE
Inventors
Donald J. Gimpel
William A. Davidson
By Hill, Sherman, Meroni, Gross & Simpson Attys March 10, 1959
D. J. GIMPEL ET AL
2,877,398
SERVOMECHANISM CONTROL SYSTEM
Filed Jan. 10, 1955
44 Sheets-Sheet 38
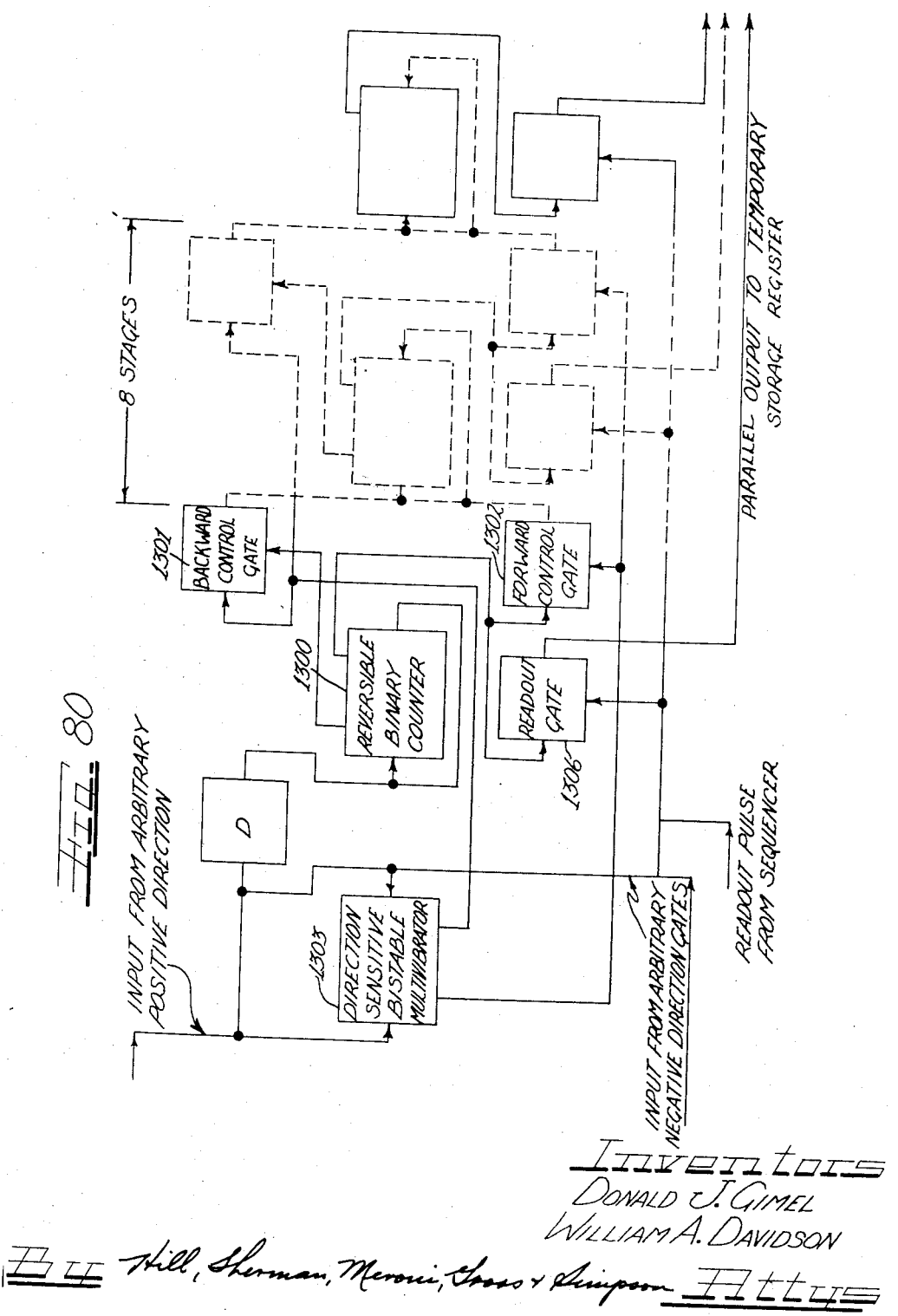

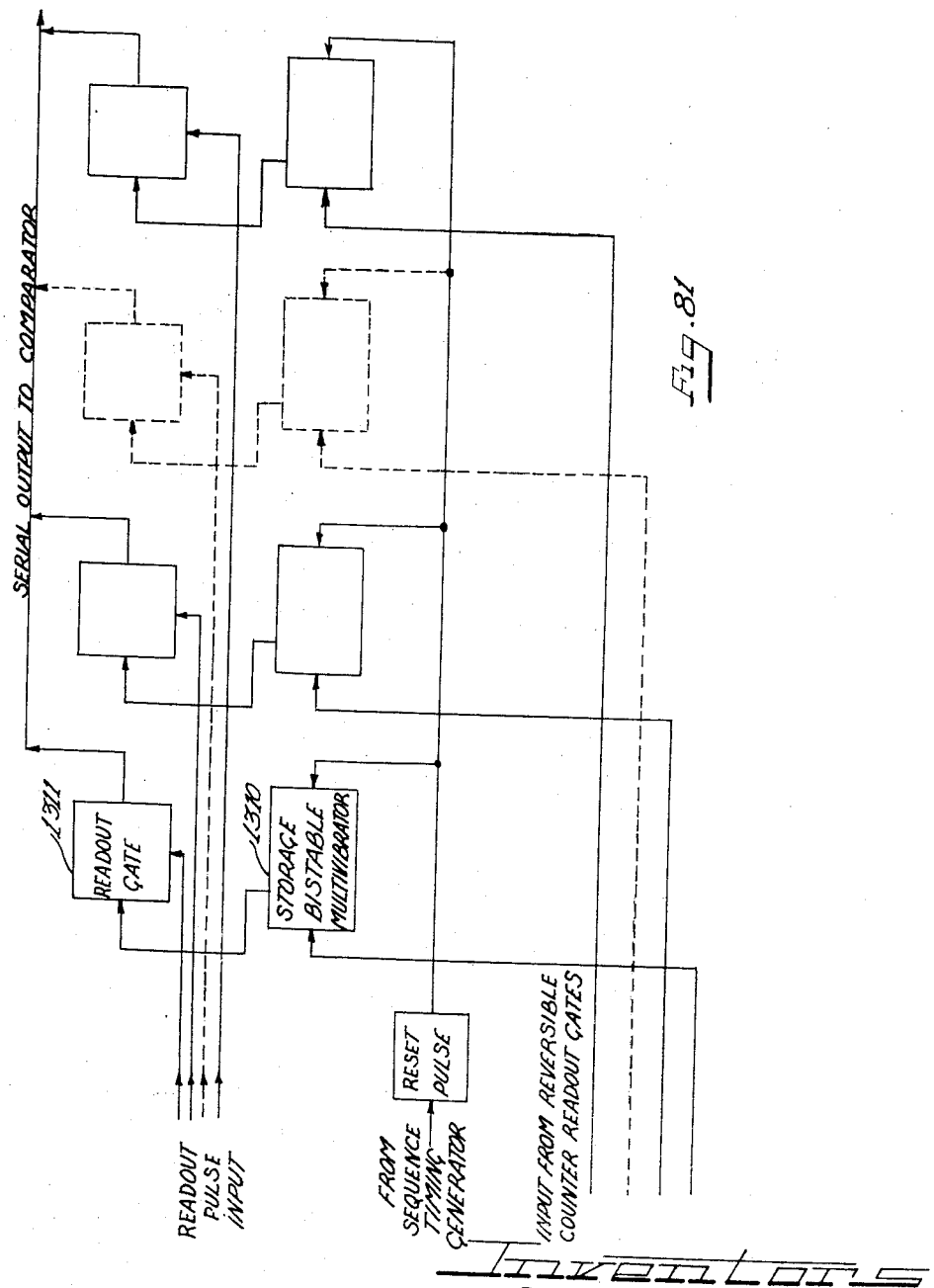

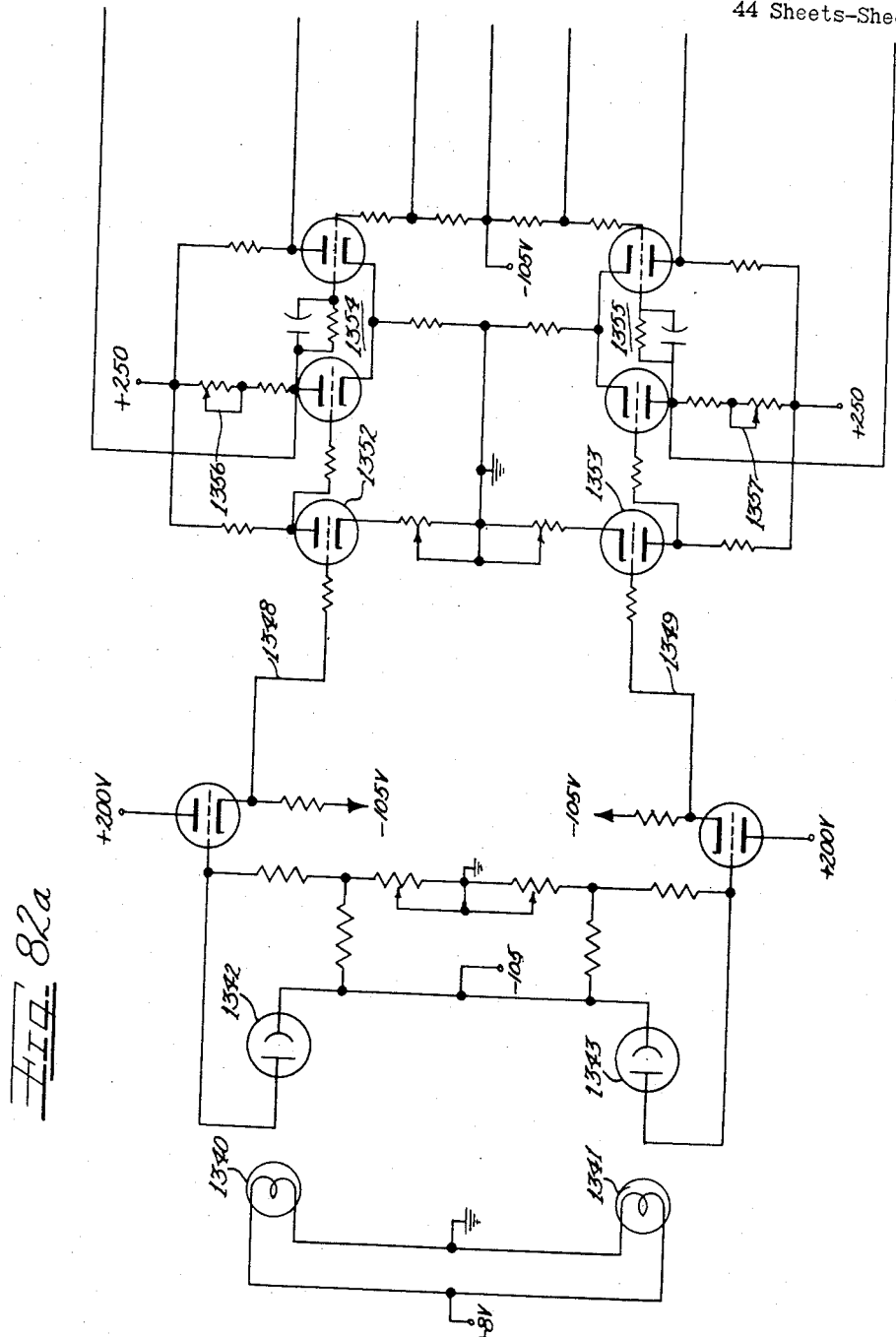

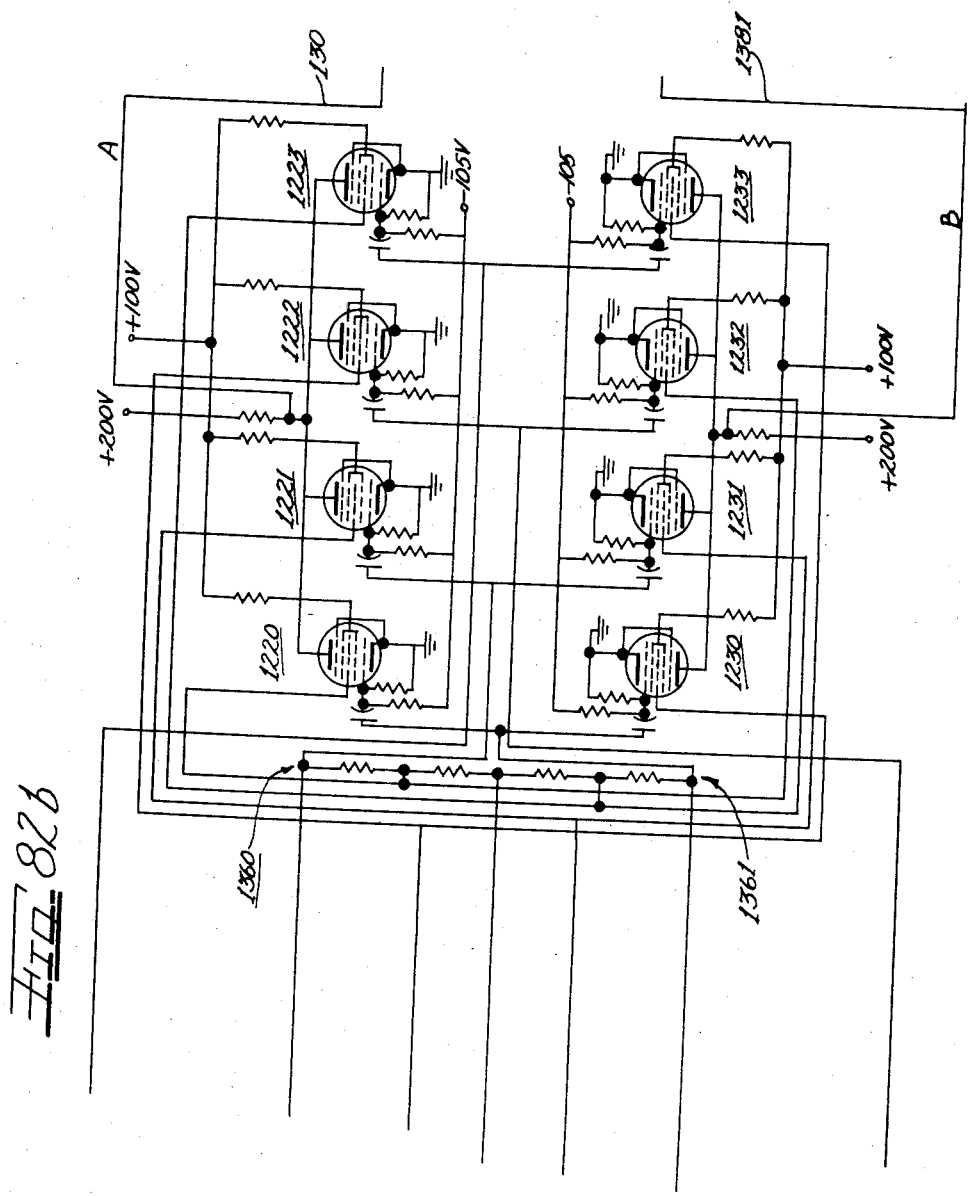

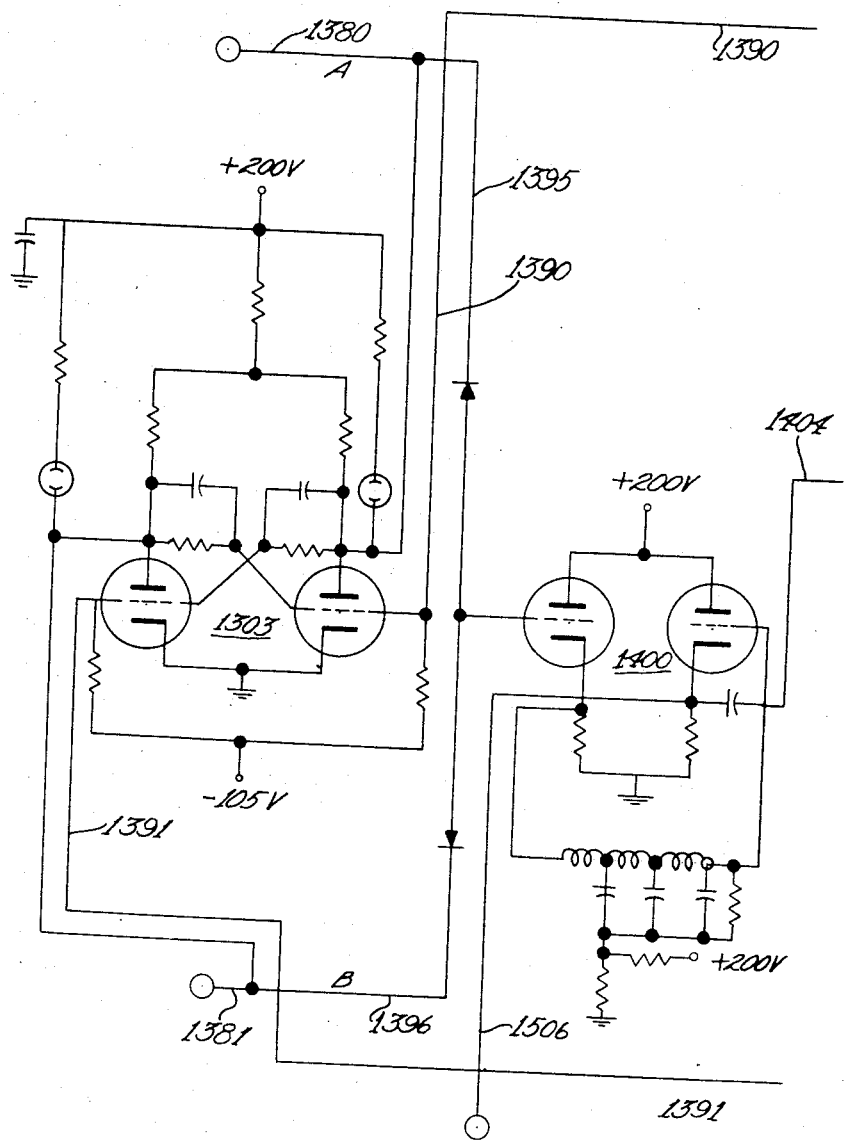

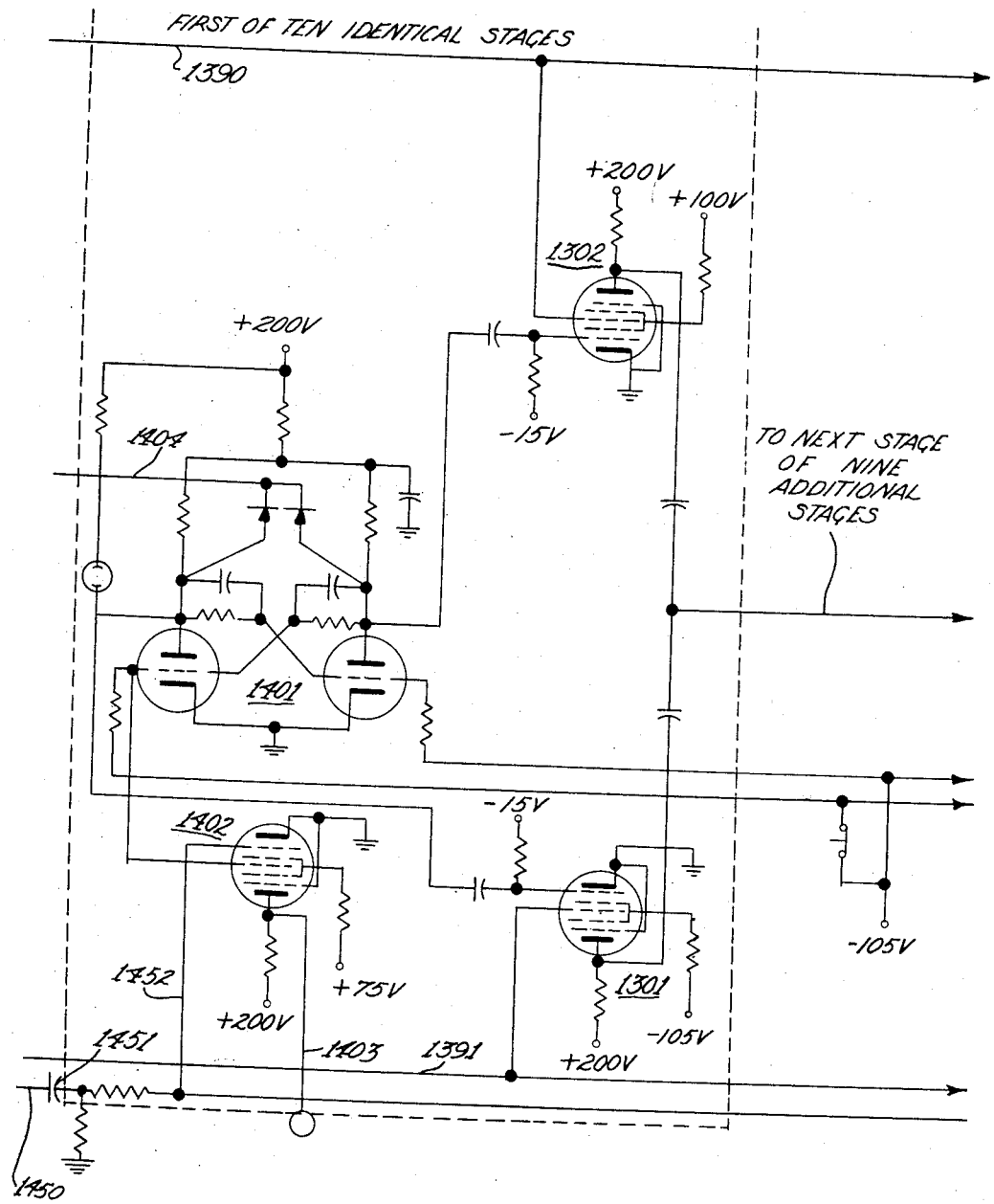

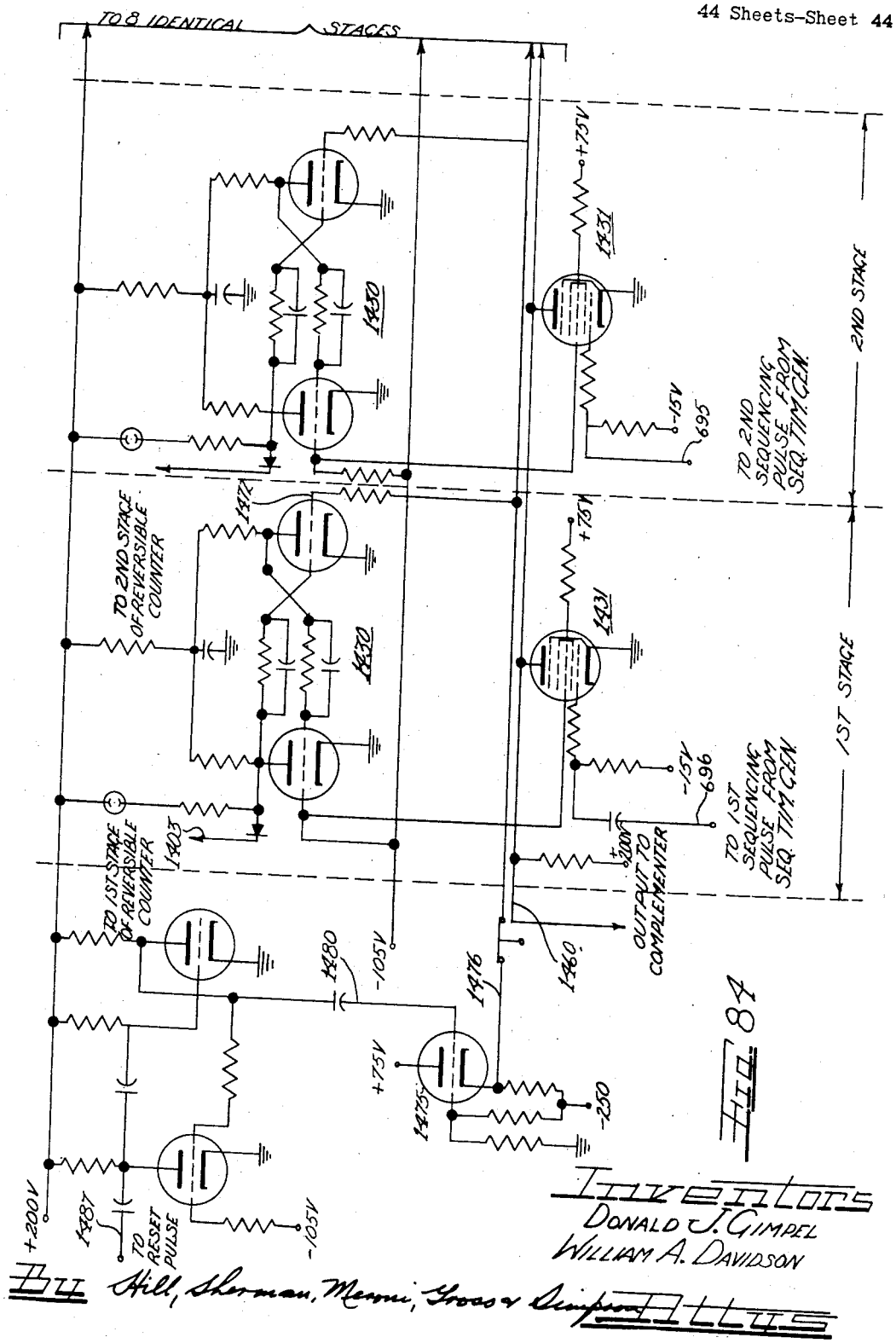

United States Patent Office 2,877,398
Patented Mar. 10, 1959

2,877,398
SERVOMECHANISM CONTROL SYSTEM

Donald J. Gimpel, Chicago, and William A. Davidson, Evanston, Ill., assignors to Armour Research Foundation of Illinois Institute of Technology, Chicago, Ill., a corporation of Illinois Application January 10, 1955, Serial No. 480,702

23 Claims. (Cl. 318—28)

The present invention relates to a servomechanism control system and method.

It is an object of the present invention to provide a novel signal transmission system and method.

It is a further object of the present invention to provide a novel servomechanism control system and method.

It is another and further object of the present invention to provide a novel multiplexed servomechanism control system and method.

A feature of the present invention resides in the provision of a signal transmission system including in combination means for comparing two digital inputs to provide a digital error signal, and means for converting the digital error signal into an analog error signal.

A futher feature of the invention resides in the combination of digital comparing means, digital to analog converting means, and saturating means for providing a saturation signal when the digital error signal exceeds a given value.

It is a still further object of the present invention to provide a novel digital servomechanism system and method and novel components therefor, and to provide a novel multiplexed digital servomechanism system and method.

Othere objects, features and advantages of the present invention will be more fully apparent from the following detailed description taken in conjunction with the accompanying drawings in which:

Figures 6a and 6b illustrate the various symbols utilized in the block diagrams herein and typical wave forms associated with the components symbolized;

Figure 7 is a block diagram illustrating the sequence timing generator for the servomechanism of Figure 1;

Figures 9 through 20 illustrate the wave forms at the points F9—F20 relative to ground in Figures 8a and 8b;

Figure 21 is a block diagram of the inhibitor of Figure 1;

Figure 22 is a detailed circuit diagram for the inhibitor;

Figure 23 is a block diagram of the complementor of Figure 1;

Figures 24a and 24b represent a detailed circuit diagram for the complementor;

Figures 25 through 36 represent the wave forms at points F25—F36 relative to ground in Figures 24a and 24b;

Figure 37 is a block diagram of the adder of Figure 1;

Figures 38a and 38b represent the detailed circuit diagram for the adder;

Figure 39 illustrates the digit rate pulse waveform appearing at point F25 in Figure 24a;

Figure 52 is a block diagram of the saturator of Figure 1;

Figures 53a and 53b represent the circuit diagram for the saturator;

Figures 54 through 67 represent the wave forms at points F54—F67 relative to ground in Figure 53a and 53b;

Figure 68 is a diagrammatic illustration of a clamp circuit which may be utilized in the arrangement of Figure 1;

Figure 69 is a block diagram of the power amplifier and modulator units of Figure 1;

Figure 70B:
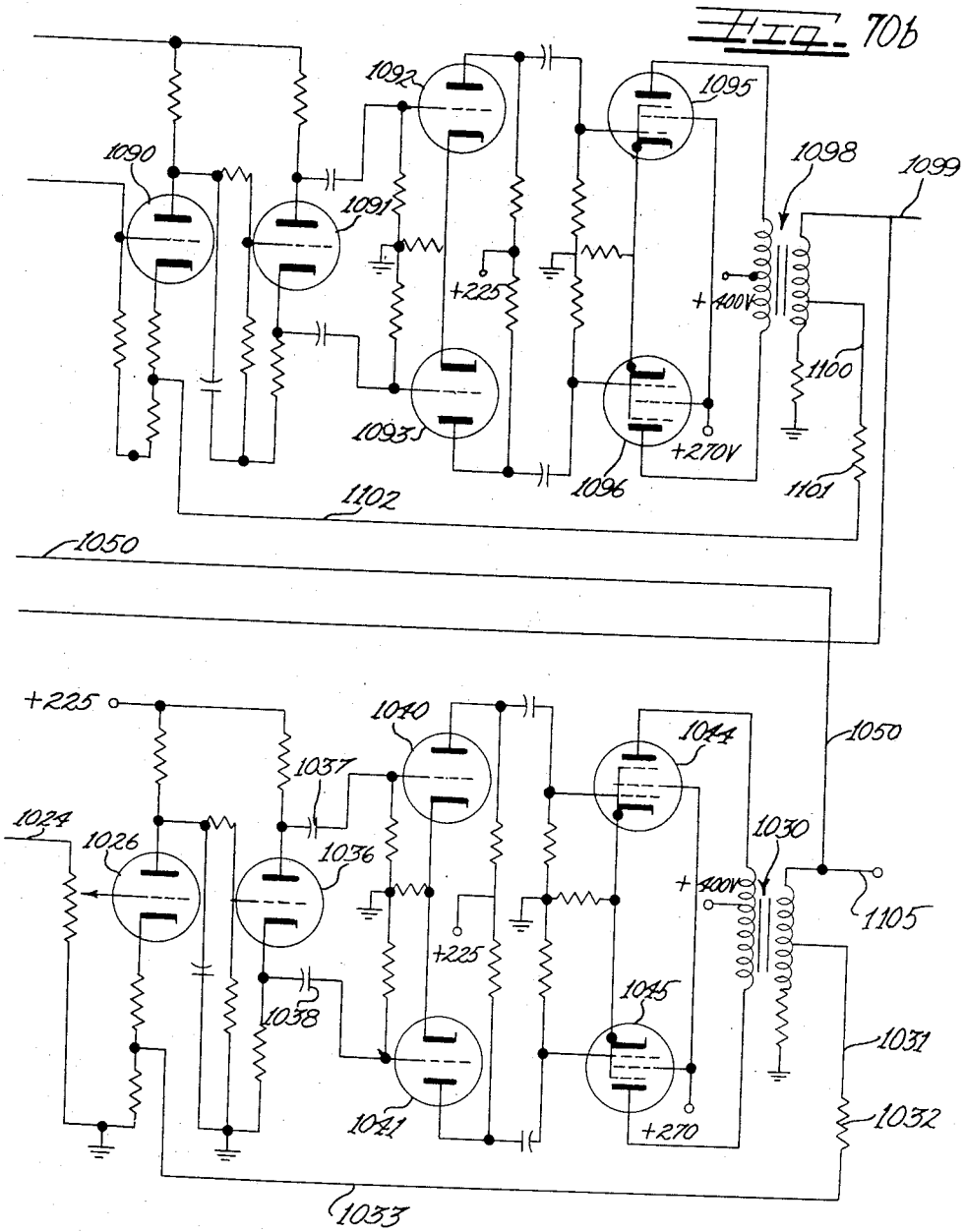
Figure 78A:
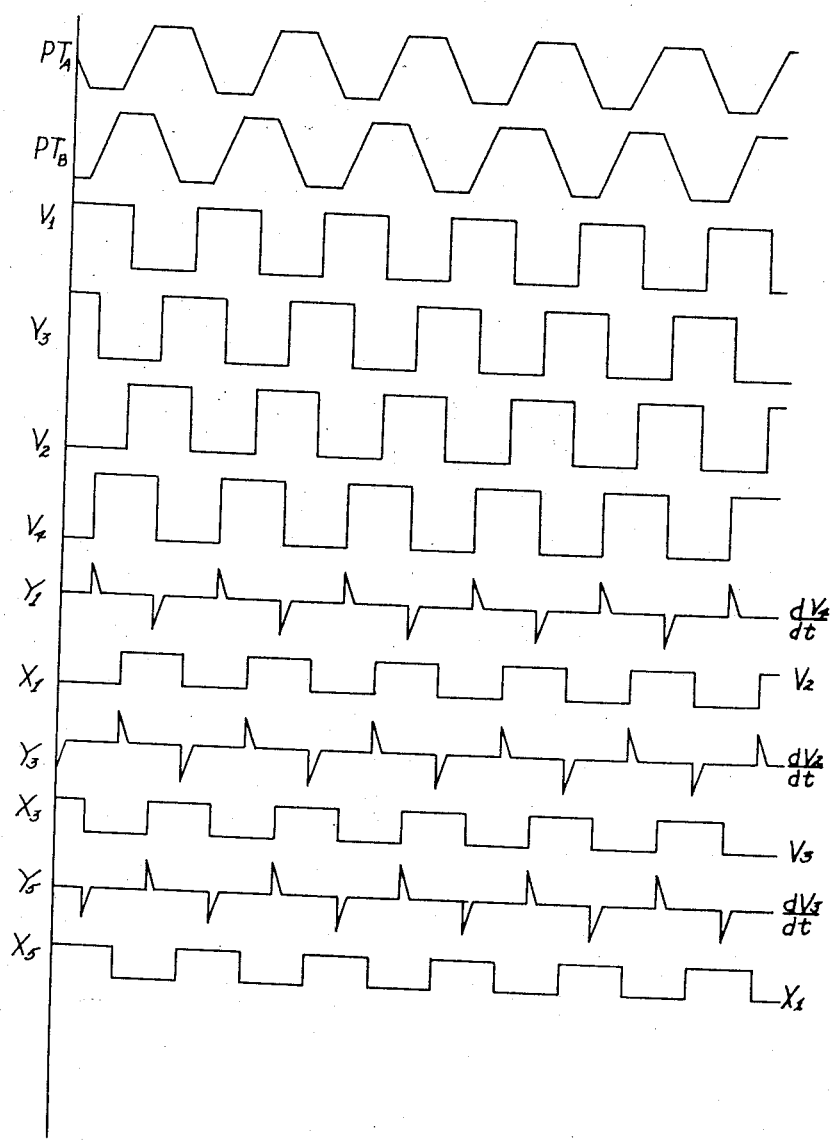

Figures 70a and 70b comprise a detailed circuit diagram of the power amplifier and modulator units;

Figure 71 on Sheet 5 of the drawings is a diagrammatic illustration of a sensor wheel and associated slit apertures for sensing changes in the angular position of the output shaft;

Figures 72 to 75 are diagrammatic views illustrating the operation of the sensor wheel and pickup mechanism;

Figure 76 is a block diagram of the digital sensor pickup and wave shaping and logical circuits for developing a pulse output determined by changes in the angular position of the output shaft;

Figures 77a, 77b and 78a, 78b illustrate the wave forms at various points relative to ground in the block diagram of Figure 76;

Figure 79 is a schematic illustration of the forward-backward counting principle utilized in obtaining a digital indication of the angular position of the output shaft;

Figure 80 is a block diagram of the direction controller, binary forward-backward counter for providing the digital indication of output shaft position;

Figure 81 is a block diagram of the temporary storage for the sensor;

Figures 82a and 82b represent a detailed circuit diagram for the sensor pulse shaping and logical circuits and the sensor pickup unit;

Figures 83a and 83b represents a detailed circuit diagram for the reversible binary counter; and Figure 84 represents a detailed circuit diagram for the sensor register temporary storage.

I. GENERAL ARRANGEMENT

Figure 1:
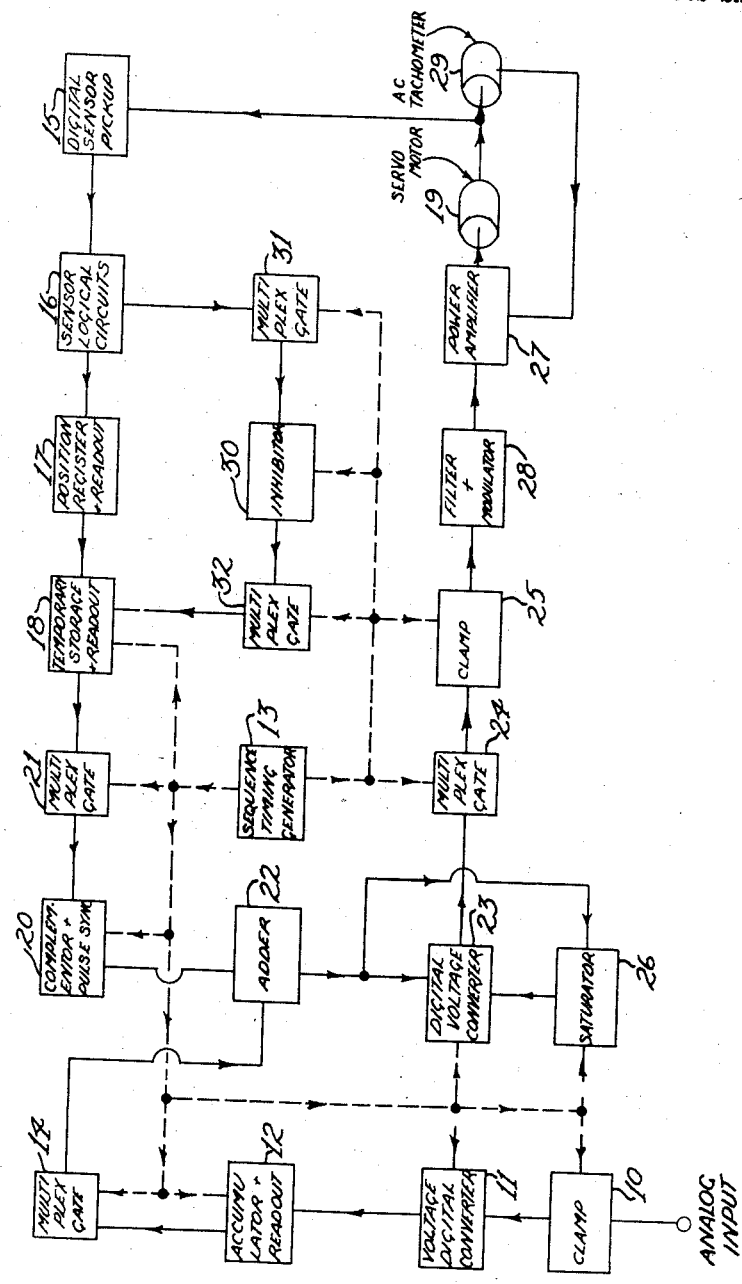
Figure 1 is a block diagram of a servomechanism control system in accordance with the teachings and principles of the present invention.

Figure 1 is a block diagram of a multiplexed digital servo-mechanism embodying the principles and teachings of the present invention. The dashed lines are timing lines from the sequence timing generator while the solid lines show the interconnections from one unit to another.

The input or command signal may, for example, be a continuous analog quantity which is indicated as being applied to the system at the lower left in Figure 1. The command signal is clamped in the component represented by the block 10 in order to obtain a constant signal during the conversion process which follows in block 11. Clamping is necessary to eliminate errors which could result due to high frequency components of the command signal.

In the illustrated system, the voltage input is converted to a digital signal in block 11 and the number corresponding to the command signal appears in the accumulator 12 at the end of the conversion period. The number is read out of the accumulator 12 in sequence, least significant digit first, by means of the read-out gates thereof and the sequencing signals obtained from block 13. The pulses from the accumulator 12, which would correspond to the command signal for a particular servo, pass through an input multiplex gate 14 which allows this number to appear only during a short specified interval in the sampling cycle, thus permitting multiplex operation.

The digital sensor consists of blocks 15, 16, 17 and 18. A continuous absolute, digital, indication of the shaft position of a servo-motor 19 is produced in the register of block 17. This shaft position information forms the feed-back signal for the servo.

The feed-back signal is delivered to a complementor 20 under the control of a feed-back gate 21, and the feed-back signal obtained from the block 20 is added to the command signal at block 22. The output of the adder 22 is then the difference between the command signal and the signal corresponding to the actual shaft position, i. e., the desired and actual positions. This error signal is then decoded in the digital-voltage converter 23 and passed through another multiplex gate 24 and then clamped at 25.

The output of the adder 22 also forms the input to the saturator 26. A saturator is necessary because of the requirements placed upon the digital-voltage converter. One of the functions of the digital-voltage converter in the illustrated system is to act as a high gain amplifier so that power amplifier 27 need not have a large voltage gain. In the present case, one count corresponds to about 0.5 volt. It is desirable to convert over the entire range of possible error signals with at least reasonable accuracy. Since this range may consist of $2^{13}$ quantum levels, it is clear that a compromise is necessary. The compromise that was chosen in the illustrated embodiment was to reduce the conversion range. The term "quantum level" as used herein refers to the smallest sensing increment of a given variable such as the output or the error signal. In the present system, the conversion range was chosen to be 128 quantum levels ($2^7$). Thus, in the present system, the converter cannot detect the difference between the number 0 and 128, 1 and 129, and so on. To eliminate the possible ambiguity the additional unit, the saturator, is required. Thus, the function of the saturator is to insure that the output signal from the converter is the maximum possible if the input signal is greater than a given number and also to insure that the output signal is the minimum possible if the input is less than a given amount.

The analog error signal is then passed through the multiplex gate 24 and held, or clamped at 25 for an entire sample period. The signal then passes through the filter and modulator 28 and the power amplifier 27 to drive the motor 19 (for the illustrated system) or to a valve coil for hydraulic servos. An A. C. tachometer 29 is indicated for providing a feed-back to power amplifier 27.

The function of inhibitor 30 in conjunction with gates 31 and 32 in Figure 1 is to prevent reading the continuous position register 17 while a count is being entered, i. e., when the register is in a state of transition.

It will be understood that blocks 10, 11, 12, 15, 16, 17, 18, 19, 25, 27, 28 and 29 of the illustrated system are required for each output device to be controlled by the system, so that, for example, there might be six of each of these components in a multiplexed servo-mechanism designed to control six output devices. The various gates may also be individual to each output device.

Since the input to the system could just as well be digital as analog, block 11 is not considered to be a component of the digital servo per se, and has not been described in detail herein. A detailed description of a suitable voltage to digital converter may be found in our copending application Serial No. 480,916, filed January 10, 1955, and assigned to the same assignee as the instant application.

Components 13, 20, 22, 23 and 26 may serve the entire multiplex servo-mechanism, with the sequence timing generator 13 serving to sample the input and feed-back signals of each servo in rapid succession.

Figure 2:
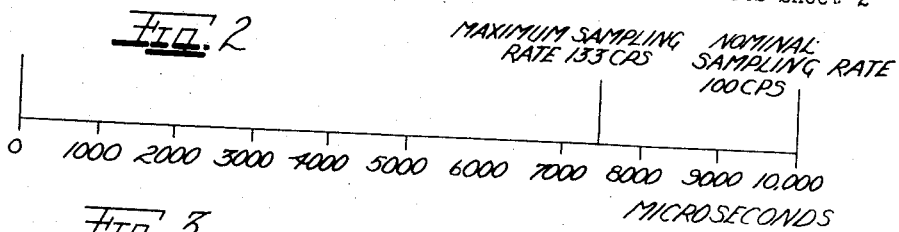
Figure 2 is a timing diagram indicating the maximum and nominal sampling rates for multiplex operation of the servomechanism of Figure 1.

Figures 2, 3, 4 and 5 illustrate the timing of the present system. The maximum sampling rate indicated in Figure 2 is 133 C. P. S. while the nominal sampling rate is 100 C. P. S. The sampling rate can be varied continuously from 50 to 133 C. P. S. and can be easily made lower if desired.

Figure 3:
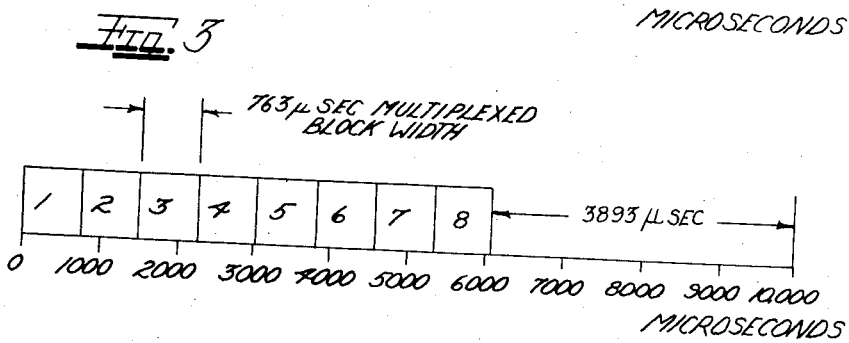
Figure 3 illustrates a multiplex timing diagram for multiplex blocks of minimum width.
Figure 4:
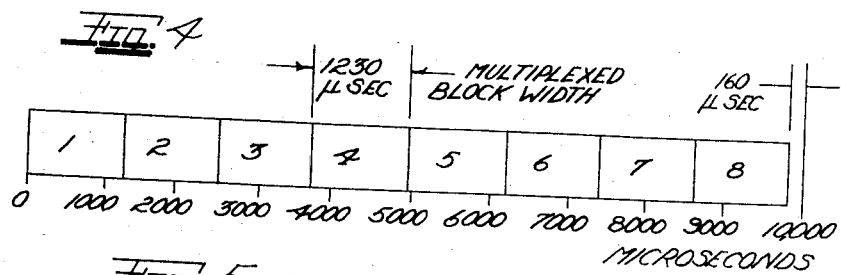
Figure 4 illustrates a timing diagram for multiplex blocks of maximum width.

Figure 3 illustrates the arrangement of the multiplex timing for sampling of eight multiplexed blocks of minimum width or duration. The duration of each sampling period can be adjusted from the minimum time as shown in Figure 3 to any arbitrary maximum dependent upon the sampling rate, as indicated in Figure 4.

Figure 5:
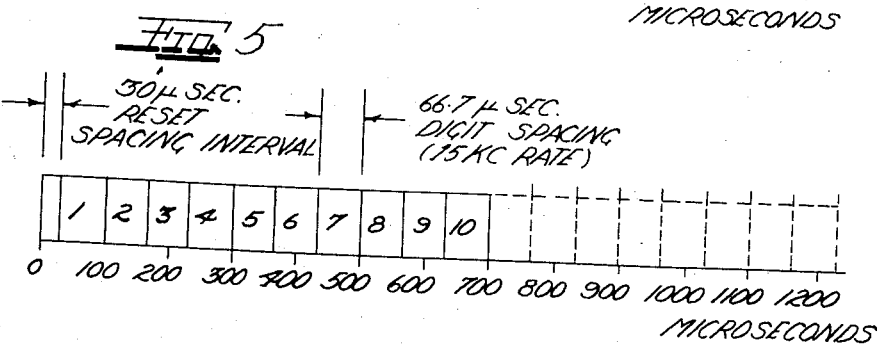
Figure 5 is a diagram illustrating digit timing within one multiplex block.

Figure 5 shows the timing of digits within the multiplexed block. The illustrated system was limited to ten digits by way of example. The digits are delayed approximately 30 microseconds after the block commences. Each digit occupies 66.7 microseconds so that the digits are read at 15 kc. per second. The next block of information can be delayed by up to 8 digit spaces. It is this delay which varies the length of each block as shown in Figures 3 and 4. Thus, each block may be from 763 to 1230 microseconds in length and is variable in steps of 66.7 microseconds.

The number of digits, sampling rate, block length, and digit frequency are widely variable and give great freedom in design.

II. DESCRIPTION OF INDIVIDUAL COMPONENTS

Figure 6B:
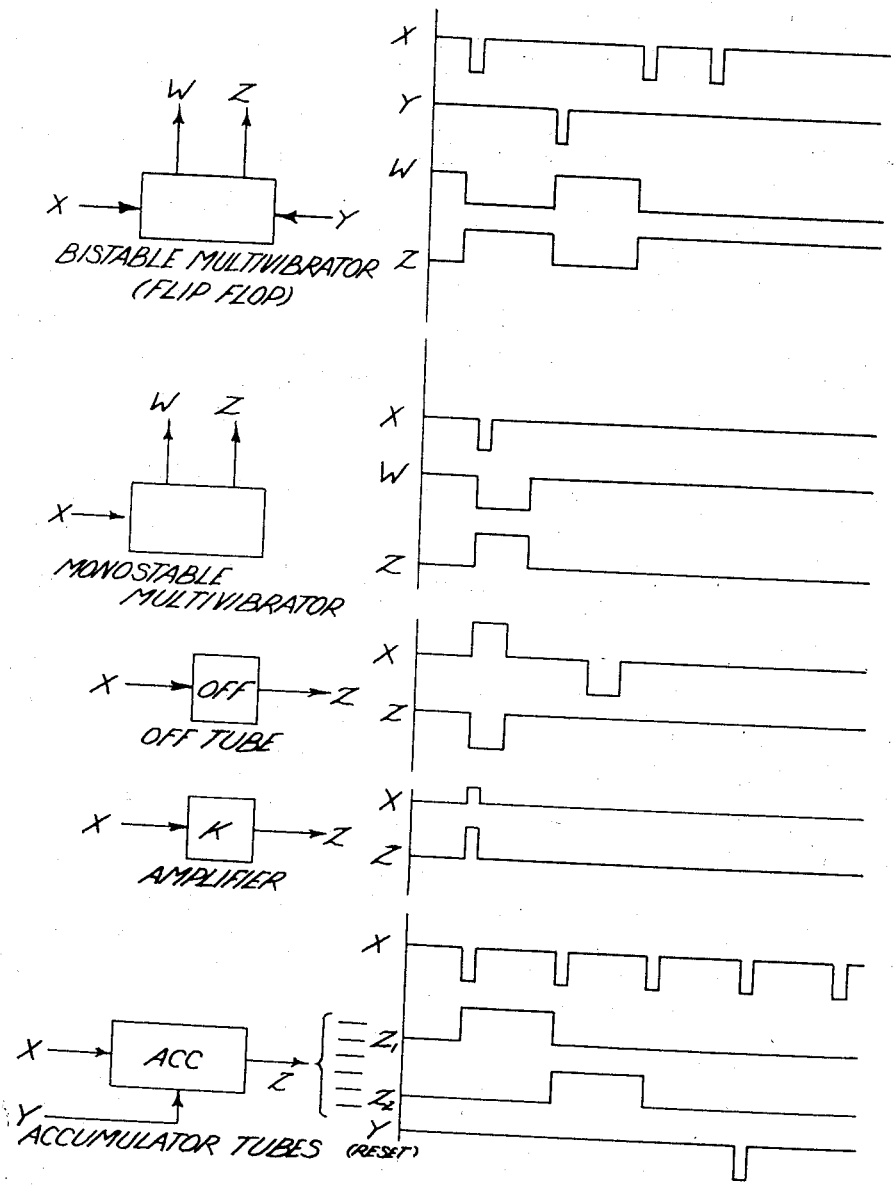

Block or "logical" diagrams are used in conjunction with the description of individual components so that the operation of the system can be understood without reference to the more detailed circuit diagrams. The symbols used in these block diagrams are defined, together with typical waveforms, in Figures 6a and 6b. Since these diagrams are entirely self-explanatory and since they form no part of the present invention, a detailed description thereof is deemed unnecessary.

A. Sequence timing generator

The function of the sequence timing generator is to provide all signals necessary to establish the multiplex and digit timing. In addition to the timing, the generator also provides signals to reset various components. Counting in the sequence timing generator is based upon the use of G10/241E gas counter tubes of radix 10. That is, each tube has ten cathodes which allows sequencing of up to 10 times from one tube. Use of these counting tubes eliminates the use of a 4 stage binary counter with a diode matrix to convert the binary to a decimal count.

As indicated in Figures 2 through 5, the sampling rate, block period and digit rate are variable. The logical diagram shown in Figure 7 illustrates the component blocks of the timing generator. The clock 50 determines the sampling rate, while the clock 51 determines the digit rate. The mono-stable multivibrator 53 establishes the block length and component 54 in Figure 7 provides the delay at the beginning of the block.

A pulse from clock 50 sets the bistable multivibrator 55 into an "on" position such that the "and" gate 56 will pass a pulse if a signal is present on the lower input. The switching action of 55 causes a pulse to pass into gate 56 on the lower input at the beginning of the sequence thus permitting an output pulse which advances accumulator 58 to the first position. The output of gate 56 also serves to actuate delay 54. After a short delay, bistable multivibrator 59 is turned to an "on" position by 54 and thus gate 60 is opened to allow pulses from clock 51 to advance digit accumulator 62. At the 10th pulse, a pulse at the output of off tube 63 causes bistable 59 and accumulator 62 to be reset. Also monostable 53 is triggered, and after a delay a pulse is sent to gate 56 which begins the digit cycle over again with the multiplex accumulator 58 in position 2. When the multiplex accumulator 58 has shifted to its 8th position, a pulse at the output of off tube 64 resets bistable 55 and accumulator 58 and the counting is stopped until another pulse is received from the clock 50.

The outputs of the sequence generator consist of 10 lines from the multiplex clock 50 which permits up to ten information blocks; 10 lines from the digit block 51 establishing the digit sequence; and reset and timing pulses from delay 54, monostable 53, and clock 51.

Figure 8A:
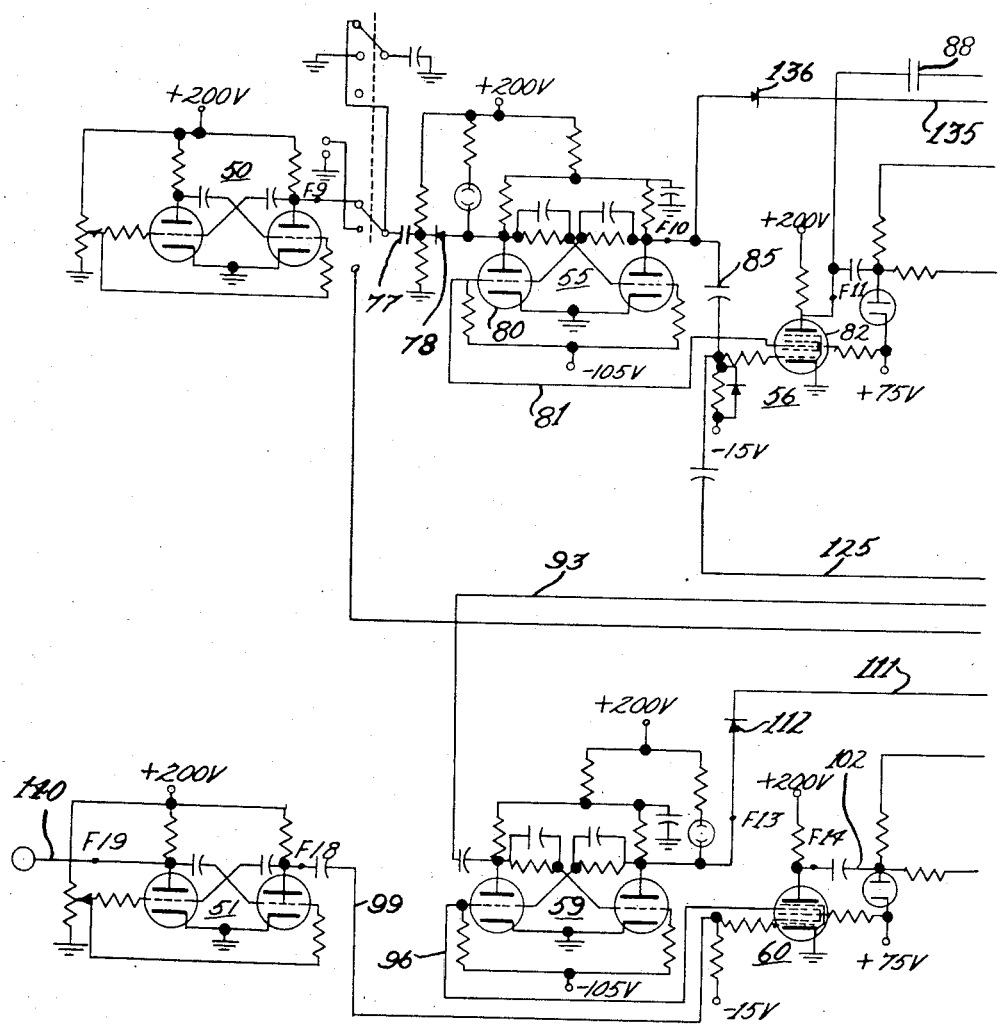
Figures 8a and 8b represent a detailed circuit diagram for the sequence timing generator.
Figure 8B:
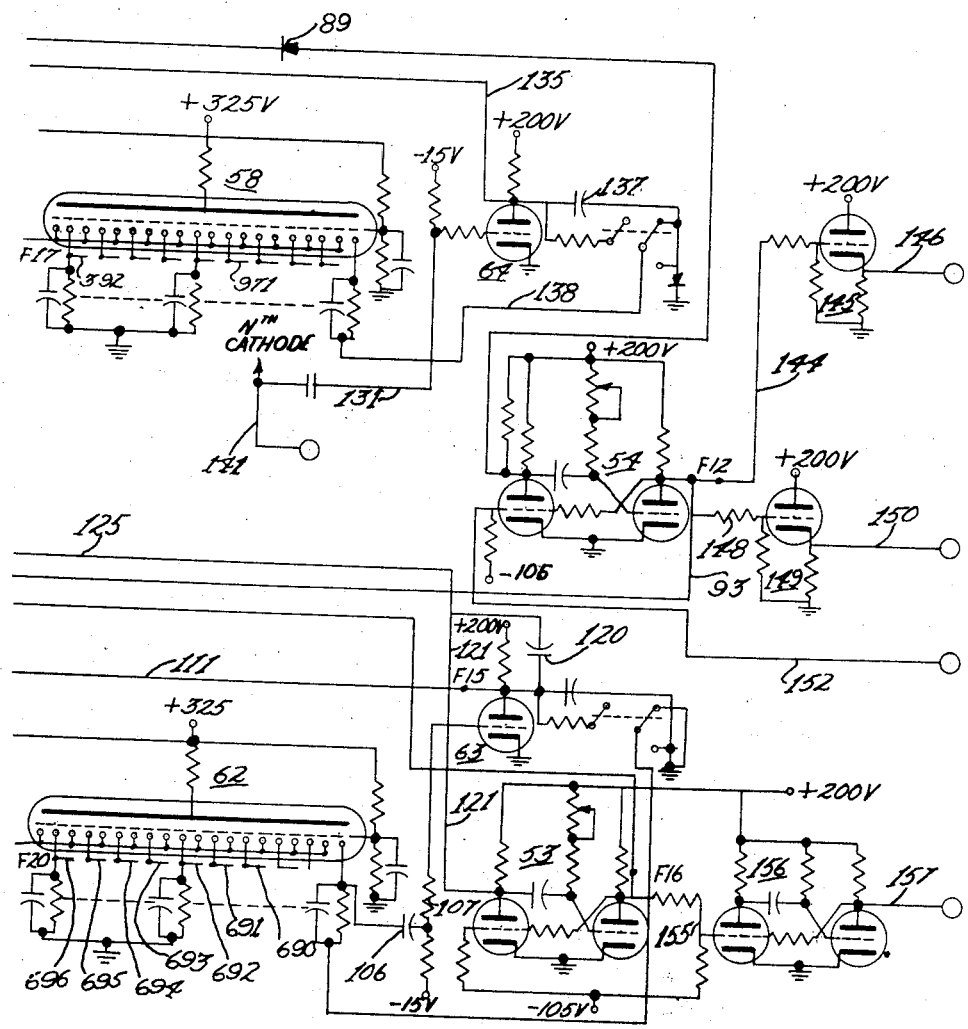
Figure 15:
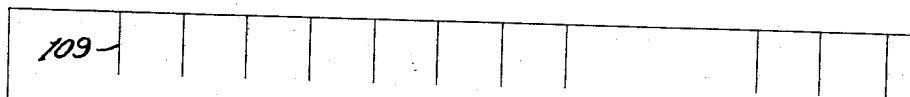

Figures 8a and 8b represents the detailed circuit diagram for the sequence timing generator. Since the circuit components corresponding to the blocks in Figure 7 will be readily identified and understood by those skilled in the art, the components have been given the same reference numerals in Figure 8 as in Figure 7, and a detailed description of the theory of operation of each circuit component in Figure 8 is deemed unnecessary. To give a thorough understanding of the overall action of each circuit component, the waveforms at various points in the circuit of Figure 8 have been indicated in Figures 9 through 20. The points at which these waveforms are taken are identified by the letter F followed by the figure number, thus F9 indicates that the waveform at that point in the circuit of Figure 8 is to be found in Figure 9.

Thus, it will be aparent to those skilled in the art that the clock circuit 50 in Figure 8 is generating generally a square wave as indicated at 75 in Figure 9 having in the illustrated example a frequency of 100 cycles per second. When the voltage at F9 drops as indicated at 75a in Figure 9, a pulse is transmitted to the bistable multivibrator 55 through coupling condenser 77 and rectifier 78 which causes the multivibrator to shift to its "set" position producing an increased voltage at point F10 as indicated at 79 in Figure 10. The voltage on the grid of the first tube 80 of the multivibrator 55 is then applied through conductor 81 to a grid of gate tube 82 of gate 56. Contemporaneously, the pulse 79 produced at F10 is delivered to the lower grid of gate tube 82 through condenser 85. The gate 56 thus passes a pulse 87 as shown in Figure 11 which advances the accumulator 58 to the first position.

The output of gate 56 indicated at 87 in Figure 11 is also transmitted to monostable multivibrator 54 through condenser 88 and rectifier 89 to trigger 54. As indicated in Figure 12, this produces a pulse 91 at F12 which is transmitted by conductor 93 to bistable multivibrator 59. Triggering of bistable 59 produces an output pulse 95 as indicated in Figure 13 and applies a gating voltage to gate 60 through conductor 96. Pulses from clock 51 which are delivered to gate 60 by conductor 99 then appear as pulses 100 (Figure 14) at F14 of the output of the gate 60.

Figure 16:
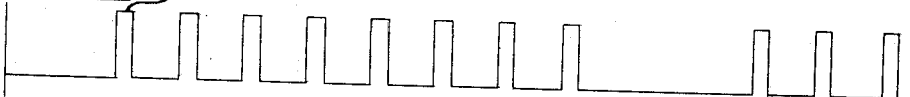

The pulses 100 applied to the digit accumulator 62 through conductor 102 then advance the digit accumulator. As indicated in Figure 8, the 10th pulse delivered to the digit accumulator 62 is transmitted through condenser 106 and resistor 107 to the grid of off tube 63, whereupon a pulse appears at point F15 as indicated at 109 in Figure 15. The pulse 109 is effective to reset bistable multivibrator 59 through conductor 111 and rectifier 112. The digital accumulator 62 need not be reset if it is of a circular nature so that the eleventh pulse at F14 will step the accumulator from the tenth output electrode to the first. Pulse 109 also travels through condenser 120 and conductor 121 to trigger monostable multivibrator 53 which thence produces an output pulse at F16 as indicated in Figure 16 at 122. After a delay, monostable multivibrator 53 returns to its stable condition and triggers gate 56 through conductors 121 and 125. Gate 56 then provides a second pulse 127 at F11 which serves to advance the multiplex accumulator 58 to position 2 and trigger delay multivibrator 54 through condenser 88 and rectifier 89. Triggering of monostable 54 provides a pulse 130 at F12 which after a delay serves to trigger bistable 59 by virtue of the connection of F12 with bistable 59 through conductor 93.

The multiplex and digit cycles continue in this manner until the multiplex accumulator 58 is advanced to the nth position at which time a pulse is sent through conductor 131 to the grid of off tube 64. The off tube 64 then sends a pulse through conductor 135 and rectifier 136 to reset bistable 55 in preparation for a further multiplex cycle when clock 50 sends a pulse 75b in Figure 9 to bistable 55. The pulse from the off tube also is sent through condenser 133 and conductor 138 to shift accumulator 58 to position 10 in readiness for the next cycle.

Figure 17:
Figure 18:
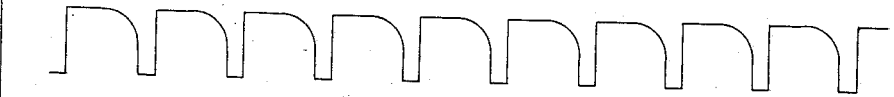
Figure 19:
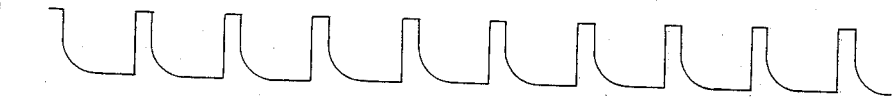
Figure 20:

Figure 17 illustrates the voltage waveform appearing on the first cathode of the multiplex accumulator 58 at point F17. Figure 18 indicates the output of the digit clock 51 appearing at point F18 while Figure 19 indicates the corresponding output of clock 51 at point F19. Figure 20 indicates on an expanded scale the voltage waveform on the first cathode of the digital accumulator 62 at point F20.

Figure 51:
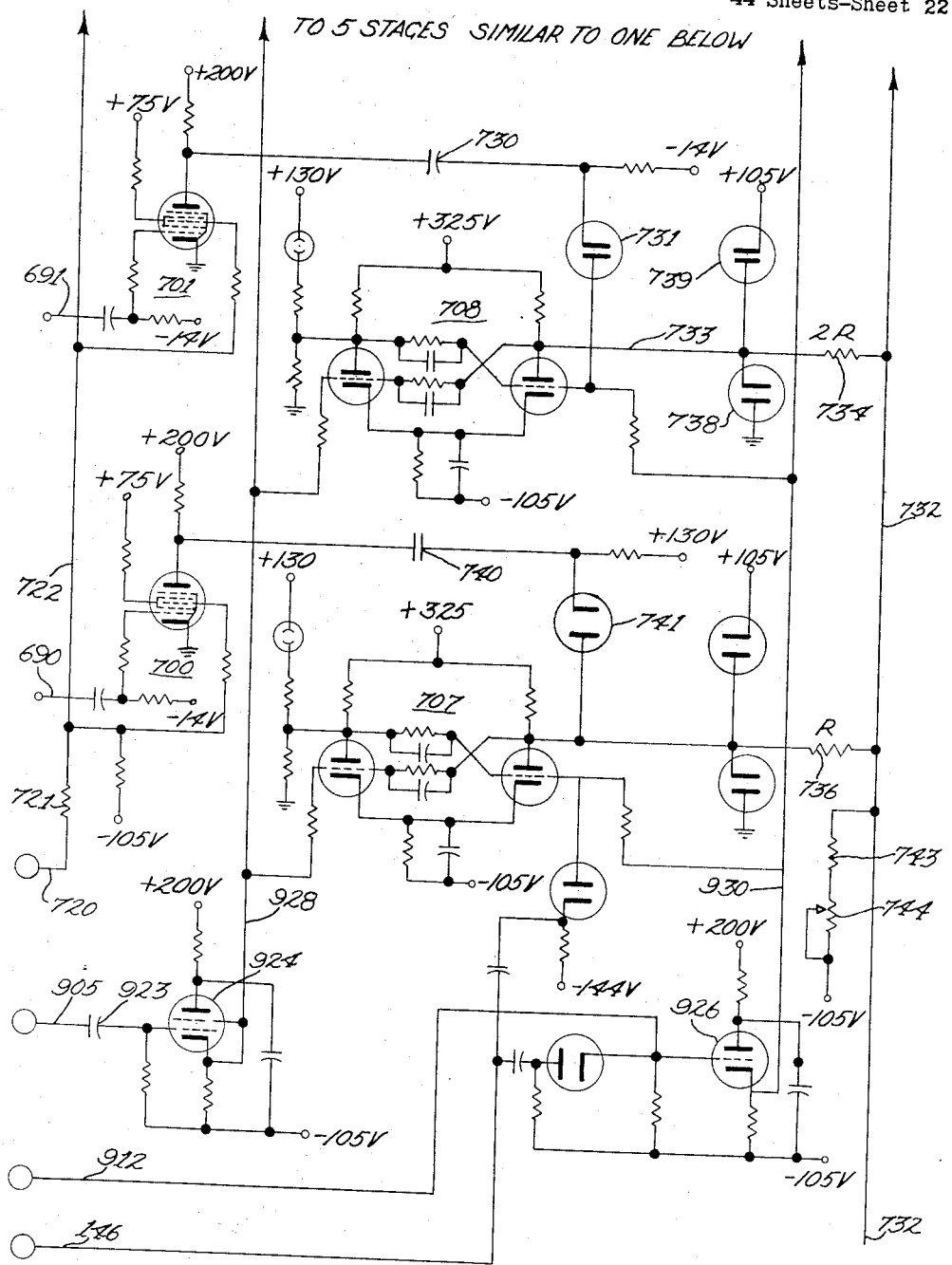
Figure 51 is a schematic circuit diagram for the digital-voltage converter.
Figure 53B:
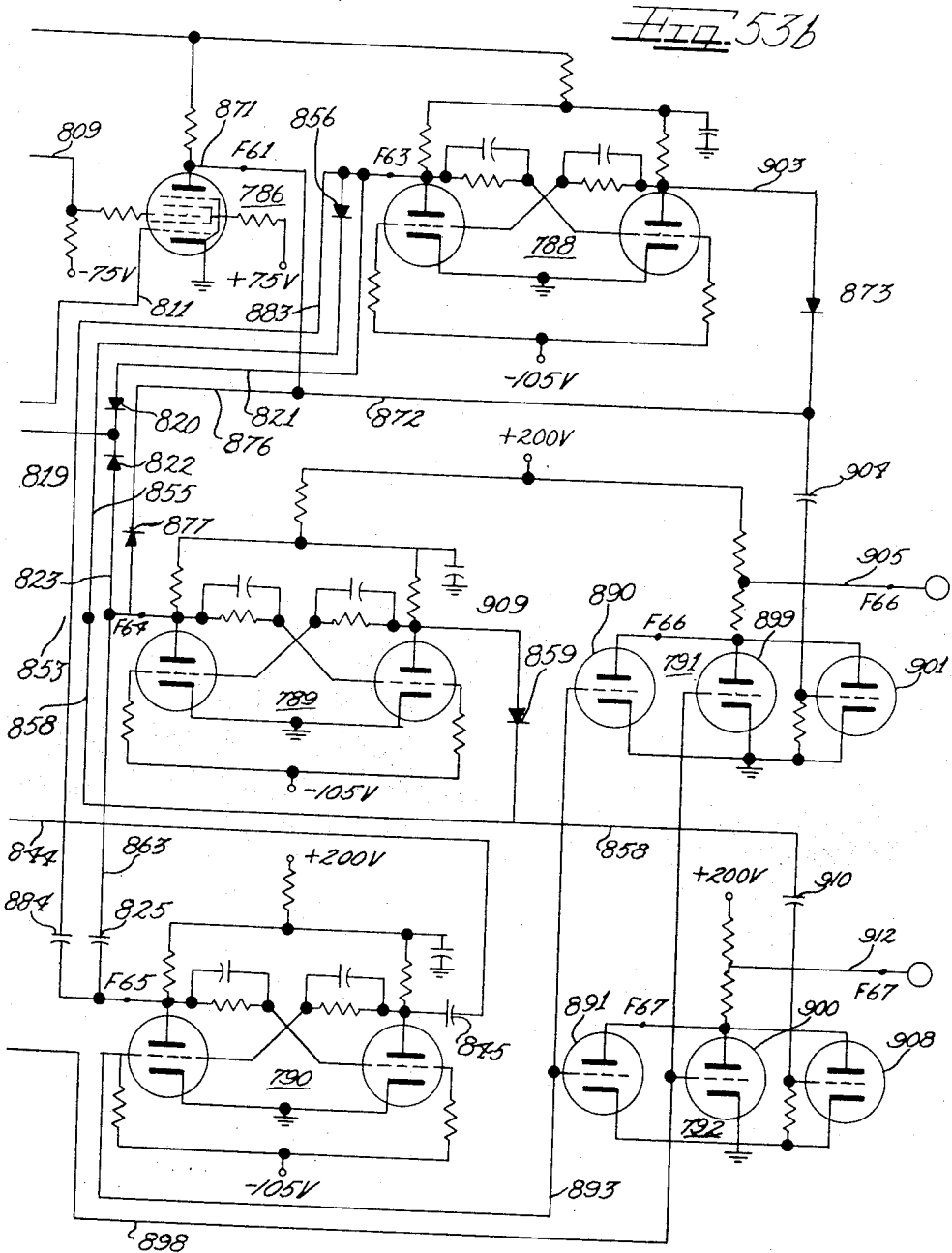

It may be noted that the lead 140 from point F19 of the digit clock 51 leads to the complementor (Figure 24). The output from monostable multivibrator 54 is delivered from point F12 through conductor 144 to a cathode follower circuit 145 and thence by a conductor 146 to the digital-voltage converter (Figure 51). The output also extends through a resistor 148 and cathode follower circuit 149 to an output lead 150 leading to the saturator (Figure 53). A lead 152 from the grid of the first tube of the monostable multivibrator 54 leads to the inhibitor (Figure 22). Conductor 155 connects the plate of the second tube of monostable to delay multivibrator 156 to provide an output pulse at 157 in the eleventh digit position for the saturator (Figure 53) and for the complementor (Figure 24).

B. *Complementor*

In the servomechanism herein described the difference between two binary numbers is obtained in order to determine how far the servomotor 19 in Figure 1 is from the position required by the input at 10. This may be done by designing an electronic circuit based upon the formal rules of subtraction; however, this circuit was found to be unnecessarily complex.

The illustrated embodiment is based upon the addition of the command signal to the complement of the number fed back by the sensor. This may be done in the following three ways.

The first, and most difficult, is to design a circuit which takes the true binary complement (10's complement) of the number. The sum of the true complement (which may be expressed $2^n - N$) and the original number (N) is always zero (when the first $n$ digit positions are considered). The rule for obtaining the true complement is to replace each 1 by 0 and 0 by 1 and then to add 1 to the resultant number. Since additional storage is necessary to add 1 to the number, this method was discarded in favor of hereinafter described method which is carried out by the circuit of Figures 23 and 24. The rules for obtaining the 10's complement by this method are as follows:

(1) Starting with the least significant digit, pass each zero until the first 1.

(2) Pass the first 1.

(3) For each subsequent digit replace 0 by 1 and 1 by 0. This method, it is seen, requires no additional storage.

A further alternative approach which is not illustrated herein would be to obtain the "9's" complement, i. e., simply to replace each 0 by 1 and 1 by 0. This can be done quite readily if the temporary storage at block 18 in Figure 1 is composed of bistable multivibrators, by merely taking the output from the opposite side of each stage. This would eliminate the need for a separate complementor stage.

Another alternative would be the use of an input number at block 12 in Figure 1 that is the complement of the desired programmed number. In this case no complementor is needed but inversion of the error signal must take place in the power amplifier (block 27 in Figure 1) or compensation networks (block 28 in Figure 1). Generally, this is easily done.

Figure 23 represents a circuit for mechanizing the three rules given above for taking the "10's" complement without the need for storage. The method is applied to the sensor output from block 18 of Figure 1. Initially the bistable multivibrator 210 is in the reset condition. Pulses from the sensor (block 18 in Figure 1) are passed through gate 21 only during the proper multiplex period, for example during the period represented by block 1 in Figure 3 or 4. When bistable 210 is in the reset position, pulses are permitted to pass through gate 211 and not through gate 212. Since a zero is represented by the absence of a pulse there is no output until the first 1. The first 1 appearing from gate 21 passes through the gate 211 and also triggers the delay multivibrator 214 which causes bistable 210 to shift to the set position after a one digit delay. Only the first 1 can pass through gate 211 since bistable 210 thereafter closes gate 211. Pulses from the clock generator 51 of Figure 8 are permitted to pass through the gate 212 with bistable 210 in set position and are delayed by component 216. Gate 218 and multivibrator 214 act to allow a clock pulse to pass to component 220 if there is no pulse from gate 21 and to prevent a pulse from passing if there is a pulse from gate 21. As a consequence, zeros from the sensor position register are changed to ones and ones are changed to zeros, after the first one is passed. Gate 14 has the same function as gate 21 in sequencing the input to the adder. Gates 224 and 225 are included so that the two inputs to the adder are in exact synchronism.

Thus assuming the number supplied from the sensor temporary storage were 1001100 or 76 the least significant digit appearing first, the two zeros appearing at the multiplex gate 21 would produce no output pulses from the component 220 to the adder. The first 1 is passed by multiplex gate 21 and by gate 211 and appears at the output of 220. After a delay, component 214 actuates bistable 210 to close gate 211 thus preventing any further pulses from being delivered to the component 220 therefrom and to open gate 212. The following 1 (in the fourth digit position) from the sensor temporary storage serves to close gate 218 through monostable 214 to block the corresponding pulse from the clock generator. The following zero fails to close gate 218 so that a pulse from the block generator appears at the output of 220. It will thus be seen that the number appearing at the output of the complementor will be 0110100 or 52 ($2^7-76$).

Referring now to Figure 24, the detailed circuit for the complementor will be described.

Figure 27:
Figure 28:
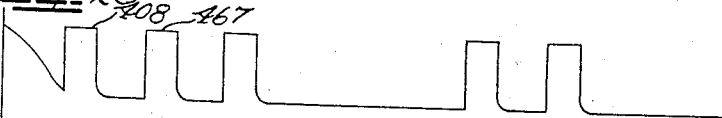
Figure 29:
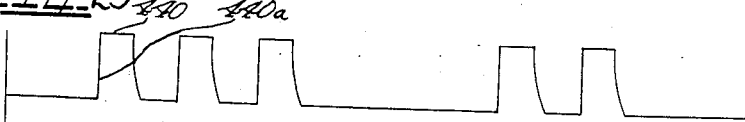

Gate 21 in Figure 24 may, for example, be the first of eight gates which successively receive gating pulses from the respective outputs such as 392 of multiplex accumulator 58 of Figure 8. The waveform appearing at point F27 on conductor 392 from the multiplex accumulator 58 is illustrated in Figure 27. This voltage is applied to a grid of gate tube 401 and to a grid of gate tube 402 to initiate the first multiplex cycle of operation of the complementor. The output of each gate such as 21 would be connected to plate lead 433 to connect the complementor with each of the temporary storage units in succession.

Figure 25:
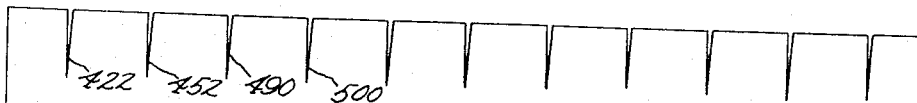
Figure 26:
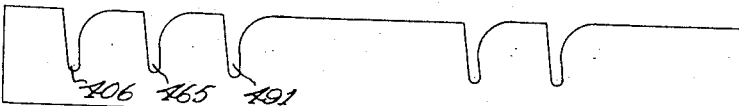
Figure 40:
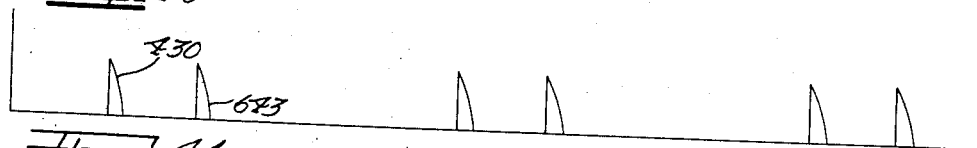
Figures 40 through 49 represent the wave forms at points F40—F49 relative to ground in Figures 38a and 38b.

The input from the first temporary storage block 18 in Figure 1 is illustrated as a conductor 404 having a waveform thereon as indicated in Figure 26. The first pulse 406 appearing at F26 during the presence of the voltage 407 at F27 produces a positive pulse 408 at F28 which in turn produces a pulse 410 at F31 at the output of gate 211. This pulse is conducted by lead 412 to the grid of the "or" component 220. Contemporaneously a pulse is conducted by a lead 140 from the digit rate generator 51 of Figure 8, the waveform being indicated in Figure 25, through conductor 420 and conductor 421 to the grids of synchronizing gate 224 and gate tube 311. The pulse 422 shown in Figure 25 arrives at gate tube 311 contemporaneously with the pulse 410 at F31 to provide a timed output pulse 425 at F35 synchronized with the timing of the pulse 422. The pulse 425 is delivered to the cathode follower tube 427 and appears as a pulse 430 at output conductor 431 as shown in Figure 40.

Figure 30:
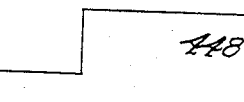
Figure 39:
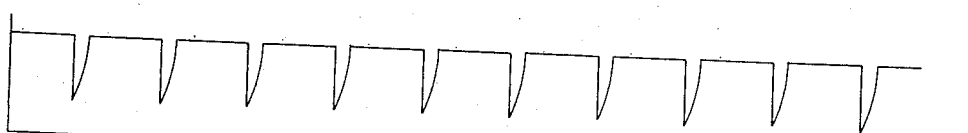

The trailing edge of pulse 408 at F28 also travels through conductor 433, condenser 434, rectifier 435 and condenser 436 to the tube 437 of delay multivibrator 214 cutting off tube 437 for a predetermined period to give the pulse 440 at the plate of tube 437. The leading edge 440a of this pulse 440 serves to trigger bistable 210 through condenser 442 and rectifier 443 making tube 445 conducting. As a consequence the plate voltage of tube 447 drops as indicated at 448 in Figure 30.

Bistable 210 then opens gate 212 through conductor 450 and closes gate 211 through conductor 470. The next pulse 452 appearing at F25 from the clock generator travels through condenser 453 to tube 454 of gate 212 and appears at output lead 456 as a pulse 457 as shown in Figure 32. This pulse travels to the grid of tube 459 of delay multivibrator 216 after a predetermined delay is delivered to gate 218 through conductor 460.

Contemporaneously with the pulse 452 from the clock generator, a pulse 465 is illustrated in Figure 26 as appearing at the input 404 to gate 21. This pulse 465 is passed by the gate 21 and appears at the output 433 as a pulse 467. This pulse is unable to travel through gate 211 because of the voltage applied to the control grid through conductor 470 from bistable 210. The trailing edge of pulse 467, however, triggers delay multivibrator 214 supplying an output through conductor 480 which arrives at gate 218 contemporaneously with the output from delay 216 with the net result that the clock pulse 452 is blocked and no output appears at F34.

A similar operation occurs for clock pulse 490 in Figure 25 and sensor pulse 491 in Figure 26.

In the fourth digit position, there is a pulse 500 from the clock generator but no pulse from the sensor output as illustrated in Figures 25 and 26. As a consequence, the pulse 500 appears as a pulse 501 at the output 456 of gate 212 and produces a pulse 503 at F33. A pulse is then transmitted by lead 460 to the gate 218 and arrives at the gate at a time when the gate is open. Thus a pulse 505 appears at the output lead 506 and a pulse 507 is produced at the output lead 508 as indicated in Figure 35. The pulse 507 will thus appear at the output lead 431.

The output from the voltage digital accumulator is indicated as being supplied to lead 520 in Figure 24 and being synchronized with the digital output of the complementor by means of the synchronizing gate 224 controlled by the clock generator through leads 420 and 421 and delivering its output through lead 522 to multiplex gate unit 14. Multiplexing is controlled at this point by means of a lead 523 leading from the multiplex cathode conductor 392 so that the output from the voltage digital accumulator is passed to the output lead 525 only during the proper multiplex period. The output lead 525 extends through condenser 526 to an output cathode follower 527, the output of the cathode follower tube 527 appearing at conductor 530.

C. Adder

The function of the adder is to add the two numbers obtained from the complementor. The adder logical diagram in Figure 37 shows that the adder consists of two identical "half adders." Two such identical units are required because of possible combinations of digits which result in "carry" pulses which cannot be handled by one half-adder. Two inputs to the logical diagram are indicated. These inputs go both to the "or" gate 600 and the "and" gate 601. If there is no signal present on either input, both 600 and 601 remain inoperative. If a signal is present on only one of the input lines, then it is passed through 600, delayed by 603 and forms one of the inputs to 604. If there is a signal present on both lines simultaneously, then both gates 600 and 601 are activated. The pulse from gate 601 triggers the monostable multivibrator 605, thus cutting off gate 604 before a signal is received from delay 603. The pulse from 605 also triggers monostable multivibrator 607. The outputs of 607 and "on" tube 608 form the inputs to the second half adder. The combined delay of 605 and 607 is equal to one full digit spacing, 66.7 microseconds.

If there is a "0" on both inputs, there is no output of the first half adder provided that there were no previous inputs. If the input is "0, 1" or "1, 0" and there is no previous "carry" pulse, then the output is "1" from the "on" tube 608 and "0" from 607. The "1" from tube 608 then simply travels through 612, 613 and 614 to the output.

If the input is "1, 1" then the signal from the "on" tube 608 is "0" due to blocking of gate 604 by monostable 605, and there is a carry pulse, i. e., 605 and 607 in effect store a pulse for a full digit period. Reference to the second half adder shows that if 610 is activated by a "1" from "on" tube 608 and a carry pulse from 607 it serves to trigger 607 after a delay. The required delay is equal to that of 605 since the time delays of 607 and 610 must add up to one full digit period. The output of the adder serves as the input to the digital-voltage converter and the saturator.

Describing the action of the adder in more detail, if there is a pulse on both input lines to the adder, a pulse travels through 600, 603 and is blocked at 604. A pulse also travels through 601, 605, 607, 612 and delay 613 and thus appears at the input of 614 after a one digit delay (due to 605 and 607). Thus if there is no input on a further digit cycle the carry 1 pulse appears at the output of 614. However, if there is an input on one of the leads to the adder during the second digit cycle the pulse will travel through 600, 603, 604, 608 and will coincide with the output from 607 to obtain an output from 615 which is supplied to 610 and is effective to block the output from 614. In this case monostable 610 furnishes a carry pulse by triggering 607.

If on the second digit cycle there is an input on both leads to the adder in addition to the carry pulse, a pulse will travel through 600 and 603 and be blocked at 604, while a further pulse will travel through 601 and be delayed in 605 and 607 to allow the previously stored carry 1 pulse to be delivered to the output of 614, a similar carry 1 pulse being available on the third digit cycle.

Figure 41:
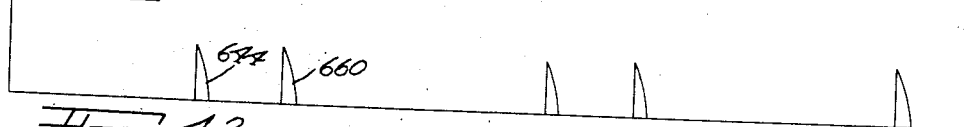
Figure 42:
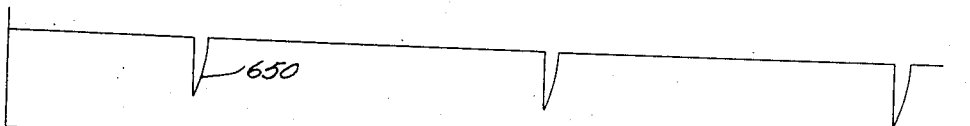
Figure 44:
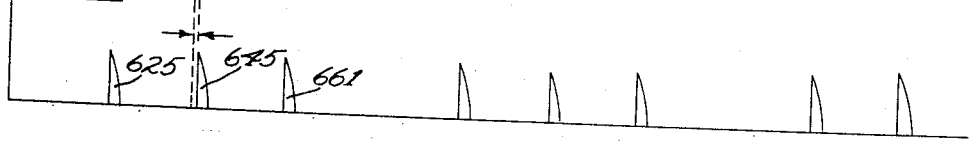
Figure 45:
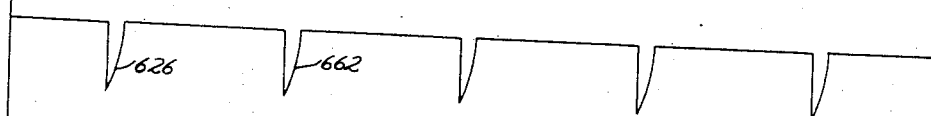
Figure 49:
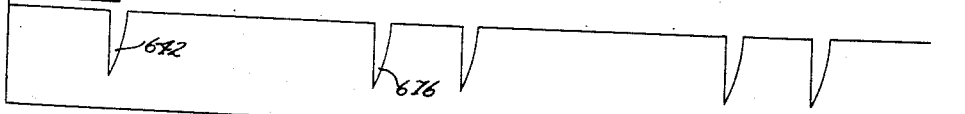

Figures 38a and 38b represent the detailed circuit diagram for the adder. Assuming that the digital input represented by the pulses in Figures 40 and 41 are applied to conductors 431 and 530, respectively, the pulse 430 arrives at the input lead 431 at a time when no pulse appears at lead 530. The pulse 430 travels through condenser 620 and rectifier 621 to the grid of "or" tube 600, from which it travels through condenser 623 and delay 603 to a first control grid of gate 604. The pulse 625 in Figure 44 represents the waveform of the pulse at point F44. Pulse 625 produces a pulse 626, Figure 45, at the output of gate 604 since the monostable multivibrator 605 normally holds the gate 604 open through conductor 629. Pulse 626 travels through condenser 630 and through "on" tube 608 and appears at the output lead 631 of the "on" tube. Since there is no output from the lower part of the first half-adder, there will be no output at F47 due to pulse 626; however, pulse 626 travels through condenser 633 and rectifier 634 to the grid of "or" tube 612. The pulse then travels through condenser 636 and delay 613 to the lower control grid of gate 614. Since the monostable 610 normally maintains gate 614 open through lead 640, the pulse appears at output lead 641 as a negative pulse 642 as indicated in Figure 49. The adder has thus executed the operation 1+0=1.

Figure 43:
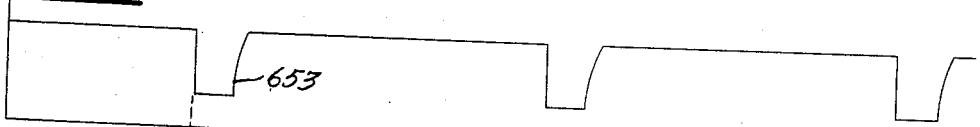
Figure 46:
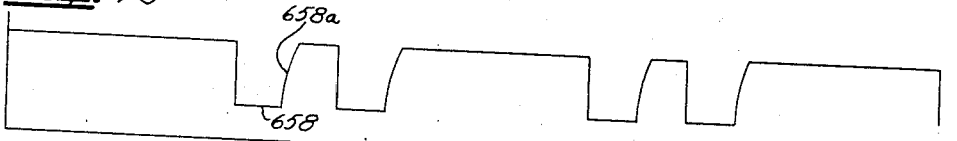
Figure 47:
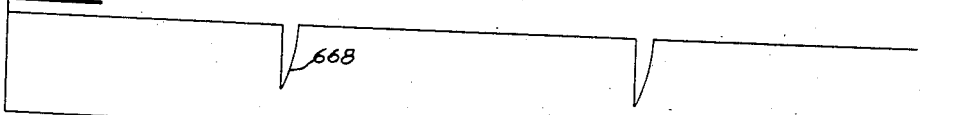

If now an input pulse 643 appears at input lead 431 and an input pulse 644 appears at input lead 530 of the adder, the input pulses produce a pulse 645 at F44 after a delay at 603, for example of 2 microseconds. Input pulses 643 and 644 travel through condensers 647 and 648 and arrive at the control grids of "and" gate 601 simultaneously to produce a pulse 650 at F42 which travels through condenser 651 and triggers monostable 605. Triggering of monostable 605 closes gate 604 through conductor 629 and prevents passage of pulse 645 through gate 604. As a consequence there is no output at F45 of gate 604. The waveform at F43 on monostable 605 is indicated at 653 in Figure 43. The trailing edge of the positive pulse produced at output lead 654 of monostable 605 travels through condenser 655 and conductor 656 and triggers monostable 607, the waveform at point F46 being indicated at 658 in Figure 46. The positive pulse provided by the trailing edge 658a at F46 is delivered to the "or" tube 612.

It will be observed that if there were no pulse on line 631 at the instant of the trailing edge 658a, the pulse 658a would be blocked at gate 615, but would travel through "or" tube 612 and appear at the output lead 641 as a carry 1 pulse. This is the operation 1+1=0, carry 1.

Figure 48:
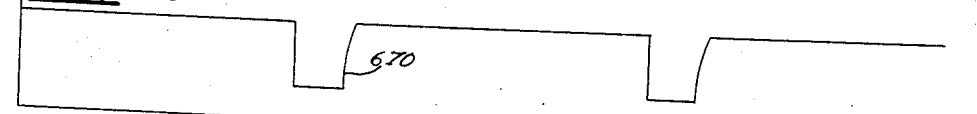

However, since a further pulse 660 is introduced at input 530 on the next digit interval, this pulse appears as a pulse 661 at F44, as a pulse 662 at F45 and appears as a positive pulse at lead 631 at a time generally coincident with the trailing edge 658a. Accordingly the positive pulse from 631 travels through condenser 664 to the lower control grid of "and" gate 615, while the positive pulse due to trailing edge 658a travels through conductor 665 and condenser 666 to the second control grid of gate 615 to produce an output pulse 668 at F47. The pulse 668 triggers monostable 610 to provide a waveform as indicated at 670 in Figure 48 at point F48 and to cut off gate 614 through lead 640 before a pulse can reach the gate from "or" tube 612 and delay 613. Accordingly, there is no output at F49 of gate 614 corresponding to the input pulse 660. This illustrates the operation 1+carry 1=0, carry 1. The carry pulse is delivered from the output of monostable 610 through condenser 671 and conductor 672 to the input of monostable 607. The delay introduced by monostable 610 together with monostable 607 is one digit interval, and after the one digit delay the carry pulse is delivered through lead 665 and condenser 674 and rectifier 675 to the input of "or" tube 612 to appear as an output pulse 676 at F49 in the absence of any further input pulses at 431 or 530, this being the case illustrated in Figures 40 and 41 at the fourth digit position. This is the operation 0+carry 1=1.

For the operation 1+1+carry 1=1, carry 1, the output of "or" tube 600 is blocked at gate 604, while the output of "and" tube 601 is delayed 1 digit period. Thus the previous carry 1 from 610 and 607 gives a "1" at output 641 while the output of "and" tube 601 provides the carry pulse.

D. *Digital-voltage converter*

If a digital-voltage converter were used outside the servo loop for decoding digital program information and operating a continuous servo, a very wide range converter would be required. However, by placing the converter within the servo loop, the required range of conversion is reduced. In this case, conversion was limited to $2^7$ (128) quantum levels.

Conversion in the current adder type decoder is based upon the voltage developer by the currents added in a resistance network. For decoding $n$ digits, the resistance network consists of $n$ resistors which connect $n$ inputs to a common output. Normally all input voltages are maintained at zero; but when a digit is present on an input line, the voltage at the corresponding input to the resistance network is raised to a stable reference voltage. The circuit is arranged so that the output voltage is proportional to the sum of the values of the individual digits.

In the most straightforward approach to this current adder type decoder, all the $n$ resistances in the network are made equal and $n$ different stable reference voltages are required. If the reference voltage for the least significant digit is E, then the corresponding voltage required for the succeeding more significant digits are 2E, 4E, 8E, etc. up to $2^{n-1}$E for the most significant ($n$th) digit. For this system, the ratio of the largest required reference voltage to the output voltage produced by the least significant digit is $2^{n-1}$.

In the second type current adder, all the reference voltages are made equal and $n$ different resistances are used. If the resistance for the most significant ($n$th) digit is R, then the corresponding resistances required for the succeeding lesser significant digits are 2R, 4R, 8R, etc. up to $2^{n-1}$R for the least significant digit. For this system, the ratio of the reference voltage to the output voltage produced by the least significant digit is $2^{n-1}$.

This second type current adder was used in preference to the first since only one reference voltage is needed (thus considerably reducing the number of precision resistors necessary) and the magnitude of the reference voltage required is much lower for a given output from the least significant digit.

The two voltages (zero and E) for each input to the resistance network are obtained directly from one plate of a bistable multivibrator (one separate multivibrator for each digit). Although the plate voltage of a bistable multivibrator has two states, they are not necessarily constant. Aging of the tubes, variations in the power supply voltages, etc., all act to change the two voltage levels. In order to insure more accurate conversion, the plate voltages of the multivibrator are caught at ground (zero voltage) and a positive reference voltage established by a regulator tube. Thus, by this scheme, linear conversion is obtained over the desired range.

The output of the converter is a voltage which corresponds to the seven digits. If the error signal is positive, a positive voltage output is required. If the error signal is negative, a negative voltage is required.

In order to obtain a voltage which can be positive or negative depending upon the input number, an offset scheme is employed. In effect, the input to the converter is offset in the positive direction by replacing 0 by 1 and 1 by 0 in the 7th place. The output voltage of the converter is offset by a fixed amount in the opposite direction by connection an additional resistor between the output of the resistance network and a negative reference voltage. For example, if the input to the converter were zero, then the converter would produce an output voltage corresponding to the largest digit. An equal voltage is subtracted from this voltage, so that the sum or output is zero. It may be shown that by this method if the input number is 1, 10, 11, etc. that the resulting output voltage would start at zero and increase in the positive direction. If the input number were negative, i. e., —1(1,111,111), then the resultant output voltage would be one unit negative.

The alternative approach of having the most significant digit determine the sign of the output would lead to the correct result over one range but would result in inversion in the other. For example, the number 1 would produce a 1 unit positive voltage, the number —1 would result in a very large negative voltage. Thus the conversion curve would be discontinuous at zero, which of course rules out this scheme.

Figure 50:
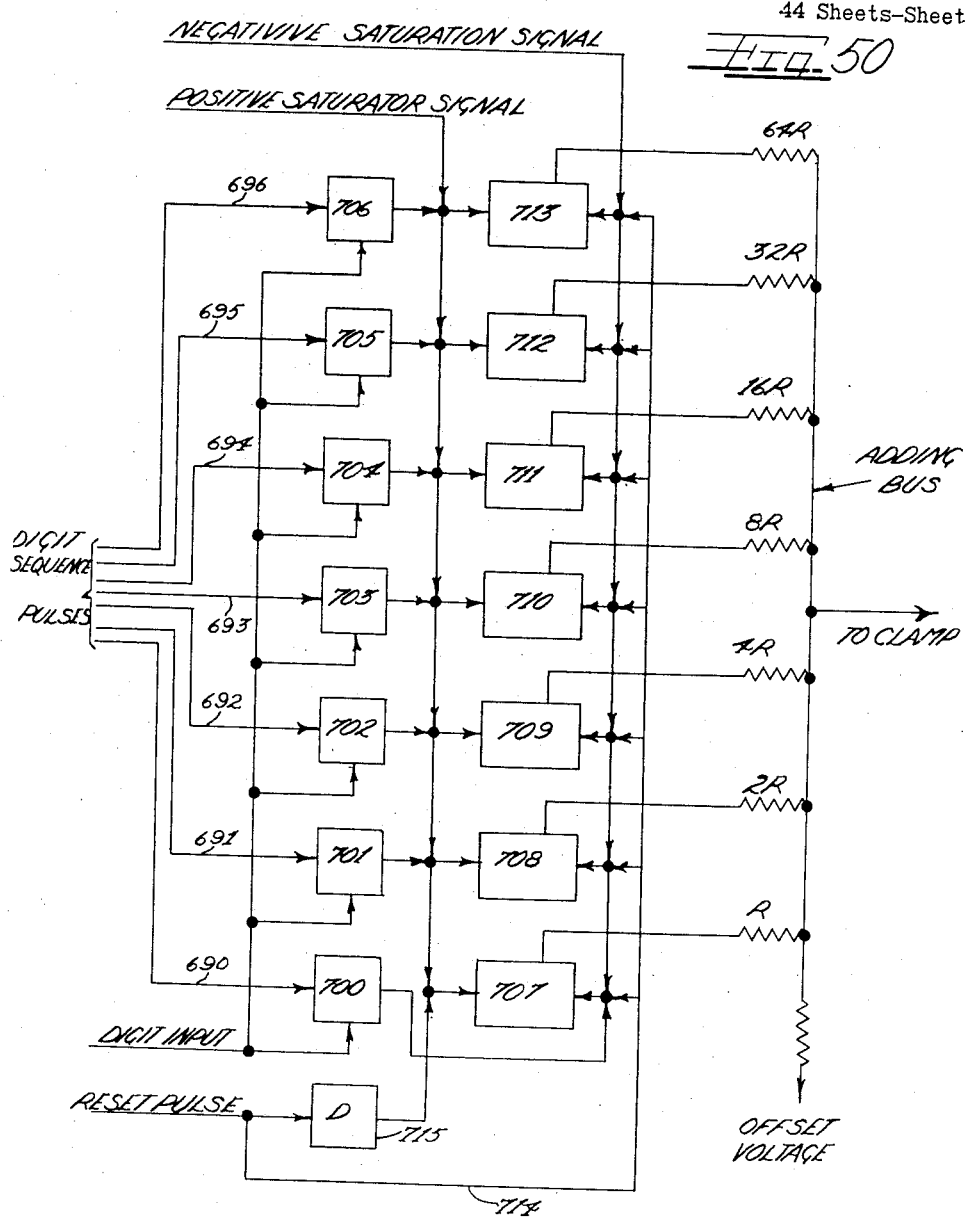
Figure 50 is a block diagram of the digital-voltage converter of Figure 1.

Figure 50 is the logical diagram of the digital-voltage converter. The digit input to be converted and digit sequence pulses from digit accumulator 62 in Figure 7 are fed into "and" type selective gates 700—706 via leads 690—696. Upon coincidence of a digit input pulse with a respective pulse from the digit accumulator, an output appears at the output of the corresponding gate. The timing is thus arranged so that if there is a pulse in the $k$th digit position, there will be a corresponding pulse on the output of the $k$th selective gate. Initially all of the bistables 707—713 are set in the reset state by the leading edge of a reset pulse delivered by line 714. Shortly afterward, the trailing edge of the reset pulse triggers the seventh bistable 707 through delay 715 so that bistable 717 goes into a normal or "set" state. This causes the voltage on the adding bus to correspond to that arising from the most significant digit. Each time a 1 appears at the digit input at a given digit position, the corresponding bistable 717—713 is caused to change state. Bistables 708—713 add to the voltage on the adder bus, while bistable 707 is reset by a digit pulse to provide a zero voltage on the bus.

In addition, the adding bus voltage is offset by a voltage equal in magnitude but opposite in polarity to that produced by the seventh bistable 707, as mentioned earlier. Since the range of conversion is between 0 and 127, it is clear that the output voltage will be 0 for an input of 0, 128, 256, 384, etc. To eliminate this ambiguity a "saturator" described hereinafter is employed to sense when such a condition exists. If the input number is greater than +63, for example, a signal appears on the positive saturation signal line which forces the converter output voltage to be the largest possible, i. e., that obtained with all stages 707—713 in the set position. If the input number is less than —64 then the signal on the negative saturation line causes the resultant output voltage to assume its largest negative value.

Figure 51 represents a detailed circuit diagram of the digital-voltage converter and shows the sixth and seventh digit stages of the converter shown in Figure 50. The digit input lead 720 leads to one control grid of the gates 700—706 through a resistor 721 and conductor 722. The sixth digit sequence pulse from the multiplex cathode 62 in Figure 8 is fed from lead 691 to the other control grid of gate 701, while the output from the seventh digit position of the multiplex cathode 62 is delivered through lead 690 to the other control grid of gate 700. Thus upon coincidence of a pulse from the sixth multiplex cathode output lead 691 and a digit at 720 in the sixth position, an output pulse from the gate 701 travels through condenser 730 and diode 731 to trigger bistable 708. Triggering of bistable 708 to set position produces an increased voltage to the adding bus 732 through conductor 733 and resistor 734 which may have a resistance of 2R where resistor 736 at the output of the seventh stage has a resistance R. Since the plate at the output lead 733 of bistable 708 is clamped to ground through diode 738 and is referenced to a stable voltage through diode 739, the voltage appearing on the adder bus 732 is substantially drift free. Similarly upon coincidence of a pulse at the input 720 and at the seventh multiplex cathode output lead 690, a pulse is transmitted through condenser 740 and diode 741 to trigger the seventh bistable 707 to what may be termed its reset position to remove the voltage applied to the adding bus 732 through resistor 736. As previously described the output voltage of the converter is offset by a fixed amount in the opposite direction by connecting additional resistors 743, 744 between the output of the resistance network indicated at 732 and a negative reference voltage.

As previously mentioned, if the input to the converter were 0 at input 720, then the output from the converter at 732 would simply be the output of the bistable 707 to the resistor 736; however, an equal voltage is subtracted from this voltage due to the action of the negative offset voltage applied through resistors 743, 744, so that the sum or output at 732 is 0.

E. Saturator

As explained before, the purpose of the saturator is to prevent possible ambiguity in conversion within the loop. We assume here that the converter has $m$ stages and that the programmed numbers have $n$ significant figures. Without further comment the rules for the operation of the saturator are given as follows unless the complementor always gives a 1 in the $n+1$ position:

(1) Consider the $m$, $m+1$, $m+2$, ... $n$, $n+1$, most significant figures.
(2) If the above figures are all 1 or 0 then a state of saturation does not exist.
(3) If the numbers do not satisfy condition 2 i. e., there is at least one 1 and one 0, then a saturation signal is required.
(4) If the $n+1$ significant figure is 0, then positive saturation is required.
(5) If the $n+1$ significant figure is a 1, then negative saturation is required.

The above rules are based upon the use of a "10's" complement with at least $n+1$ significant figures included in this complement. In the above case, if the output of the adder is 63 or greater, the voltage would be that corresponding to 63. If the number is −64 or less, the resultant voltage would be that corresponding to −64.

In the illustrated unit ($n=10$ and $m=7$) the saturation rules reduces to the following:

(1) Examine the numbers in positions 7, 8, 9, 10 and 11.
(2) If all of the above are 0 or 1, then the difference between the command and the actual position is between +63 and −64.
(3) If there is at least one 1 and one 0, then a saturation signal is required.
(4) If the number in the 11th place is 0, then the difference is greater than +63, and a positive saturation signal is required.
(5) If the number in the 11th place is 1, the difference is less than −64, and a negative saturation signal is required.

If the other "9's" complement is taken as explained before, then the point at which saturation begins is shifted up by 1 unit so that if the difference is 64 or greater, the voltage would be that corresponding to 64. If the command signal and the number corresponding to the output position were the same, the output of the converter would be that corresponding to −1, and an additional positive offset voltage must be included in the converter.

The saturator described below has been designed to operate in systems with any reasonable values of $m$ and $n$. The logical diagram of the saturator is given in Figure 52. The number from the adder is "stretched" by the monostable multivibrator 780 and the output is used to gate component 781 so as to pass pulses from the monostable 782 to the "on" tube. At the $m$th digit, bistable 785 is set through tube 795 and permits gates 786 and 787 to open. Thus the output of 787 includes digits $m$, $m+1$, $m+2$, ..., and $n+1$ from the adder, slightly delayed. The output of 786, on the other hand, is the 9's complement of the output of 787 also delayed. Thus, after the $m$th pulse, there is either a pulse at 786 or 787, but not at both at once.

At the beginning of each block of information bistables 788, 789 and 790 are reset. If the $m$th number is a 0, for example, 788 goes to the set position. If the next number is a 0, 788 and 789 remain unaltered. It is clear that if all the numbers are 0, and in the same way if all the numbers are 1, 788 or 789 is moved to the set position and remains there.

If, on the other hand, the first number is 0 and the second 1, then 788 is first set and then reset. Conversely, if the first number were 1 and the second 0, then 789 would be set and then reset. It is clear that if there is at least one 1 and one 0, that either 788 or 789 will go to the set and then the reset positions. From Figure 52, it will be seen that resetting of 788 or 789 causes 790 to go to the set position where it remains for the duration of the block. Thus if a saturation condition exists, multivibrator 790 is moved to the set position.

Gates 791 and 792 are triple coincidence gates which operate only when a saturation condition is present, (i. e., with 790 in the set position) and at the $n+1$ pulse position, the $n+1$ pulse being supplied from monostable 793. If the last digit is 0 and if the circuit is in a saturation condition, then gate 792 will operate. If the last digit is 1 then gate 791 will operate. The $m$th digit pulse is applied through tube 795 to reset component 790. It may be noted that if the complementor always supplies a pulse in the eleventh digit position, the rules for determining polarity of saturation are reversed and a 1 in the eleventh digit position of the output from the adder indicates positive saturation. Thus gate 791 is associated with a positive saturation signal in the illustrated embodiment.

The saturator circuit is shown in detail in Figures 53$a$ and 53$b$ and will now be described in conjunction with the timing diagrams shown in Figures 54 through 67.

Figure 54:
Figure 55:
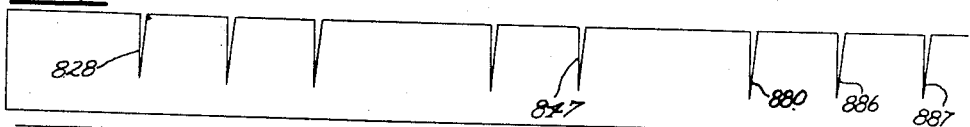
Figure 57:
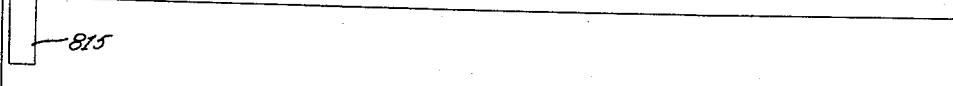

Referring to Figures 54 and 55, it will be observed that when the first clock pulse 800 arrives at input 140, the pulse travels through condenser 801 to trigger monostable 782, the waveform at F60 being indicated at 802 in Figure 60. The output from monostable 782 travels through the conductor 804 and condenser 805 to the grid of gate 781. Monostable 780 is normally in such condition that conductor 806 maintains the gate 781 open. Thus the output of the gate 781 travels via conductor 807 to the "on" tube 783 and through condenser 808 and conductor 809 to gate 786. However, gate 786 is maintained in closed condition at this time through conductor 811, resistor 812 and conductor 813 to a grid of the bistable 785. As indicated in Figure 57, a reset pulse 815 is delivered to the bistable 785 prior to each digit sequence to place the bistable 785 in reset condition, the pulse 815 traveling from conductor 150 through condenser 816 to the grid of the second tube of bistable 785 and also traveling through conductor 817, condenser 818, conductor 819, and rectifier 820 to insure that bistable 788 is in reset condition. The reset pulse also travels from conductor 819 through rectifier 822 and conductor 823 to reset bistable 789 and through conductor 863 and condenser 825 to set bistable 790.

Figure 59:
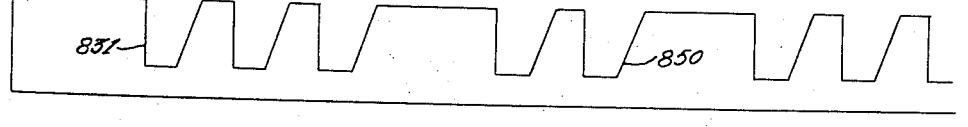

At the second digit position, it will be observed that there is an input pulse 828 which arrives at conductor 641 and travels through rectifier 830 to trigger monostable 780, the waveform at F59 being indicated by pulse 831 in Figure 59. This pulse travels through conductor 833 and condenser 834 to one of the control grids of gate tube 787; however, this tube is maintained closed by the conductor 813 from bistable 785 so that there is no output at F62. The clock pulse 836 in the second digit position is blocked at gate 781 by means of lead 806. Similarly, each of the pulses in digit positions 3, 4, 5 and 6 are blocked at the gate 786 or gates 781 and 787.

Figure 56:

At the seventh digit position, a digit sequence pulse 838 arrives at conductor 690 as indicated in Figure 56 and travels through condenser 840 and through tube 795 from whence it travels via conductor 842 to shift bistable 785 to set condition, opening gates 787 and 786 by means of conductor 813. Further, the seventh digit sequence pulse travels from tube 795 through conductor 844 and condenser 845 to shift bistable 790 to reset position.

The seventh position input pulse 847 appearing at F55 triggers monostable 780 to cut off gate 781 through conductor 806. The output pulse 850 at F59 is applied to the gate 787 through conductor 833 and condenser 834 and provides an output pulse 852 at output lead 853 of gate 787. Pulse 852 travels from conductor 853 through conductor 858 and rectifier 859 to trigger bistable 789 to set condition. Triggering of the bistable 789 produces the waveform indicated at 860 in Figure 64 at point F64.

There being no pulse at the eighth digit position at F55, clock pulse 866 at F54 triggers monostable 782 to supply a pulse to gate 781 which is now open, the pulse traveling through output lead 807 and through "on" tube 783 and appearing as an output pulse 870 at F61 at the output of gate 786. Pulse 870 travels through output lead 871 of gate 786 and through conductor 872 and rectifier 873 to trigger bistable 788 to set condition, the waveform at F63 of bistable 788 being indicated at 875 in Figure 63. The pulse at F61 also travels through conductor 871, conductor 876, and rectifier 877 to reset bistable 789 as indicated at 860a in Figure 64 and thus to set bistable 790 as indicated at 861 in Figure 65.

Since a pulse 880 appears at the input F55, in the ninth digit position, bistable 780 is triggered to close 781 through conductor 806 and to transmit a pulse through conductor 833 and condenser 834 to gate 787. Output pulse 881 at F62 of gate 787 travels through conductor 853 and serves to set bistable 789 as indicated at 860b and to reset bistable 788 as indicated at 875a in Figure 63.

Since there are pulses 886 and 887 in the tenth and eleventh digit positions, bistable 789 remains in set condition, and bistable 788 remains in reset condition.

Figure 58:
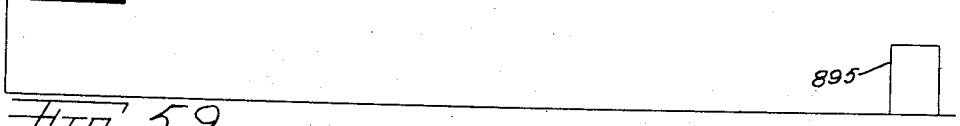

With the bistable 790 in set condition the first tubes 890 and 891 of triple coincidence gates 791 and 792 are opened through conductor 893 from the grid of the first tube of bistable 790. A pulse 895 is introduced at F58 in the eleventh digit position as illustrated in Figure 58 and travels along conductor 157 and through condenser 897 to trigger monostable 793 and transmit a pulse through conductor 898 to the second tubes 899 and 900 of triple coincidence gates 791 and 792.

With bistable 788 in reset condition, the third tube 901 of triple coincidence gate 791 is opened through conductor 903, rectifier 873, condenser 904 to the grid of tube 901, and there is an output pulse 933 at 905. On the other hand, if bistable 789 were in reset condition, the third tube 908 of triple coincidence gate 792 would be opened from the plate conductor 909 of the second tube of bistable 789 through rectifier 859, conductor 858, condenser 910 to the grid of tube 908. As a consequence an output would appear at lead 912 of triple coincidence gate 792.

It will be noted that the input to the digital-voltage converter of Figure 51 is taken from the plate of the second tube of the monostable 780 of Figure 53a at conductor 723, and that a positive saturation pulse from output lead 905 of coincidence gate 791 is fed through condenser 923 to tube 924, and a negative saturation pulse from output lead 912 of coincidence gate 792 is supplied to tube 926. A positive saturation signal at 905 produces an output at lead 928 of tube 924 which shifts all the bistables such as 707 and 708 to set condition to force the converter output voltage to be the largest possible. If a negative saturation signal appears at 912, the output lead 930 from tube 926 causes all the bistable such as 707 and 708 to assume a reset condition in order to provide an output voltage having the largest possible negative value.

F. *Clamp*

The purpose of the clamp illustrated in Figure 68 is to hold the voltage on the output of the summing bus 732 for a full sample cycle. In a multiplex system, a clamp would be required for each multiplex channel.

Referring to Figure 68, the input stage of the clamp comprises a linear cathode follower including a triode 950 and a pentode 951. The cathode follower drives a double triode circuit 952 including triodes 953 and 954 connected back-to-back. The clamp is open when the grid voltage of the double triode is below cut-off. The clamp is closed when the clamp control tube 956 is cut-off since then the double triodes are free to conduct in either direction. The voltage is retained for the full cycle on a capacitor 957 and is supplied to the output lead 959 through a linear cathode-follower including triode tube 960 and pentode 961.

For multiplexing purposes, a gate circuit is illustrated in Figure 68 for closing the clamp at the sixth multiplex block period. The gate tube 970 receives a pulse from conductor 971 leading to the sixth output lead of multiplex block period. The gate tube 970 recevies a pulse from conductor 971 leading to the sixth output lead of multiplex cathode 58 in Figure 8. The eleventh pulse is fed to conductor 157 and is transmitted through the gate 970 during the sixth multiplex block period and appears at the output 973 from whence it is delivered by conductor 975 to triode 956 to momentarily close the clamp circuit and apply the output of the voltage digital-voltage converter to condenser 957 where it is retained for the full block period.

G. *Power amplifier and modulator unit*

The unit comprising the power amplifier and modulator has been designed as a versatile test instrument capable of performance over wide ranges. This unit will perform four main functions, as follows:

(1) Generate 25 w. at 115 v., 100 C. P. S., (nominal) power for the purpose of driving the reference phase of a two phase motor, the chopper-modulator coil, and the reference phase of a tachometer generator.
(2) Receive and compensate the D. C. error voltage from the digital-voltage converter.
(3) Modulate a 400 C. P. S. (nominal) suppressed carrier so that the resultant signal amplitude and phase is proportional to the amplitude and polarity of the compensated D. C. error voltage.
(4) Amplify the error modulated carrier in order to drive the control phase of the servomotor.

The 400 C. P. S. signal for the amplifier is generated in a phase shift oscillator 990. It was found that isolating the amplifier tube from the phase shift network by means of a cathode-follower 991 reduced the frequency and voltage regulation of the unit to a negligible amount.

The power amplifier 992 is similar to the well known Williamson circuit, consisting of a voltage amplifier, a phase inverter, a push-pull driver, and a push-pull output stage. A combination of negative voltage and positive current feedback reduces the output impedance of the amplifier to approximately zero. This means that the gain of the amplifier is independent of load and thus the motor reference voltage will remain fixed and the motor output will be a linear function of the control phase voltage.

The block 1000 represents a D. C. type compensation network and may represent any type of three terminal compensation networks. An attenuator can be inserted in place of the compensation if desired.

After being compensated or attenuated at 1000, the error voltage from the clamp is fed to a chopper-modulator 1001. The coil of the chopper is driven at 115 volts, 400 cycles by the supply discussed above. The phase of the chopper exciting voltage is shifted so that the modulator output either leads or lags the 400 cycle voltage by 90°, depending on the error voltage polarity. The magnitude of the output is, of course, proportional to the D. C. error voltage input. In order to avoid loading the compensation network 1000 the chopper output is fed to a cathode follower 1002 with an open grid.

The modulated carrier is now fed to a differential amplifier 1003 where provision is made for introducing the output of a feedback A. C. tachometer if one is used for damping purposes. Otherwise, the stage serves merely to amplify the error signal as does the following voltage amplifier stage 1004.

The amplifier 1005 is identical in every respect to the power amplifier 992 used in the 400 cycle supply. Again, the use of feedback makes it possible to neglect loading and to consider the servo amplifier as a linear circuit element for analysis purposes.

Referring now to the detailed circuit shown in Figure 70a, b the output voltage from the clamp at conductor 959 is supplied through conductor 1010 to terminal of the compensating filter, the output of the filter at terminal 1012 being connected to chopper 1001 through conductor 1013, conductor 1014, and conductor 1015. Alternatively, switch 1018 may be moved to its lower position in Figure 70a to connect the output of the clamp through attenuator 1019.

The 400 cycle per second signal is generated in the phase shift oscillator including tubes 1020 and 1021. The output is taken from conductor 1022 through condenser 1023 and conductor 1024 to the grid of voltage amplifier and feedback tube 1026. Feedback is introduced into the cathode circuit of tube 1026 from the secondary winding of transformer 1030 through conductor 1031, resistor 1032 and conductor 1033. The output of tube 1026 is supplied to phase inverter tube 1036 which supplies out of phase voltages through condensers 1037 and 1038 to the grids of push-pull driver tubes 1040 and 1041. Tubes 1040 and 1041 drive the push-pull output tubes 1044 and 1045 which supply voltage to the primary of transformer 1030.

The coil 1048 of the chopper 1001 is driven at 115 volts, 400 cycles from the secondary of transformer 1030 through conductor 1050 and condenser 1051. The output of the chopper 1001 is fed through conductor 1060 to cathode follower tube 1061 and thence to tube 1080. At tube 1080 a switch 1081 is provided for introducing the output of a feedback A. C. tachometer, the output being fed from potentiometer 1083 through conductor 1084. Otherwise, with switch 1081 in the position shown, tube 1080 merely serves to amplify the tubes 1088 and 1080 serve as a differential amplifier for the output from cathode follower tube 1061.

From tube 1086, the signal is applied to amplifier tube 1090, inverter tube 1091, driver tubes 1092 and 1093 and push-pull output tubes 1095 and 1096, the output being delivered through transformer 1098 to the servomotor's control winding by conductor 1099. Feedback is provided from the secondary of transformer 1098 through conductor 1100, resistor 1101 and conductor 1102 to the cathode circuit of amplifier tube 1090. Conductor 1105 from transformer 1030 supplies the oscillator voltage to the servomotor's reference winding so as to enable the servo to sense the polarity of the input signal to the chopper.

H. Digital sensor

The digital sensor provides a digital indication of the angular position of the servo load. The pickup for the sensor consists mainly of a slotted wheel such as 1120 shown diagrammatically in Figure 71 on Sheet 5 of the drawings, a set of slit apertures such as 1121 and 1122 in Figure 71, and a pair of photo tubes and their corresponding pair of light sources (not shown). In addition to the pickup, the sensor consists of logical circuits, a continuous position register, and a temporary position storage unit.

A sensor wheel utilized in one embodiment according to the present invention had 75 teeth and slots. It was found necessary to blacken the teeth 1124 to eliminate spurious signals produced by reflections from the edges of the teeth.

A change in the angular relation of an output shaft 123 driven by the servomotor is sensed when the teeth 1124 on the wheel interrupt the two light beams from the pair of light sources which light beams pass through slit apertures 1121 and 1122, respectively. These interruptions of the light beams cause pulses to appear at the output of each of the two photo tubes. With the proper slit spacing, the output pulses of the two photo tubes would have the idealized form and displacement shown in Figure 73 for the forward direction of rotation of the shaft 1123 indicated by arrow 1126 in Figure 71. Thus as shown in Figure 73, the pulses 1140 due to slit 1122 lag the pulses 1141 due to slit 1121 by the time interval required for the wheel 1120 to rotate an amount equal to one-half the width of one tooth 1124 or of one slot 1144. Conversely, for counter-clockwise rotation of the wheel as illustrated in Figures 74 and 75, the pulses 1146 due to slit 1122 lead the pulses 1148 due to slit 1121 by the same time interval. Thus the relative timing between pulses of the two photo tubes provides the necessary and sufficient information for sensing the direction of rotation of shaft 1123. For the above proper operation, the width of the teeth and slots must be equal, and the spacing between the slits must equal $2n+1\frac{1}{2}$ slot or tooth widths (where $n$ is any integer).

The direction sensing action is accomplished by the logical circuits consisting of two sets of gates as shown in Figure 76. The timing diagrams of Figures 77 and 78 indicate the action of these gates for clockwise and counter-clockwise wheel rotations respectively. In these figures, $PT_A$ and $PT_B$ are the output pulses of the two photo tubes associated with slits 1121 and 1122 respectively. The trapezoidal shape of these pulses shown in Figures 77 and 78 is more indicative of the true waveform than is the idealized shape in Figures 73 and 75. Deviation from the ideal shape is caused mainly by the fact that the slit apertures have a finite width.

The pulses are applied from the sensor wheel and photo tube pickup 1200 to amplifiers 1201 and 1202, wave shaping circuits 1203 and 1204 and differentiating circuits 1206, 1207 and 1208, 1209 to yield the input pulses for the direction sensing gates (logical circuits). Both inputs to any gate must be positive simultaneously to produce an output pulse. The timing of the pulses in Figure 77 (for clockwise rotation) is such that each of the gates 1220, 1221, 1222 and 1223 produces one output pulse for each slot and tooth pair on the wheel 1120 of Figure 71 as it passes a fixed reference point. Since each gate produces its pulse at a slightly different time, a total of four pulses is produced at the common output of these gates for each slot and tooth pair. Figure 76 further shows that the pulses applied to gates 1230, 1231, 1232, and 1233 do not generate output pulses for rotation of the wheel in this direction (clockwise). The common output from gates 1220—1223 is indicated by the waveform 1235 in Figure 77b while the common output from gates 1230—1233 is indicated by the B+ line 1236 in Figure 77b.

Rotation of the wheel in the reverse direction changes the timing of the pulses to the gates so that the converse to the above results are obtained. Thus for counter-clockwise rotation, output pulses are obtained from gates 1230—33 as indicated at 1240 in Fig. 78b while no output is produced by gates 1220—23 as indicated by the B+ line 1241, Fig. 78b. Figure 78 thus illustrates the operation of the logical circuits for rotation of the wheel in the reverse direction.

The result of these actions is the generation of pulses which represent the passage of one position quantum level. In addition, the direction of rotation is indicated by which one of the two sets of four direction sensing gates produce the output pulses. In order to translate this information into a quantity that is proportional to the angle through which the sensing wheel is turned, it is necessary to sum the arbitrary forward direction pulses in the position counter-register and subtract the arbitrary reverse direction pulses.

This summing action is accomplished by the reversible binary counter shown in Figure 80 consisting of cascaded stages of bistable multivibrators. The operation of such a counter is straightforward and may be illustrated by a simple example. Consider a four-stage binary counter having the configuration indicated at Figure 79(A). We assume here that when the left half of one particular counter stage is conducting, the stage contains the number one (1); and if it is not conducting, it contains the value of zero (0). Also it is assumed that a carry pulse is generated and applied to the following stage when the preceding stage changes from 1 to 0. The number represented in the counter of Figure 79(A), reading from right to left, is 0101 or 0 times $2^3$ plus 1 times $2^2$ plus 0 times $2^1$ plus 1 times $2^0$ equals 5. Applying one negative pulse to the input results in the condition shown in Figure 79(B), which represents the number 0110 or 6. The application of a second pulse produces the result shown in Figure 79(C), which indicates the number 0111 or 7. Thus it is seen that the number in the counter is increased as pulses are applied to the input.

Consider now the counter represented in Figure 79(D). In this counter the interstage coupling has been altered so that now the carry pulses are produced by the opposite sides of the stages. With this coupling, a carry pulse is generated when a stage changes from 0 to 1. Applying an input pulse to this counter produces the state indicated in Figure 79(E), which indicates the number 0100 or 4. Application of a second input pulse results in the condition indicated in Figure 79(F), which represents the number 0011 or 3. Since the number in the counter now decreases as pulses are applied, it is evident that the direction of counting (adding or subtracting) is easily changed by switching the interstage couplings.

Applying this principle to the digital sensor produces the counter configuration indicated by the block diagram of Figure 80. In this diagram each binary counter 1300 is represented with its interstage coupling controlled by two "and" gates 1301 and 1302. Thus the two outputs of each binary counter stage connect to two direction control gates (backward control gate 1301 and forward control gate 1302). As a result, the direction of counting in the binary counter is determined by which set of these gates is gated on.

The gating of the direction control gates, and thus the determination of counting in the binary counter, is performed by the direction sensitive bistable multivibrator 1303. One side of this multivibrator is directly connected to the common output of the arbitrary forward direction sensing gates 1220—23 and the other side is connected to the output of gates 1230—33. Thus the first pulse that appears at the output of either set of direction gates sets the condition of the direction sensitive bistable multivibrator 1303.

All pulses which are present at the outputs of the direction sensing gates are applied to the first stage of the binary counter-register (shown in solid outline in Figure 80). When the sensor wheel changes its direction of rotation, the state of the direction sensitive bistable multivibrator 1303 is reversed, changing the direction of counting in the counter register. Thus, the register contains at all times a number which is proportional to the angular displacement of the shaft being sensed. In order to make this an absolute number, the register is set to 0 at a fixed position of the shaft.

In order to make the position information available for recording and feedback, temporary storage is necessary. The block diagrams of Figures 80 and 81 indicate the connection of these elements by means of gates. The position information contained in all the stages of the counter register is read out in parallel at the desired time by means of readout gates 1306 in Figure 80 and stored in the temporary storage register components 1310 in Figure 81. The information is read out serially from the storage register by means of readout gates 1311.

CIRCUIT OF SENSOR PICKUP UNIT, AND SENSOR PULSE SHAPING AND LOGICAL CIRCUITS

Two light sources 1340 and 1341 are illustrated in Figure 82 for exciting photo tubes 1342 and 1343 on the opposite sides of the sensor wheel. Two cathode follower stages having triode tubes 1345 and 1346, respectively, are associated with the photo tubes and are used to transmit signals from the photo tubes to the shaping circuits via leads 1348 and 1349 at a low impedance level to minimize pickup and deterioration of the pulses when transmitted on long cables.

The pulses from the cathode-followers are separately channeled to the two D. C. amplifiers 1352 and 1353. The output pulses of the amplifiers are used to actuate two trigger circuits 1354 and 1355, which shape the input pulses. Each trigger circuit contains an adjustment as indicated at 1356 and 1357 so that the triggering action can be made to occur at the proper point along the slope of the input pulses. When the two trigger circuits are properly adjusted, their output pulses are rectangular with a 50% duty cycle and a 90° displacement between the two corresponding sets of pulses as indicated at V1 and V3, for example, in Figure 78.

Two sets of voltages divider networks 1360 and 1361 are connected to the trigger circuits to establish the proper height and D. C. level of the pulses that control the action of the direction sensing gates 1220—23 and 1230—33. The control of each of the gate tubes is determined by the pulses that appear at the two control grids (grids No. 1 and No. 3). The first control grid (grid No. 1) is biased below cut-off and receives differentiated input pulses from the plates of the trigger tubes. In this manner only the positive going portions of the differentiated pulses place the gate tubes in a state of conditional conduction. The voltage appearing at the second control grid (grid No. 3), then determines whether or not conduction will occur. This voltage is obtained from one of the voltage dividers. The D. C. level of this voltage is such that pulses formed in the trigger circuit alternately place the second control grid in a conditional conduction and cut-off state. The action of the pulses appearing at the two control grids of each of the direction sensing gates is shown in the timing diagram of Figures 77 and 78. As these figures show, pulses are obtained only from gates 1320—23 (point A in Figure 77) for forward (clockwise) rotation of the sensing wheel; while for reverse rotation, pulses are obtained only from gates 1330—33 (as indicated at B in Figure 78).

The output pulses thus generated in the direction sensing gates appear at output leads 1380 or 1381 depending on the direction of rotation of the sensing wheel and are used to establish the direction of counting in the binary counter. As the sensing wheel begins to rotate in a given direction, pulses appear at either A or B in Figures 77 or 78.

CIRCUIT OF REVERSIBLE BINARY COUNTER

The output pulses generated at 1380 and 1381 of Figure 82 in the direction sensing gates are used to establish the direction of counting in the binary counter shown in Figure 83. As the sensing wheel begins to rotate in a given direction, pulses appear either at 1380 or 1381. The first pulse appearing here forces bistable multivibrator 1303 into one state. Thus if pulses appeared at 1380, the right side of 1303 would be forced into conduction while the left side would be cut off. For this condition, the grid of the conducting side would be at 0 voltage, thereby placing directional control gates 1302 in a state of conditional conduction via lead 1390, while direction control gates such as 1301 would be cut off through lead 1391. Thus the binary counter counts forward (adds). Succeeding pulses from 1380 will not affect the condition of 1303. However, if the sensing wheel changed its direction of rotation, pulses would begin to appear at 1381 and the state of bistable 1303 would be reversed. In this case, the above direction control gates 1301 would be placed in a state of conditional conduction via lead 1391 while gates 1302 would be cut off, making the binary counter count in reverse (subtract).

The same pulses that are generated in the direction sensing gates are applied to the binary counter shown in Figure 83 via lead 1395 or 1396. These pulses are first applied to a dual cathode follower 1400 which acts as a delay and buffer stage. The delayed output pulses are used to drive the first counter stage 1401 through conductor 1404. It is necessary to delay the pulses to be counted to insure that the direction sensing and control circuits have completed any transitions by the time the pulses finally arrive at the counter.

The output from the counter is taken through readout gates 1402 which have output leads 1403 leading to the temporary storage register.

CIRCUIT OF TEMPORARY STORAGE UNIT

As illustrated in Figure 84, the temporary storage register consists of a bistable multivibrator 1430 and a readout gate 1431 for each stage of the counter-register. The readout gates 1402 of the counter-register shown in Figure 83 are connected so that at a particular instant, the number present in a counter-register stage is transmitted to corresponding stage of the temporary storage register of Figure 84. This action of the readout gates 1402 is initiated by a readout pulse applied at lead 1450 from the inhibitor to be hereinafter described, the readout pulse travels through a condenser 1451 and a conductor 1452 to the first control grid of each readout gate 1402. This pulse momentarily places the readout gates 1402 in a state of conditional conduction. If a number appears in a particular counter stage, an output pulse is generated at lead 1403 which actuates a corresponding bistable multivibrator such as 1430 in the storage register of Figure 84.

To have the number indicated in the storage register correspond to the number in the counter-register, it is necessary to reset the storage register to a 0 count for each readout from the counter-register. Thus as the number is read into the storage register, the condition of each bistable multivibrator is determined by the signal generated at the respective gates 1402. The temporary storage holds the count sent into it during the sampling period. During this time the number in it is read out serially to the complementor through lead 1460 by means of gates 1431. The sampling period is determined by pulses from the multiplex cathode 62, the first sequencing pulse being delivered by conductor 696 to the gate 1431 of the first stage, and the second pulse being delivered to the second gate by conductor 695.

The storage register is reset by momentarily unbalancing all the bistable multivibrators 1430 in such a manner that each one assumes the state corresponding to a 0 count. This unbalance is produced by momentarily increasing the voltage to grid leads such as 1472 of bistable 1430. These grid returns are connected to the cathode of a normally cut-off cathode follower tube 1475 by means of a conductor 1476 so that the desired voltage increase can be produced by applying a large positive reset pulse to the grid of cathode follower tube 1475 through conductor 1480, a reset pulse being introduced at 1481 for this purpose.

*I. Inhibitor*

The function of the inhibitor is to prevent transfer of position information from the sensor continuous register to the temporary storage unit while the register is in the transfer state.

The illustrated register has a measured "transfer time" of approximately 0.2 microsecond per state. This transfer time is defined here as the time it takes for the register to respond to (transfer) a pulse input. This time was measured by setting the entire register so that all stages are in the "on" state. An input pulse sets the entire register to an "off" state. The time between the arrival of the input pulse and resetting of the last state divided by the number of stages is defined as the transfer time per stage.

The inhibitor timing is only necessary when a register with a longer transfer time when the illustrated unit is employed but has been illustrated herein for completeness. The longer transfer time would result from slower speed, more conservatively designed last stages, or from the use of a gas tube forward-backward counter.

Gate 1500 of Figure 21 of the register acts as a multiplex gate. Block 1501, a monostable multivibrator, prevents the passage of pulses through gate 1503 during its "on" stage. Thus, when there is an input to the sensor register, this input prevents gate 1503 from operating until after a specified delay time so that transfer can take place.

Referring to the detailed circuit diagram shown in Figure 22, it will be observed that the gate 1500 comprises a tube 1505 having one input grid connected by means of conductor 1506 to the reversible counter of the sensor register while another control grid of the tube is connected to the conductor 392 from the first cathode of the accumulator 58 of Figure 8.

Thus during a given multiplex block period as determined by the lead 392, if there is an input to the binary counter of Fig. 83, a pulse will appear from cathode follower section 1400 on lead 1506 causing a pulse to travel through gate 1500 and trigger monostable 1501 in Fig. 22. Triggering of 1501 closes off gate 1503 so that the read out gating pulses from the sequence timing generator at 152 do not pass through gate 1503 but are blocked. However, if no pulse is being fed into the binary counter, the gating pulse from lead 152 is passed through gate 1503 and is delivered by means of lead 1450 to the read out gates such as 1402 in Fig. 83. The read out pulse is also delivered through "on" tube 1520 to provide an output at conductor 1481 for reset of the sensor register.

It will be apparent that many modifications and variations may be effected without departing from the scope of the novel concepts of the present invention.

We claim as our invention:

1. In a signal transmission system, the combination of means for comparing two digital signals to provide a digital error signal, means for converting said digital error signal into an analog error signal, and saturator means responsive to digital error signals above a predetermined value to provide a limit analog signal from said converting means.

2. In a signal transmission system, the combination of means for comparing binary digital signals to provide a binary digital difference signal, said comparing means having a capacity for a first number of significant figures, and means having a capacity for a lesser number of significant figures than said comparing means for converting said digital difference signal to an analog signal.

3. In a signal transmission system, the combination of means for comparing binary digital signals to provide a binary digital difference signal and having a capacity for a first number of significant figures, means having a capacity for a second lesser number of significant figures than said comparing means for converting said digital difference signal to an analog signal, and means connected to said comparing means for receiving the significant figures above said second number of significant figures and providing a saturation signal if such significant figures received indicate a value of difference signal beyond the capacity of said converting means.

4. In a servomechanism control circuit, means for accumulating digital input information relative to a plurality of outputs, means for accumulating digital sensor information relative to the respective outputs, means for comparing the input and sensor information relative to the respective outputs and providing respective error signals, and means for delivering said error signals to the respective outputs.

5. The method of controlling a plurality of outputs, which comprises accumulating digital input information for each one of the outputs, accumulating digital sensor information relative to the respective outputs, comparing the input and sensor information relative to each output in succession and providing resultant digital error signals, converting said digital error signals to respective voltage error signals, and applying the respective voltage error signals to the respective outputs.

6. In a servomechanism control circuit, first converter means for converting each of a plurality of analog command signals to digital command signals, accumulator means for storing digital command signals generated by said first converter means and having output means for delivering said digital command signals therefrom, first gate means controlling the output means of said accumulator means, adder means for adding digital command signals and the complement of sensor digital signals to provide digital error signals, and having first input means connected with the output means of said accumulator means for receiving a digital command signal therefrom under the control of said first gate means and having second input means for receiving the complement of sensor digital signals, sensor means for providing sensor digital signals reflecting the condition of each of a plurality of output devices, storage means for storing sensor digital signals generated by said sensor means and having output means for delivering sensor digital signals therefrom, second gate means controlling the output means of said storage means, complementor means having input means connected to said storage means through said second gate means for receiving sensor digital signals from said storage means under the control of said second gate means and having output means connected to said second input means of said adder means for delivering the complement of the sensor digital signals to said second input means of the adder means, inhibitor means operatively interposed between said sensor means and said storage means for preventing delivery of sensor digital signals from the sensor means to the storage means while the sensor means is in a state of transition, second converter means for converting digital error signals from said adder means to analog error signals and having output means for delivering the analog error signals therefrom, saturator means controlling the output means of said second converter means to give a limiting analog error signal for digital error signals beyond a predetermined limiting value, third gate means controlling the output means of said second converter means, clamp means having input means connected to the output means of said second converter means for receiving analog error signals from said second converter means under the control of said third gate means and for holding said analog error signals for a predetermined time period, power amplifier means for amplifying analog error signals held by said clamp means and for applying the amplified error signals to the respective output devices, and sequence timing means for defining a succession of multiplex periods and for controlling said gate means to successively compare input and sensor signals for each of said output devices at said adder means and for delivering the resultant error signals to said output devices during the respective multiplex periods.

7. In a servomechanism control circuit, command means for supplying digital command signals for controlling a plurality of output devices and having output means for delivering said digital command signals therefrom, first gate means controlling the output means of said command means, adder means for adding digital command signals and the complement of sensor digital signals to provide digital error signals and having first input means connected with the output means of said command means for receiving digital command signals therefrom under the control of said first gate means and having second input means for receiving the complement of sensor digital signals, sensor means for providing sensor digital signals reflecting the condition of each of said output devices, storage means for storing sensor digital signals generated by said sensor means and having output means for delivering sensor digital signals therefrom, second gate means controlling the output means of said storage means, complementor means having input means connected to said storage means through said second gate means for receiving sensor digital signals from said storage means under the control of said second gate means and having output means connected to said second input means of said adder means for delivering the complement of the sensor digital signals to said second input means of said adder means, converter means for converting digital error signals from said adder means to analog error signals and having output means for delivering analog error signals therefrom, saturator means controlling the output means of said converter means to give a limiting analog error signal for digital error signals beyond a predetermined limiting value, third gate means controlling the output means of said converter means, clamp means having input means connected to the output means of said converter means for receiving analog error signals from said converter means under the control of said third gate means and for holding said analog error signals for a predetermined time period, and sequence timing means for defining a succession of multiplex periods and for controlling said gate means to successively compare command and sensor signals at said adder means and for delivering the resultant error signals to the respective output devices during the respective multiplex periods.

8. In a servomechanism control circuit, command means for supplying digital command signals for controlling a plurality of output devices and having output means for delivering said digital command signals therefrom, first gate means controlling the output means of said command means, adder means for adding digital command signals and the complement of sensor digital signals to provide digital error signals and having first input means connected with the output means of said command means for receiving digital command signals therefrom under the control of said first gate means and having second input means for receiving the complement of sensor digital signals, sensor means for providing sensor digital signals reflecting the condition of each of said output devices, storage means for storing sensor digital signals generated by said sensor means and having output means for delivering sensor digital signals therefrom, second gate means controlling the output means of said storage means, complementor means having input means connected to said storage means through said second gate means for receiving sensor digital signals from said storage means under the control of said second gate means and having output means connected to said second input means of said adder means for delivering the complement of the sensor digital signals to said second input means of said adder means, converter means for converting digital error signals from said adder means to analog error signals and having output means for delivering analog error signals therefrom, saturator means controlling the output means of said converter means to give a limiting analog error signal for digital error signals beyond a predetermined limiting value, third gate means controlling the output means of said converter means, clamp means having input means connected to the output means of said converter means for receiving analog error signals from said converter means under the control of said third gate means and for holding said analog error signals for a predetermined time period, power amplifier means for amplifying analog error signals held by said clamp means and for applying the amplified error signals to the respective output devices, and sequence timing means for defining a succession of multiplex periods and for controlling said gate means to successively compare input and sensor signals for each of said output devices at said adder means and for delivering the resultant error signals to the respective output devices during the respective multiplex periods.

9. In a servomechanism control circuit, command means for supplying digital command signals for controlling a plurality of output devices and having output means for delivering said digital command signals therefrom, first gate means controlling the output means of said command means, adder means for adding digital command signals and the complement of sensor digital signals to provide digital error signals and having first input means connected with the output means of said command means for receiving digital command signals therefrom under the control of said first gate means and having second input means for receiving the complement of said sensor digital signals, sensor means for providing sensor digital signals reflecting the condition of each of said output devices, storage means for storing sensor digital signals generated by said sensor means and having output means for delivering sensor digital signals therefrom, second gate means controlling the output means of said storage means, complementor means having input means connected to said storage means through said second gate means for receiving sensor digital signals from said storage means under the control of said second gate means and having output means connected to said second input means of said adder means for delivering the complement of the sensor digital signals to said second input means of the adder means, converter means for converting digital error signals from said adder means to analog error signals and having output means for delivering the analog error signals therefrom, third gate means controlling the output means of said converter means, and sequence timing means for defining a succession of multiplex periods and for controlling said gate means to successively compare command and sensor signals at said adder means and for delivering the resultant error signals to the respective output devices during the respective multiplex periods.

10. In a servomechanism control circuit, command means for supplying digital command signals for controlling a plurality of output devices and having output means for delivering said digital command signals therefrom, first gate means controlling the output means of said command means, adder means for adding digital command signals and the complement of sensor digital signals to provide digital error signals and having first input means connected with the output means of said command means for receiving digital command signals therefrom under the control of said first gate means and having second input means for receiving the complement of sensor digital signals, sensor means for providing sensor digital signals reflecting the condition of each of said output devices, storage means for storing sensor digital signals generated by said sensor means and having output means for delivering sensor digital signals therefrom, second gate means controlling the output of said storage means, complementor means having input means connected to said storage means through said second gate means for receiving sensor digital signals from said storage means under the control of said second gate means and having output means connected to said second input means of said adder means for delivering the complement of the sensor digital signals to said second input means of the adder means, converter means for converting digital error signals from said adder means to analog error signals and having output for delivering analog error signals therefrom, saturator means controlling the output means of said converter means to give a limiting analog error signal for digital error signals beyond a predetermined limiting value, third gate means controlling the output means of said converter means to control delivery of said analog error signals to the respective output devices, and sequence timing means for defining a succession of multiplex periods and for controlling said gate means to successively compare command and sensor signals at said adder means and for delivering the resultant error signals to the respective output devices during the respective multiplex periods.

11. In a servomechanism control circuit, command means for supplying digital command signals for controlling a plurality of output devices and having output means for delivering said digital command signals therefrom, first gate means controlling the output means of said command means, adder means for adding digital command signals and the complement of sensor digital signals to provide digital error signals and having first input means connected with the output means of said command means for receiving digital command signals therefrom under the control of said first gate means and having second input means for receiving the complement of sensor digital signals, sensor means for providing sensor digital signals reflecting the condition of each of the output devices, storage means for storing sensor digital signals generated by said sensor means and having output means for delivering sensor digital signals therefrom, second gate means controlling the output means of said storage means, complementor means having input means connected to said storage means through said second gate means for receiving sensor digital signals from said storage means under the control of said second gate means and having output means connected to said second input means of said adder means for delivering the complement of the sensor digital signals to said second input means of the adder means, inhibitor means operatively interposed between said sensor means and said storage means for preventing delivery of sensor digital signals from the sensor means to the storage means while the sensor means is in a state of transition, converter means for converting digital error signals from said adder means to analog error signals and having output means for delivering analog error signals therefrom, third gate means controlling the output means of said converter means to control delivery of said analog error signals to the respective output devices, and sequence timing means for defining a succession of multiplex periods and for controlling said gate means to successively compare command and sensor signals at said adder means and for delivering the resultant error signals to the respective output devices during the respective multiplex periods.

12. In a servomechanism control circuit, command means for supplying digital command signals for controlling a plurality of output devices and having output means for delivering said digital command signals therefrom, first gate means controlling the output means of said command means, means for comparing digital command signals and sensor digital signals to provide digital error signals and having first input means connected with the output means of said command means for receiving digital command signals therefrom under the control of said first gate means, and having second input means for receiving sensor digital signals, storage means for storing sensor digital signals generated by said sensor means and having output means for delivering sensor digital signals therefrom, second gate means controlling the output means of said storage means, converter means for converting digital error signals from said comparing means to analog error signals and having output means for delivering analog error signals therefrom, third gate means controlling the output means of said converter means to control delivery of said analog error signals to the respective output devices, and sequence timing means for defining a succession of multiplex periods and for controlling said gate means to compare command and sensor signals for each of said output devices in succession at said comparing means and for delivering the resultant error signals to the respective output devices during the respective multiplex periods.

13. In a servomechanism control circuit, command means for supplying digital command signals for controlling a plurality of output devices and having output means for delivering said digital command signals therefrom, first gate means controlling the output means of said command means, means for comparing digital command signals and sensor digital signals to provide digital error signals and having first input means connected with the output means of said command means for receiving digital command signals therefrom under the control of said first gate means, and having second input means for receiving sensor digital signals, sensor means for providing sensor digital signals reflecting the condition of each of the output devices and having output means for delivering sensor digital signals therefrom, second gate means controlling the output means of said sensor means, third gate means controlling the output of said comparing means to control delivery of error signals to the respective output devices, and sequence timing means for defining a succession of multiplex periods and for controlling said gate means to compare command and sensor signals for each of the output devices in succession at said comparing means and for delivering the resultant error signals to the respective output devices during the respective multiplex periods.

14. In a servomechanism control circuit, command means for supplying digital command signals for controlling a plurality of output devices and having output means for delivering said digital command signals therefrom, first gate means controlling the output means of said command means, means for comparing digital command signals and sensor digital signals to provide digital error signals and having first input means connected with the output means of said command means for receiving digital command signals therefrom under the control of said first gate means, and having second input means for receiving sensor digital signals, sensor means for providing sensor digital signals reflecting the condition of each of the output devices and having output means for delivering sensor digital signals therefrom, second gate means controlling the output means of said sensor means, saturator means connected with the output of said comparing means for generating a limiting error signal for digital error signals beyond a predetermined limiting value, third gate means controlling the delivery of error signals from the comparing means and saturator means to the respective output devices, and sequence timing means for defining a succession of multiplex periods and controlling said gate means to compare command and sensor signals for each of the respective output devices in succession at said comparing means and for delivering the resultant error signals to the respective output devices during the respective multiplex periods.

15. In a servomechanism control circuit, command means for supplying digital command signals for controlling a plurality of output devices and having output means for delivering said digital command signals therefrom, first gate means controlling the output means of said command means, means for comparing digital command signals and sensor digital signals to provide digital error signals and having first input means connected with the output means of said command means for receiving digital command signals therefrom under the control of said first gate means and having second input means for receiving sensor digital signals, sensor means for providing sensor digital signals reflecting the condition of each of said output devices and having output means for delivering sensor digital signals therefrom, second gate means controlling the output means of said sensor means, inhibitor means operatively interposed between said sensor means and said second gate means for preventing delivery of sensor digital signals to said comparing means from the sensor means while the sensor means is in a state of transition, and sequence timing means for defining a succession of multiplex periods and for controlling said gate means to compare command and sensor signals at said comparing means for each of the respective output devices in succession and for delivering the resultant error signals to the respective output devices during the respective multiplex periods.

16. In a servomechanism control circuit, command means for supplying digital command signals for controlling a plurality of output devices and having output means for delivering said digital command signals therefrom, first gate means controlling the output means of said command means, means for comparing the digital command signals and sensor digital signals to provide digital error signals and having first input means connected with the output means of said command means for receiving digital command signals therefrom under the control of said first gate means and having second input means for receiving sensor digital signals, sensor means for providing sensor digital signals reflecting the condition of each of the output devices and having output means for delivering sensor digital signals therefrom, second gate means controlling the output means of said sensor means, converter means for converting digital error signals from said comparing means to analog error signals and having output means for delivering analog error signals therefrom, clamp means having input means connected to the output means of said converter means for receiving analog error signals from said converter means and for holding said analog error signals for a predetermined time period, third gate means controlling the output means of said converter means to control delivery of analog error signals from the converter means to the clamp means, and sequence timing means for defining a succession of multiplex periods and for controlling said gate means to compare command and sensor signals for each of the output devices in succession at said comparing means and for delivering the resultant error signals to the respective output devices during the respective multiplex periods.

17. In a servomechanism control circuit, first gate means controlling delivery of a plurality of digital command signals relative to a plurality of output devices, means for comparing digital command signals and sensor digital signals to provide digital error signals and having first input means connected with said first gate means for receiving digital command signals therefrom and having second input means for receiving sensor digital signals, sensor means for providing sensor digital signals reflecting the condition of each of the output devices and having output means for delivering sensor digital signals therefrom, second gate means controlling the output means of said sensor means for controlling delivery of sensor digital signals from said output means of said sensor means to said comparing means, converter means for converting digital error signals from said comparing means to analog error signals and having output means for delivering analog error signals therefrom, saturator means controlling the output means of said converter means to provide a limiting analog error signal for digital error signals beyond a predetermined limiting value, and sequence timing means for defining a succession of multiplex periods and for controlling said gate means to compare command and sensor signals for each of the output devices in succession and for delivering the error signals to the respective output devices during the respective multiplex periods.

18. In a servomechanism control circuit, first gate means for controlling delivery of digital command signals, means for comparing digital command signals and sensor digital signals to provide digital error signals and having first input means connected with the first gate means for receiving digital command signals therefrom and having second input means for receiving sensor digital signals, sensor means for providing sensor digital signals reflecting the condition of an output device and having output means for delivering sensor digital signals therefrom, complementor means having input means connected to the output means of said sensor means for receiving sensor digital signals from said sensor means and having output means connected to said second input means of said comparing means for delivering the complement of the sensor digital signals to the second input means of the comparing means, inhibitor means operatively interposed between the sensor means and the complementor means for preventing delivery of sensor digital signals from the sensor means to the complementor means while the sensor means is in a state of transition, converter means for converting digital error signals from said comparing means to analog error signals and having output means for delivering analog error signals therefrom, saturator means controlling the output means of said converter means to give a limiting analog error signal for digital error signals beyond a predetermined limiting value, clamp means having input means connected to the output means of said converter means for receiving the analog error signals therefrom and for holding the analog error signals for a predetermined time period, and means for driving said output device in accordance with the analog error signals at said clamp means.

19. In a servomechanism control circuit, adder means for adding digital command signals and the complement of sensor digital signals to provide digital error signals and having first input means for receiving digital command signals for directing an output device and having second input means for receiving the complement of sensor digital signals, sensor means for providing sensor digital signals reflecting the condition of the output device and having output means for delivering sensor signals therefrom, complementor means having input means connected to said sensor output means for receiving sensor digital signals therefrom and having output means connected to said second input means of said adder means for delivering the complement of the sensor digital signals to the adder means, converter means for converting digital error signals from said adder means to analog error signals and having output means for delivering analog error signals therefrom, saturating means for providing a limiting analog error signal for digital error signals from said adder means exceeding a predetermined limiting value, and means for delivering the analog error signals from the converter means to said output device.

20. In a servomechanism control circuit, command input means for receiving a digital command signal, adder means for adding digital command signals and the complement of sensor digital signals to provide a digital error signal reflecting the error between the command signal and the sensor signal, said adder means having first input means connected with the command input means for receiving digital command signals therefrom and having second input means for receiving the complement of sensor digital signals, sensor means for providing sensor digital signals reflecting the condition of the output device and having output means for delivering sensor digital signals therefrom, complementor means having input means connected to the output means of said sensor means for receiving sensor digital signals from the sensor means and operative to obtain the complement of the sensor digital signal and deliver the same to the second input means of the adder means, converter means for converting digital error signals from the adder means to analog error signals and having output means for delivering analog error signals therefrom, saturator means operative to generate a limiting analog error signal in response to digital error signals from said adder means exceeding a predetermined limiting value, and means connecting the converter means and the saturator means to the output device for driving the output device in accordance with the analog error signals from the converter means and the saturator means.

21. In a servomechanism control circuit, means for converting a binary digital input signal to an analog signal comprising an adding bus output means, a plurality of bistable means having output means connected with said adding bus output means, each bistable means delivering a predetermined signal corresponding to a given digit position in one condition of the bistable means and giving a zero signal in the other condition thereof, the bistable means shifting to said one condition upon receipt of a "1" signal, and means for delivering the signals at the respective digit positions of the binary digital input signal to the corresponding bistable means, the bistable means upon receipt of a "1" signal shifting to said one condition to apply said predetermined signal to said adding bus output means, and means for shifting all said bistable means to said one condition when the input digital signal is outside a given limit.

22. In a signal transmission system, the combination of means for comparing coded signals to provide a coded error signal, means for converting said coded error signal for controlling an output, saturator means responsive to coded error signals above a predetermined value to provide a limit signal from said converting means, and feedback means for generating a coded feedback signal reflecting the condition of said output.

23. In a signal transmission system, the combination of means for comparing coded digital signals to provide a coded difference signal, said comparing means having a capacity for a first number of code positions, and means having a capacity for a lesser number of code positions than said comparing means for converting said coded difference signal to an analog signal.

References Cited in the file of this patent

UNITED STATES PATENTS

| | | |
|---|---|---|
| 2,537,427 | Seid et al. | Jan. 9, 1951 |
| 2,685,084 | Lippel et al. | July 27, 1954 |
| 2,715,678 | Barney | Aug. 16, 1955 |
| 2,775,727 | Kernahan et al. | Dec. 25, 1956 |